US012691961B2

(12) United States Patent
Prather

(10) Patent No.: US 12,691,961 B2
(45) Date of Patent: Jul. 28, 2026

(54) TRAILER WITH EXTENDABLE DECK

(71) Applicant: Michael J Prather, Anderson, CA (US)

(72) Inventor: Michael J Prather, Anderson, CA (US)

( * ) Notice: Subject to any disclaimer, the term of this patent is extended or adjusted under 35 U.S.C. 154(b) by 233 days.

(21) Appl. No.: 18/788,575

(22) Filed: Jul. 30, 2024

(65) Prior Publication Data

US 2026/0035045 A1 Feb. 5, 2026

(51) Int. Cl.
*B62D 63/06* (2006.01)

(52) U.S. Cl.
CPC ......... *B62D 63/061* (2013.01); *B62D 63/068* (2013.01)

(58) Field of Classification Search
CPC ... B62D 53/067; B62D 63/061; B62D 63/068
USPC ........................................................ 280/656
See application file for complete search history.

(56) References Cited

U.S. PATENT DOCUMENTS

| | | | | | |
|---|---|---|---|---|---|
| 3,557,980 | A | * | 1/1971 | Klaus | B60P 1/6472 |
| | | | | | 280/656 |
| 4,128,258 | A | * | 12/1978 | Johnson | B62D 21/14 |
| | | | | | 280/46 |
| 4,955,629 | A | * | 9/1990 | Todd, Jr. | B62D 53/067 |
| | | | | | 280/411.1 |
| 4,958,845 | A | * | 9/1990 | Parks | B62D 53/067 |
| | | | | | 280/407.1 |
| 5,758,890 | A | * | 6/1998 | Wessels | B62D 53/067 |
| | | | | | 410/91 |

| | | | | | |
|---|---|---|---|---|---|
| 6,109,845 | A | * | 8/2000 | Kerr | B60P 3/122 |
| | | | | | 410/56 |
| 6,474,672 | B1 | * | 11/2002 | Briscese | B60G 3/00 |
| | | | | | 280/43.23 |
| 7,396,201 | B2 | * | 7/2008 | Pollnow | B60P 1/025 |
| | | | | | 414/545 |
| 7,810,834 | B2 | * | 10/2010 | Schneider | B62D 63/061 |
| | | | | | 280/656 |
| 8,910,989 | B1 | * | 12/2014 | Boltz | B60G 3/14 |
| | | | | | 280/656 |
| 10,081,402 | B1 | * | 9/2018 | Davis | B60P 1/433 |
| 10,543,875 | B2 | * | 1/2020 | Morena | B62D 65/00 |
| 10,759,321 | B1 | * | 9/2020 | Cook, Jr. | B62D 63/061 |
| 11,873,035 | B2 | * | 1/2024 | Lutz | B62D 63/061 |

(Continued)

FOREIGN PATENT DOCUMENTS

| | | | | | |
|---|---|---|---|---|---|
| DE | 102013014575 | A1 | * | 3/2015 | B62D 63/061 |
| EP | 0825097 | A1 | * | 2/1998 | B62D 53/067 |

(Continued)

*Primary Examiner* — Emma K Frick
(74) *Attorney, Agent, or Firm* — Craig A. Simmermon

(57) ABSTRACT

A trailer is disclosed with an extendable and retractable deck where the deck may be extended to hold two vehicles or two pieces of heavy machinery and also the deck may be retracted to hold only one vehicle or one piece of heavy machinery. This allows the user to travel with a smaller trailer, which is much more convenient and easier to travel with, except under the rare condition when the user is obliged to tow two vehicles or two heavy machines. The trailer uses a sliding frame rail system that is slidably attached to a stationary frame rail system. The trailer also uses a folding deck section system that extends and retracts like an accordion. The expanding and contracting frame systems used are a superior design that allows the trailer to carry and tow two pieces of extremely heavy equipment, i.e., two a bull dozers at one time.

3 Claims, 14 Drawing Sheets

(56)        References Cited

U.S. PATENT DOCUMENTS

| | | | | |
|---|---|---|---|---|
| 2003/0214117 | A1* | 11/2003 | Steins | B62D 63/061 |
| | | | | 280/656 |
| 2023/0322311 | A1* | 10/2023 | Awad | B60P 1/6418 |
| 2024/0109615 | A1* | 4/2024 | Lutz | B62D 53/067 |
| 2025/0282432 | A1* | 9/2025 | Shipps | B62D 53/061 |

FOREIGN PATENT DOCUMENTS

| | | | | | |
|---|---|---|---|---|---|
| EP | 2374699 | A1 | * | 10/2011 | B62D 53/0864 |
| FR | 2880861 | A1 | * | 7/2006 | B60P 7/13 |
| GB | 2468031 | A | * | 8/2010 | B62D 63/061 |

* cited by examiner

TRAILER WITH EXTENDABLE DECK

BACKGROUND OF THE INVENTION

1. Field of the Invention

This invention relates to a trailer with an extendable and retractable deck where the deck may be extended to hold two vehicles or two pieces of heavy machinery and also the deck may be retracted to hold only one vehicle or one piece of heavy machinery.

2. Description of Related Art

There are other extendable and retractable trailers in the prior art; however, there are none with the extendable and retractable mechanisms as shown and described below. Applicant has created deck extension and retraction mechanisms that yield superior strength and structure to allow for the safe towing of two pieces of very heavy machinery on an extended deck system without compromising the strength and rigidity of a trailer.

BRIEF SUMMARY OF THE INVENTION

It is an aspect of trailer with extendable deck to have a sliding deck portion at the rear of the trailer that extends and retracts by sliding forwards and rewards.

It is an aspect of trailer with extendable deck to have a left and right stationary frame rail and a left and right sliding frame rail.

It is an aspect of trailer with extendable deck to have a hydraulic drive mechanism that extends and retracts the sliding deck portion.

It is an aspect of trailer with extendable deck to have a locking mechanism that solidly locks and holds the sliding deck portions in place when in the extended position.

It is an aspect of trailer with extendable deck to have a locking mechanism that solidly locks and holds the sliding deck portion in place when in the retracted position.

It is an aspect of trailer with extendable deck to have one or more folding deck portions at the front of the trailer that extends and retracts by folding like an accordion.

It is an aspect of trailer with extendable deck to have one or more deck lift arms to help retract folding deck portions.

It is an aspect of trailer with extendable deck to have a hydraulic drive mechanism that extends and retracts the folding deck portion.

It is an aspect of trailer with extendable deck to have a locking mechanism that solidly locks and holds the folding deck portions in place when in the extended position.

DEFINITION LIST

Figures 1, 2:
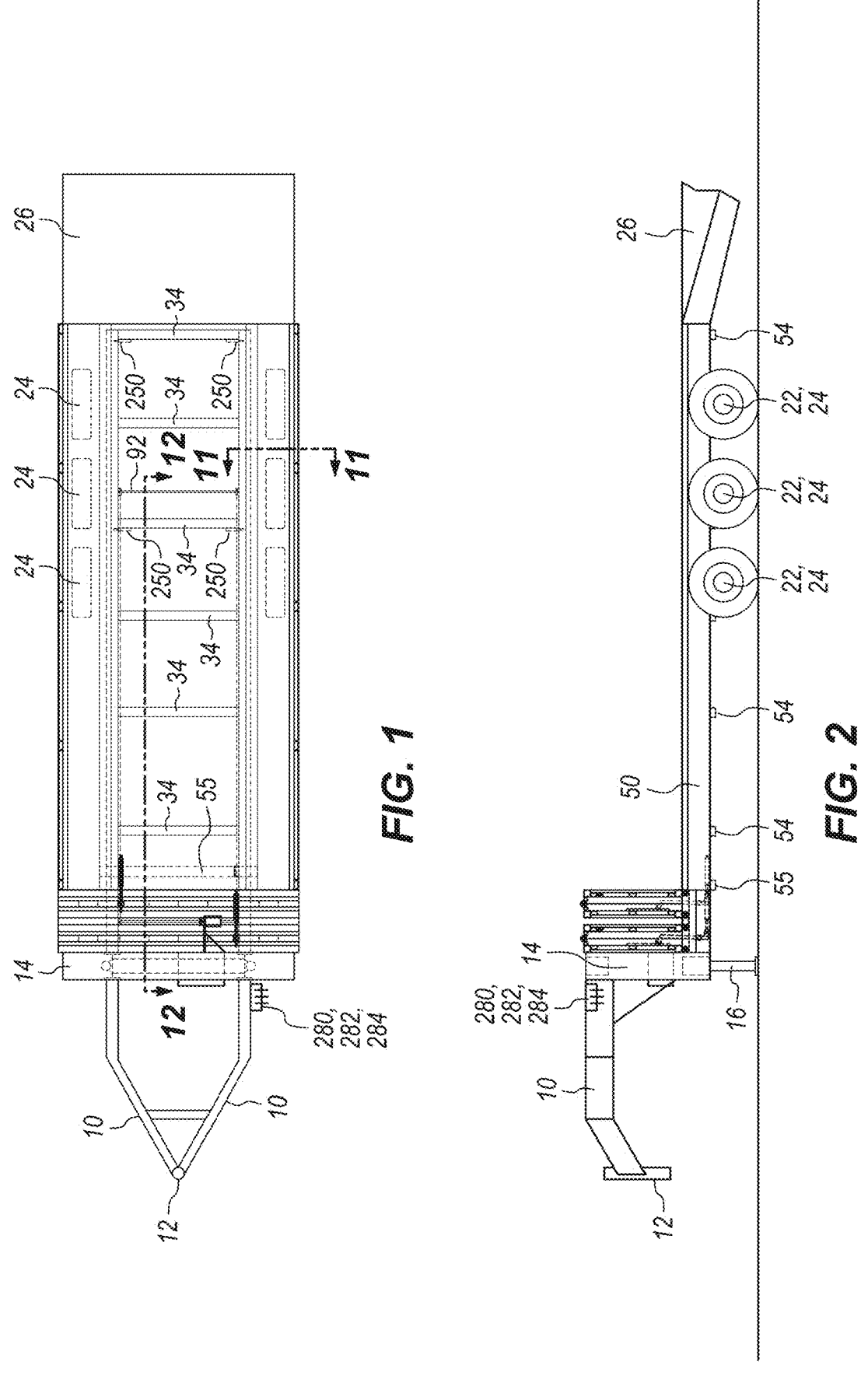
FIG. 1 is a top plan view of trailer with extendable deck in the fully retracted position and also defining cross sectional planes 11-11 and 12-12.
FIG. 2 is a left side elevation view of trailer with extendable deck in the fully retracted position.

| Term | Definition |
| --- | --- |
| 5 | Trailer with Extendable Deck |
| 10 | Gooseneck Assembly |
| 12 | Coupler |
| 14 | Bulkhead |
| 16 | Left Support Leg |
| 18 | Right Support Leg |
| 20 | Axle |
| 22 | Wheel |
| 24 | Tire |
| 26 | Ramp Assembly |
| 30 | Left Stationary Frame Rail |

| Term | Definition |
|------|------------|
| 32 | Right Stationary Frame Rail |
| 34 | Stationary Rail Cross Member |
| 36 | Left Rail Spacer |
| 38 | Left Rail Vertical Slide Plate |
| 40 | Left Rail Horizontal Slide Plate |
| 42 | Right Rail Spacer |
| 44 | Right Rail Vertical Slide Plate |
| 46 | Right Rail Horizontal Slide Plate |
| 50 | Left Sliding Frame Rail |
| 52 | Right Sliding Frame Rail |
| 54 | Sliding Rail Cross Member |
| 55 | Front Sliding Rail Cross Member |
| 56 | Left Sliding Cross Member Spacer |
| 58 | Left Sliding Cross Member Flat Bar |
| 60 | Left Sliding Cross Member Slide Plate |
| 62 | Right Sliding Cross Member Spacer |
| 64 | Right Sliding Cross Member Flat Bar |
| 66 | Right Sliding Cross Member Slide Plate |
| 70 | Folding Deck Section Left Rail |
| 72 | Folding Deck Section Right Rail |
| 74 | Folding Deck Section Cross Member |
| 76 | Deck Board |
| 80 | Hydraulic Motor |
| 82 | Hydraulic Motor Drive Sprocket |
| 84 | Hydraulic Motor Drive Chain |
| 86 | Hydraulic Pump |
| 90 | Front Roller Chain Axle |
| 92 | Rear Roller Chain Axle |
| 94 | Front Roller Chain Axle Drive Sprocket |
| 96 | Left Roller Chain |
| 98 | Right Roller Chain |
| 100 | Left Front Roller Chain Axle Sprocket |
| 102 | Left Rear Roller Chain Axle Sprocket |
| 104 | Left Roller Chain Idler Sprocket |
| 106 | Left Roller Chain Connection to 55 |
| 110 | Right Front Roller Chain Axle Sprocket |
| 112 | Right Rear Roller Chain Axle Sprocket |
| 114 | Right Roller Chain Idler Sprocket |
| 116 | Right Roller Chain Connection to 55 |
| 120 | First Folding Deck Section |
| 122 | First Folding Deck Section Front Hinge Cross Member |
| 124 | First Folding Deck Section Front Hinge Forward Knuckle |
| 125 | First Folding Deck Section Front Hinge Rear Knuckle |
| 126 | First Folding Deck Section Front Hinge Pin |
| 132 | First Folding Deck Section Rear Hinge Cross Member |
| 134 | First Folding Deck Section Rear Hinge Spacer |
| 136 | First Folding Deck Section Rear Hinge Knuckle |
| 138 | First Folding Deck Section Rear Hinge Pin |
| 140 | Second Folding Deck Section |
| 142 | Second Folding Deck Section Front Hinge Cross Member |
| 144 | Second Folding Deck Section Front Hinge Spacer |
| 146 | Second Folding Deck Section Front Hinge Knuckle |
| 148 | Second Folding Deck Section Rear Hinge Cross Member |
| 150 | Second Folding Deck Section Rear Hinge Forward Knuckle |
| 151 | Second Folding Deck Section Rear Hinge Rear Knuckle |
| 152 | Second Folding Deck Section Rear Hinge Pin |
| 160 | Runner Cross Member |
| 180 | First Deck Lift Arm |
| 182 | First Deck Lift Arm Pivot Point |
| 184 | First Deck Lift Arm Roller |
| 186 | First Deck Lift Arm Hydraulic Cylinder and Piston |
| 200 | Third Folding Deck Section |
| 202 | Third Folding Deck Section Front Hinge Cross Member |
| 204 | Third Folding Deck Section Front Hinge Forward Knuckle |
| 205 | Third Folding Deck Section Front Hinge Rear Knuckle |
| 206 | Third Folding Deck Section Front Hinge Pin |
| 212 | Third Folding Deck Section Rear Hinge Cross Member |
| 214 | Third Folding Deck Section Rear Hinge Spacer |
| 216 | Third Folding Deck Section Rear Hinge Knuckle |
| 218 | Third Folding Deck Section Rear Hinge Pin |
| 220 | Fourth Folding Deck Section |
| 222 | Fourth Folding Deck Section Front Hinge Cross Member |
| 224 | Fourth Folding Deck Section Front Hinge Spacer |
| 226 | Fourth Folding Deck Section Front Hinge Knuckle |
| 228 | Fourth Folding Deck Section Rear Hinge Cross Member |
| 230 | Fourth Folding Deck Section Rear Hinge Forward Knuckle |
| 232 | Fourth Folding Deck Section Rear Hinge Rear Knuckle |

| Term | Definition |
|------|------------|
| 234 | Fourth Folding Deck Section Rear Hinge Pin |
| 240 | Second Deck Lift Arm |
| 242 | Second Deck Lift Arm Pivot Point |
| 244 | Second Deck Lift Arm Roller |
| 246 | Second Deck Lift Arm Hydraulic Cylinder and Piston |
| 250 | Sliding Frame Locking Pin |
| 252 | Sliding Frame Locking Pin Spring |
| 254 | Sliding Frame Locking Pin Hydraulic Cylinder and Piston |
| 260 | Folding Deck Section Locking Pin |
| 262 | Folding Deck Section Locking Pin Fin |
| 264 | Folding Deck Section Locking Pin Spring |
| 265 | Retaining Head |
| 280 | Frame Lock Pins Control Lever |
| 282 | Lift Mechanism Control Lever |
| 284 | Hydraulic Motor Control Lever |

DETAILED DESCRIPTION OF THE INVENTION

Trailer with extendable deck 5 is a trailer. A trailer is an unpowered vehicle towed by a powered vehicle that is used for the transport of goods and materials. All trailers are connected to a powered vehicle or a tow vehicle by a trailer hitch or coupling on the tow vehicle. Typically, a trailer hitch is attached to the rear bumper or rear portion of the tow vehicle. A typical rear trailer hitch uses a tow ball or ball coupler to allow swiveling and articulation of a trailer. The majority of all trailers are towed using a rear trailer hitch. Optionally, a trailer hitch may be located and attached in the bed of a commercial truck or the bed of a pickup truck. This is called fifth-wheel towing, which utilizes and a special fifth-wheel trailer hitch or coupling attached to the bed of a truck. All semi-trucks or big rig trucks use fifth-wheel towing. A hybrid type of trailer is called a gooseneck trailer. The gooseneck trailer design allows for much greater towing capacity than a standard rear trailer hitch that attaches the rear of a tow vehicle. The attachment point of a gooseneck trailer is in the bed of a truck, like fifth-wheel towing, however, the gooseneck trailer does not require and complicated fifth-wheel coupling. The gooseneck trailer attaches to the same tow ball found on a standard rear trailer hitch. In order to attach a gooseneck trailer to a truck, the trailer must essentially reach all the way into the bed of the truck in order to be connected to the trailer hitch located in the bed of the truck. The part of the trailer that reaches all the way into the bed of the truck is shaped like a gooseneck because it reaches up and over and then back down like the shape of a goose's neck. At any rate, this is how a trailer got its name because the trailer coupler structure is shaped somewhat like a gooseneck.

Trailer with extendable deck 5 may be towed by: a standard rear trailer hitch, a fifth-wheel trailer hitch or coupling; or a gooseneck trailer hitch. Thus, trailer with extendable deck 5 may be: a standard trailer, a fifth-wheel trailer, or a gooseneck trailer. The most important aspects of trailer with extendable deck 5 are the extension and retraction mechanisms of the trailer bed, and not the type of tow vehicle coupling. It is simply a matter of choice as to what tow vehicle coupling is used on trailer with extendable deck 5.

Trailer with extendable deck 5 comprises: a tow vehicle coupling assembly that may be: a rear tow hitch assembly, a fifth-wheel coupling hitch assembly, or a gooseneck trailer hitch assembly. The tow vehicle coupling assembly reversibly attaches to the tow vehicle. Framework and other support structure is required to mount the tow vehicle coupling assembly onto the trailer.

In best mode, trailer with extendable deck 5 is a gooseneck trailer because it is the least expensive trailer design that is capable of hauling two pieces of heavy machinery. In best mode, tow vehicle coupling assembly comprises: a gooseneck assembly 10 and a coupler 12.

Gooseneck assembly 10 is the support structure linking the trailer to the tow vehicle. Gooseneck assembly 10 is a horizontal frame with a front end and a rear end. The front end of gooseneck assembly is rigidly attached to the coupler 12. The rear end of the gooseneck assembly 10 is rigidly attached to the bulkhead 14. The gooseneck assembly 10 comprises two lateral support members that are rigidly attached to the bulkhead 14. The two lateral support members converge to a single point toward the front of the trailer where the coupler 12 is located. Any known type or design of gooseneck assembly 10 may be used.

Coupler 12 is an attachment point or connector that is reversibly attachable to the trailer hitch on the tow vehicle. Coupler 12 is designed to mate with the trailer hitch on the tow vehicle. A typical type of coupler 12 is a ball coupler that is designed to reversibly attach to a tow ball. Any known type or design or coupler 12 may be used. The gooseneck assembly 10 and coupler 12 form the gooseneck shape that is discussed above.

Trailer with extendable deck 5 further comprises: a bulkhead 14; a left support leg 16; a right support leg 18; at least one axle 20; at least two wheels 22; at least two tires 24; and a ramp assembly 26.

The bulkhead 14 is a vertical frame that connects the gooseneck assembly 10 or tow vehicle coupling assembly to the trailer deck. Bulkhead 14 is an assembly of rigid structural members that forms a rectangular cuboid shape. Bulkhead 14 has: an upper side, a lower side, a left side, a right side, a front side, and a rear side. The front and rear sides of bulkhead 14 are vertical and parallel with each other. The front side of bulkhead 14 is rigidly attached to the gooseneck assembly 10. The front side of bulkhead 14 is rigidly attached to the rear end of the gooseneck assembly 10. The rear side of bulkhead 14 is rigidly attached to a left stationary frame rail 30 and a right stationary frame rail 32. Any known type or design or bulkhead 14 may be used. Note that all trailers have a bulkhead 14. Trailers with a rear tow hitch assembly, a fifth-wheel coupling hitch assembly, and a gooseneck trailer hitch assembly each have a bulkhead 14. A bulkhead is required for structural support between the tow vehicle coupling assembly and the deck or bed of the trailer.

Left support leg 16 and right support leg 18 are each support columns that hold up the front end of the trailer when the trailer is not attached to a tow vehicle. The left support leg 16 being on the left side or driver's side of the trailer and the right support leg 18 being on the right side or passenger's side of the trailer. Left support leg 16 and right support leg 18 each have an upper end that is rigidly attached to the lower side of bulkhead 14 and a lower end that may rest on the ground or be retracted into the bulkhead 14 in order to float in the air so to speak. Left support leg 16 and right support leg 18 each have a longitudinal axis that is vertical. Left support leg 16 and right support leg 18 are extendable and retractable so that they can be extended downward and retracted upwards. When trailer with extendable deck 5 is not attached to a tow vehicle, left support leg 16 and right support leg 18 are each extended to hold the front of the trailer up and to allow enough clearance for the tow vehicle to back up under the coupler 12. In order to attach trailer with extendable deck 5 to a tow vehicle, the tow hitch on the tow vehicle is positioned under the coupler 12 by maneuvering the tow vehicle while the trailer remains still. Then, the left support leg 16 and right support leg 18 are retracted to simultaneously lower to the coupler 12 onto the trailer hitch on the tow vehicle. When the trailer is attached to a tow vehicle, the front end of the trailer is held up by the tow vehicle and not the left support leg 16 and right support leg 18. Any known type or design of left support leg 16 and right support leg 18 may be used.

Each of at least one axle 20 is a central shaft, rod, or spindle for a rotating wheel. Each of at least one axle 20 an axle in the normal use or definition of the word. Each of at least one axle 20 is rigidly attached to: left sliding cross member flat bar 58, right sliding cross member flat bar 64, and/or sliding rail cross member 54 thereby connecting each axle 20 to the trailer and the trailer deck. Each of at least one axle 20 has a left end that is rigidly attached to a first wheel 22 and a right end that is attached to a second wheel 22. As stated, trailer with extendable deck 5 comprises one or more axles 20. In best mode, trailer with extendable deck 5 comprises three axles 20 as depicted. Any known type of axle 20 may be used.

Each of at least two wheels 22 is a circular object that revolves around axle 20 to enable the trailer to move easily over the ground. Each of at least two wheels 22 is a wheel in the normal use or definition of the word.

As stated, trailer with extendable deck 5 comprises at least two wheels 22. In best mode, trailer with extendable deck 5 comprises six wheels 22 as depicted. Any known type of wheel 22 may be used.

Each of at least two tires 24 is a rubber or elastic covering, inflated or surrounding an inflated inner tube, placed around a wheel to form a flexible contact with the road. Each of at least two tires 24 is a tire in the normal use or definition of the word. As stated, trailer with extendable deck 5 comprises at least two tires 24. In best mode, trailer with extendable deck 5 comprises six tires 24 as depicted. Any known type of tire 24 may be used.

Ramp assembly 26 is an assembly of steel structure that functions as a ramp to use in order to drive vehicles onto the deck of the trailer for transport by the trailer. Typically, ramp assembly 26 is a hinged mechanism wherein the ramp is unfolded or rotated outward to lower a ramp portion down to the ground to contact the ground so that the vehicle could have continuous contact with the ramp as driven onto the trailer. Ramp assembly 26 an upper side, a lower side, a left side, a right side, a front side, and a rear side. Any known type or design or ramp assembly 26 may be used.

Figures 3, 4:
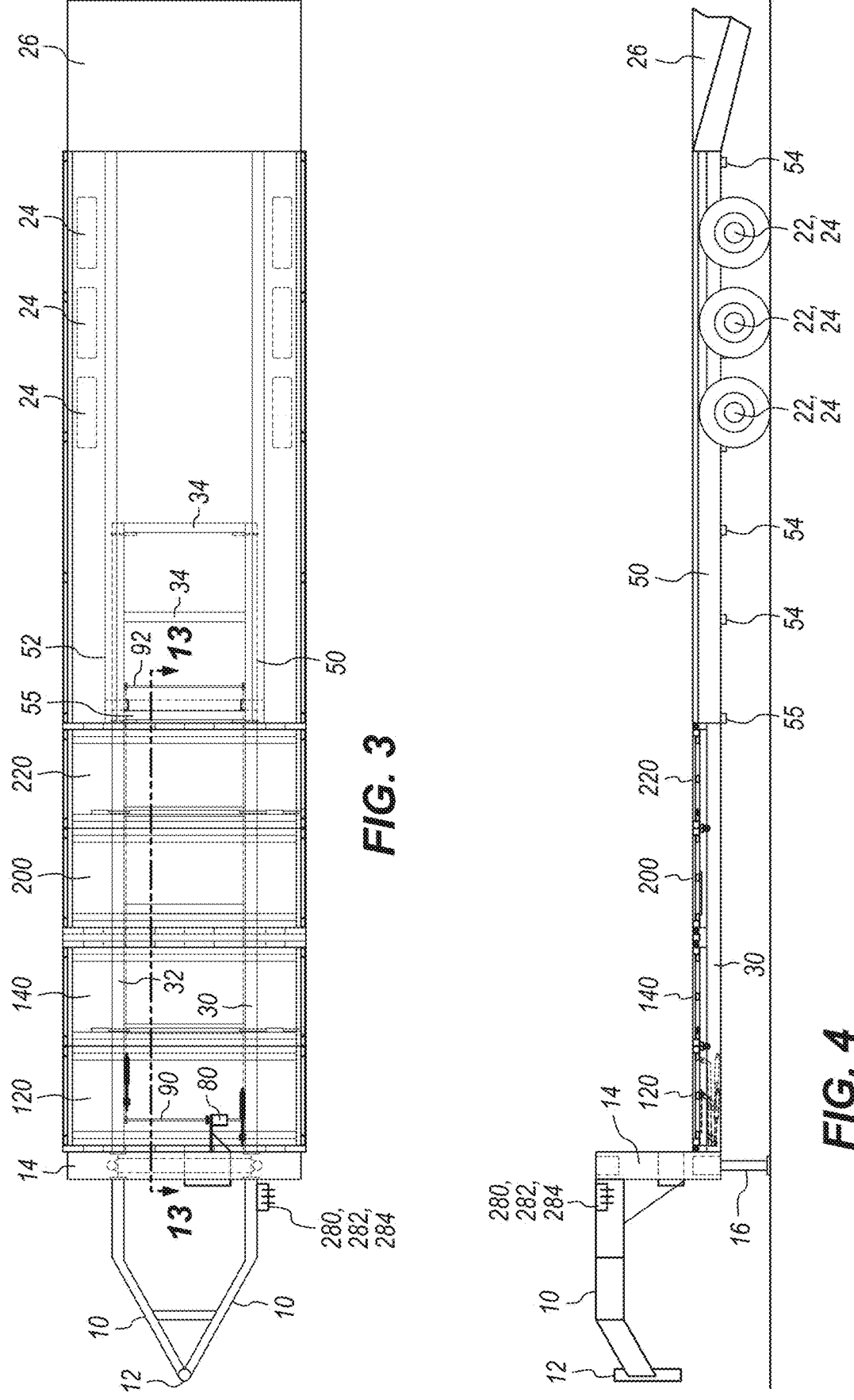
FIG. 3 is a top plan view of trailer with extendable deck in the fully extended position and also defining cross sectional plane 13-13.
FIG. 4 is a left side elevation view of trailer with extendable deck in the fully extended position.
Figures 5, 6:
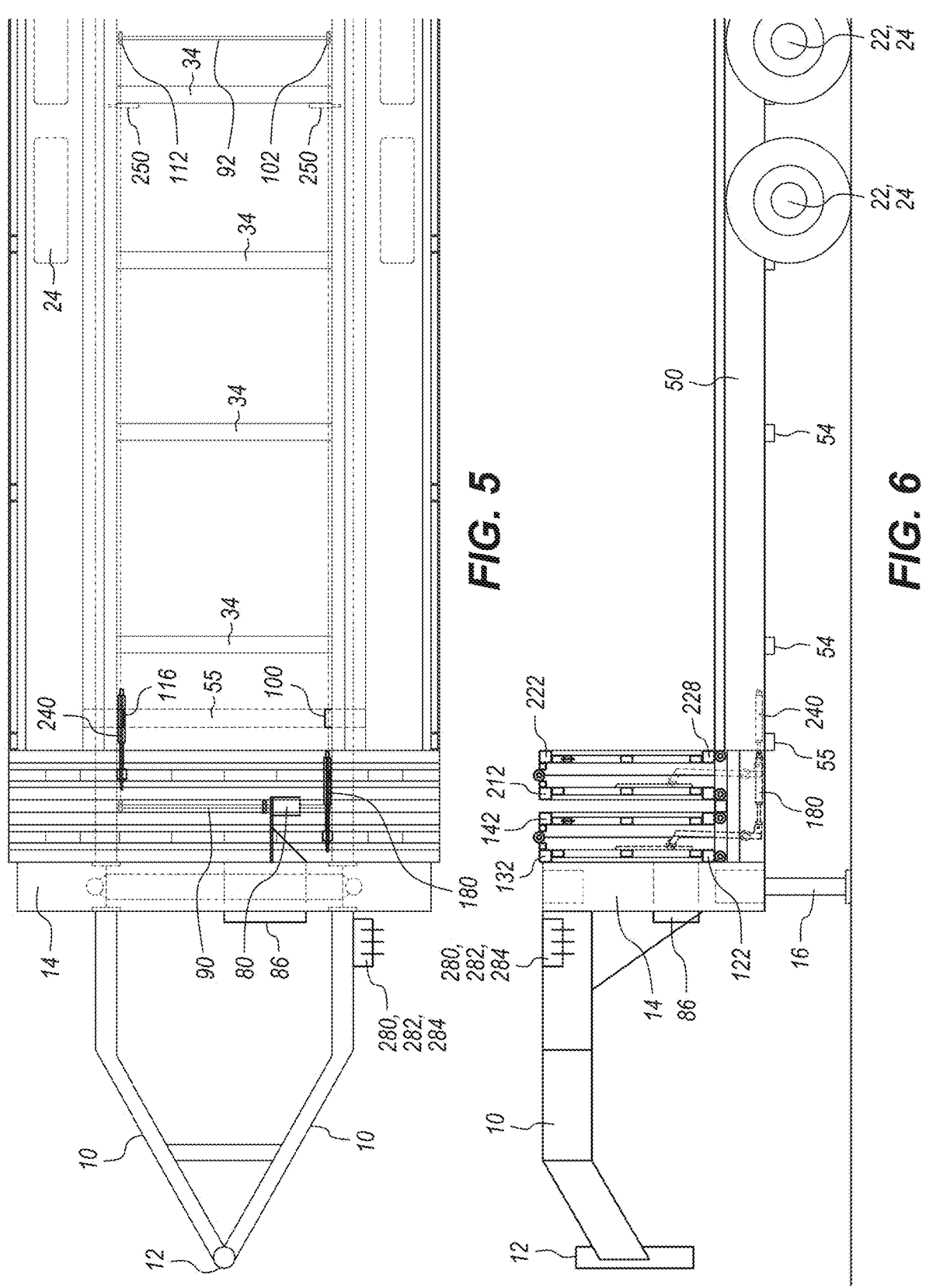
FIG. 5 is another top plan view of trailer with extendable deck in the fully retracted position.
FIG. 6 is another left side elevation view of trailer with extendable deck in the fully retracted position.
Figures 7, 8:
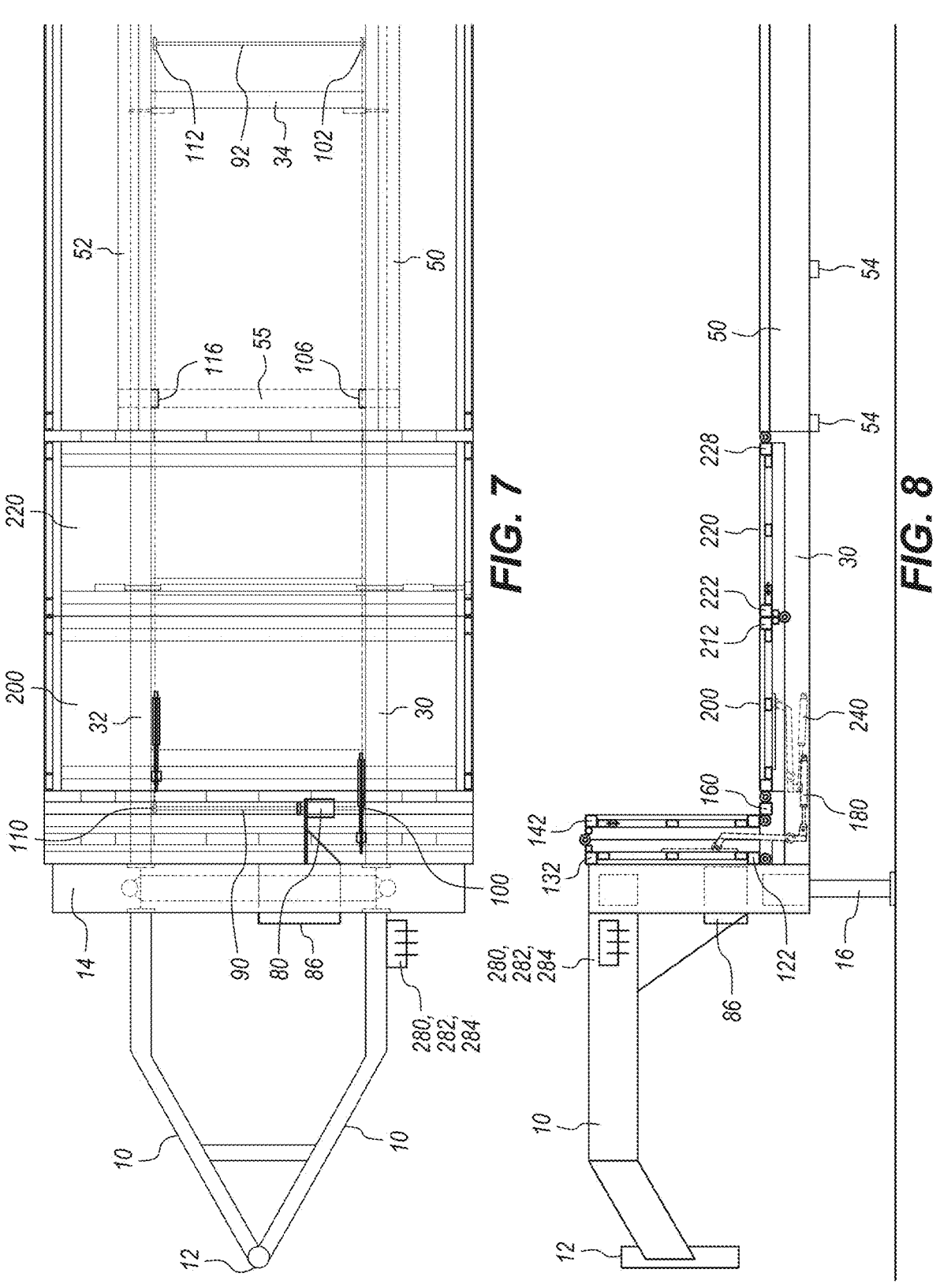
FIG. 7 is a top plan view of trailer with extendable deck in the half-extended position.
FIG. 8 is a left side elevation view of trailer with extendable deck in the half-extended position.
Figures 9, 10:
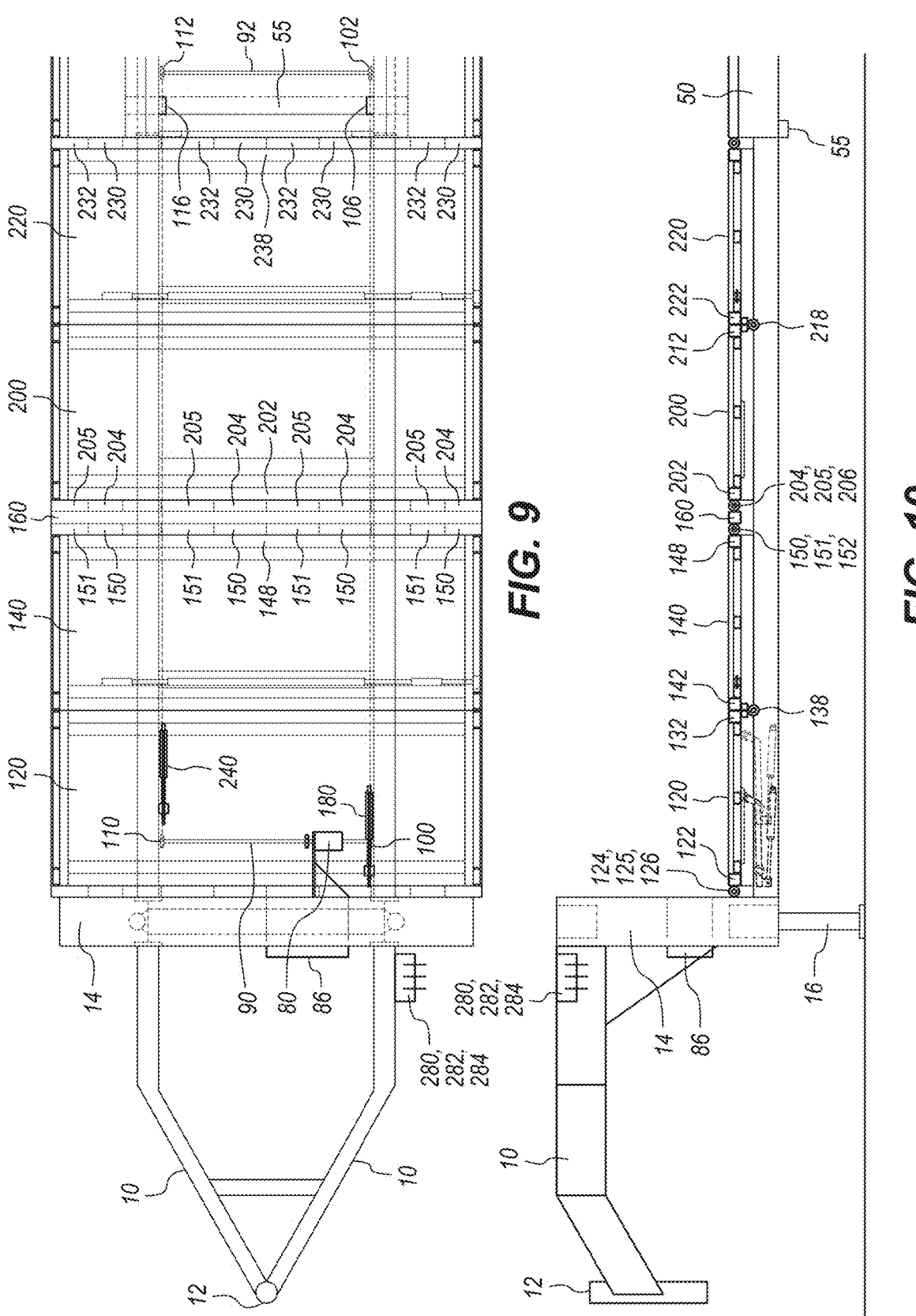
FIG. 9 is another top plan view of trailer with extendable deck in the fully extended position.
FIG. 10 is another left side elevation view of trailer with extendable deck in the fully extended position.
Figure 11:
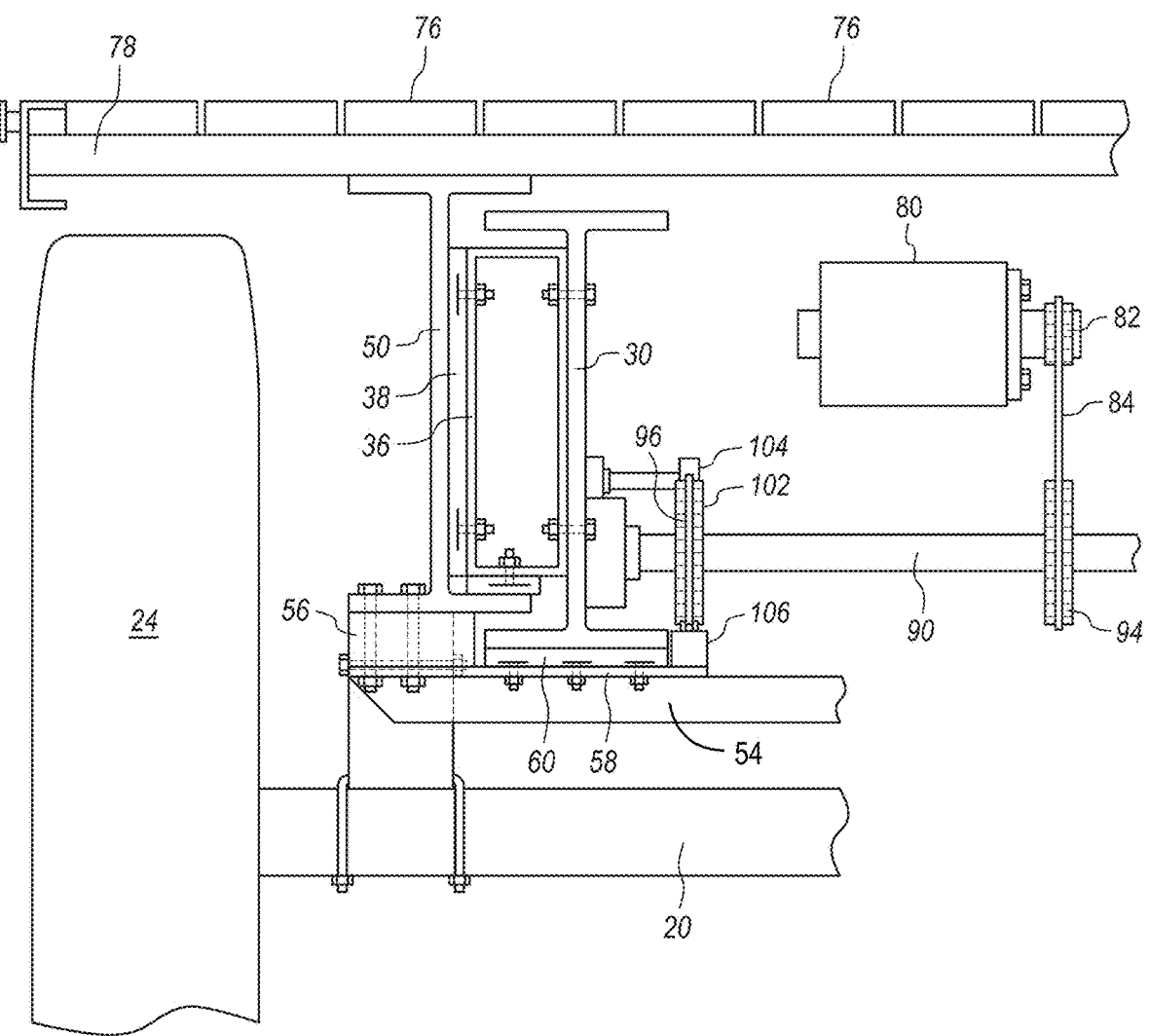
FIG. 11 is a cross sectional view of the plane 11-11 defined in FIG. 1, depicting how the sliding frame rails are slidably connected to the stationary frame rails.
Figure 12:
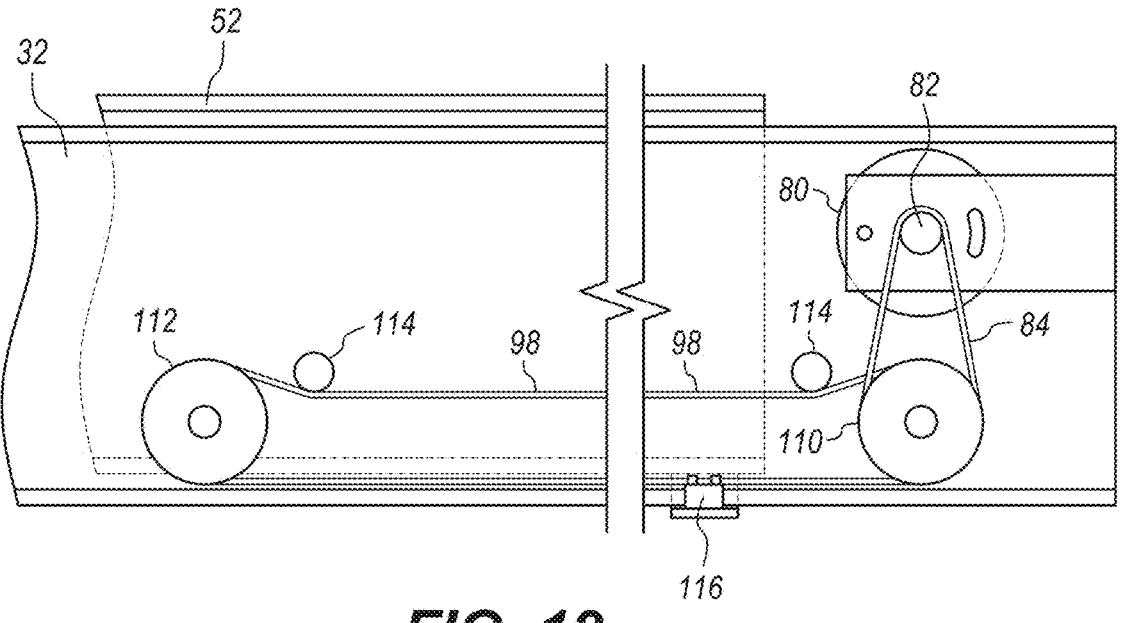
FIG. 12 is a cross sectional view of the plane 12-12 defined in FIG. 1, depicting the hydraulic motor and roller chains in the fully retracted position.
Figure 13:
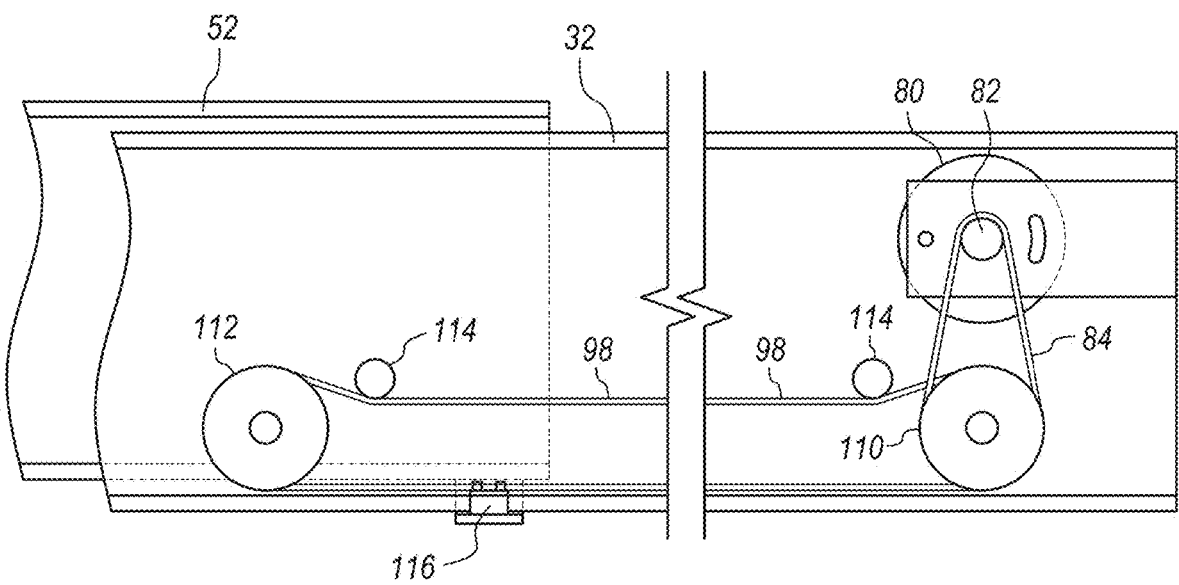
FIG. 13 is a cross sectional view of the plane 13-13 defined in FIG. 3, depicting the hydraulic motor and roller chains in the fully extended position.
Figure 14:
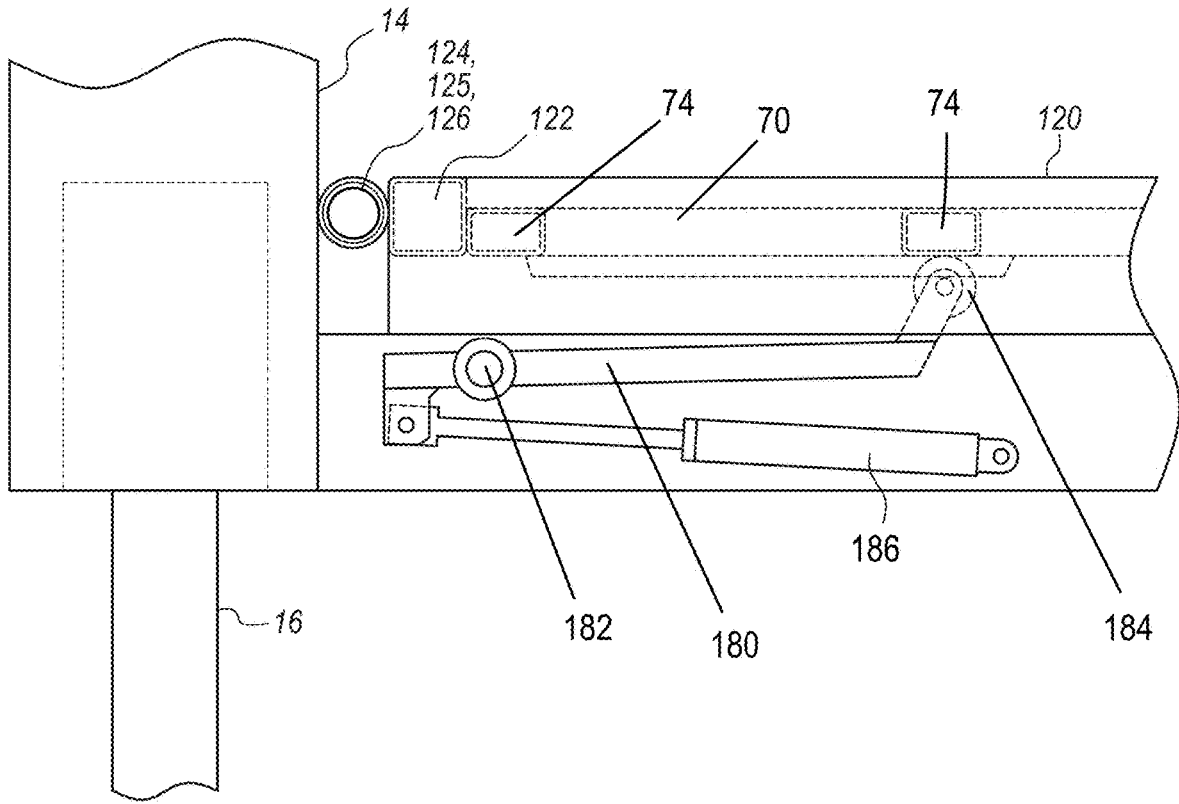
FIG. 14 is a cross sectional view depicting the lift mechanism that lifts up the folding deck sections.
Figure 15:
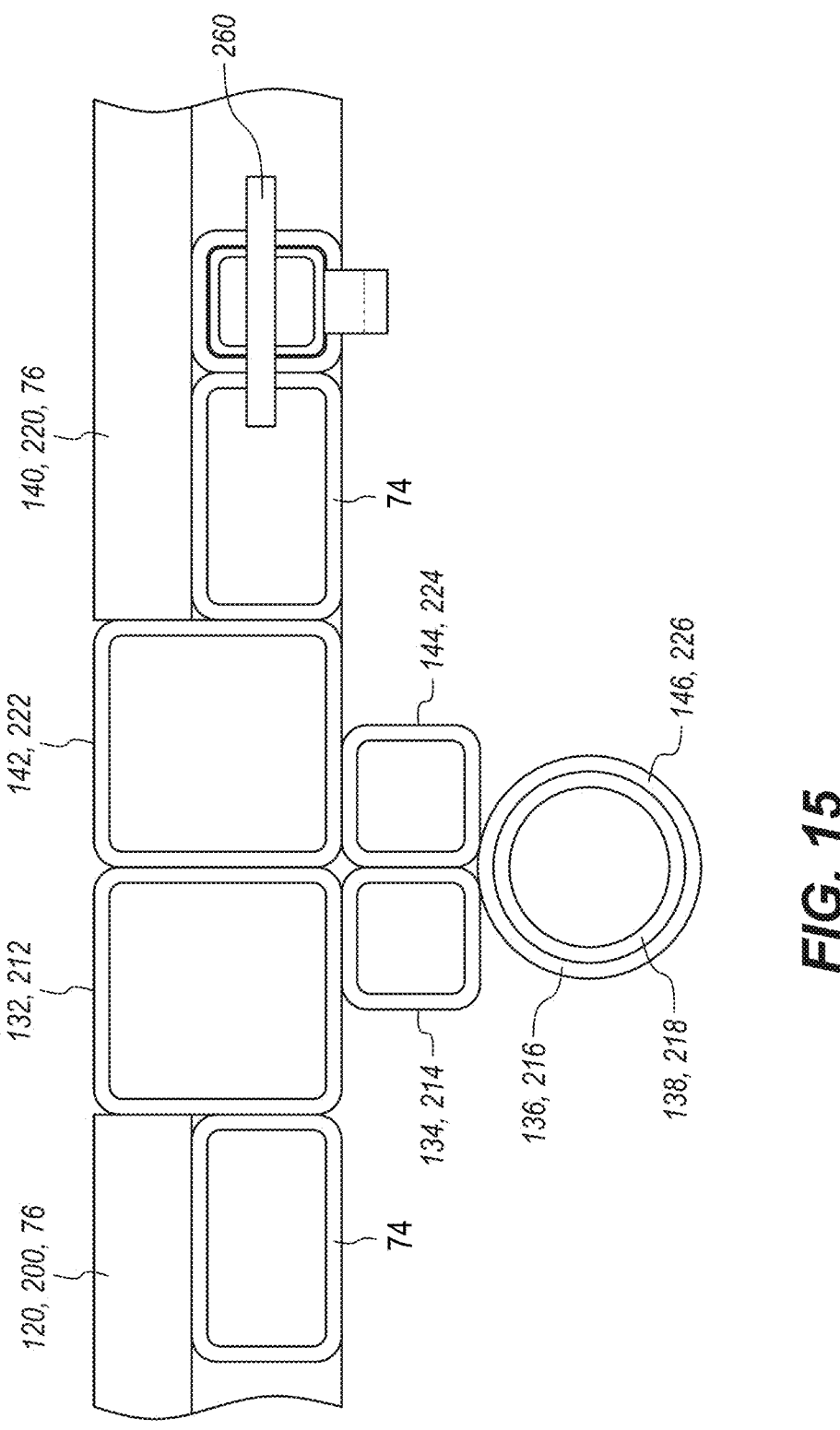
FIG. 15 is a side elevation view depicting the interface between the first folding deck section and the second folding deck section, or the third folding deck section and the fourth folding deck section, when the two sections are in the fully extended position.
Figures 16, 17:
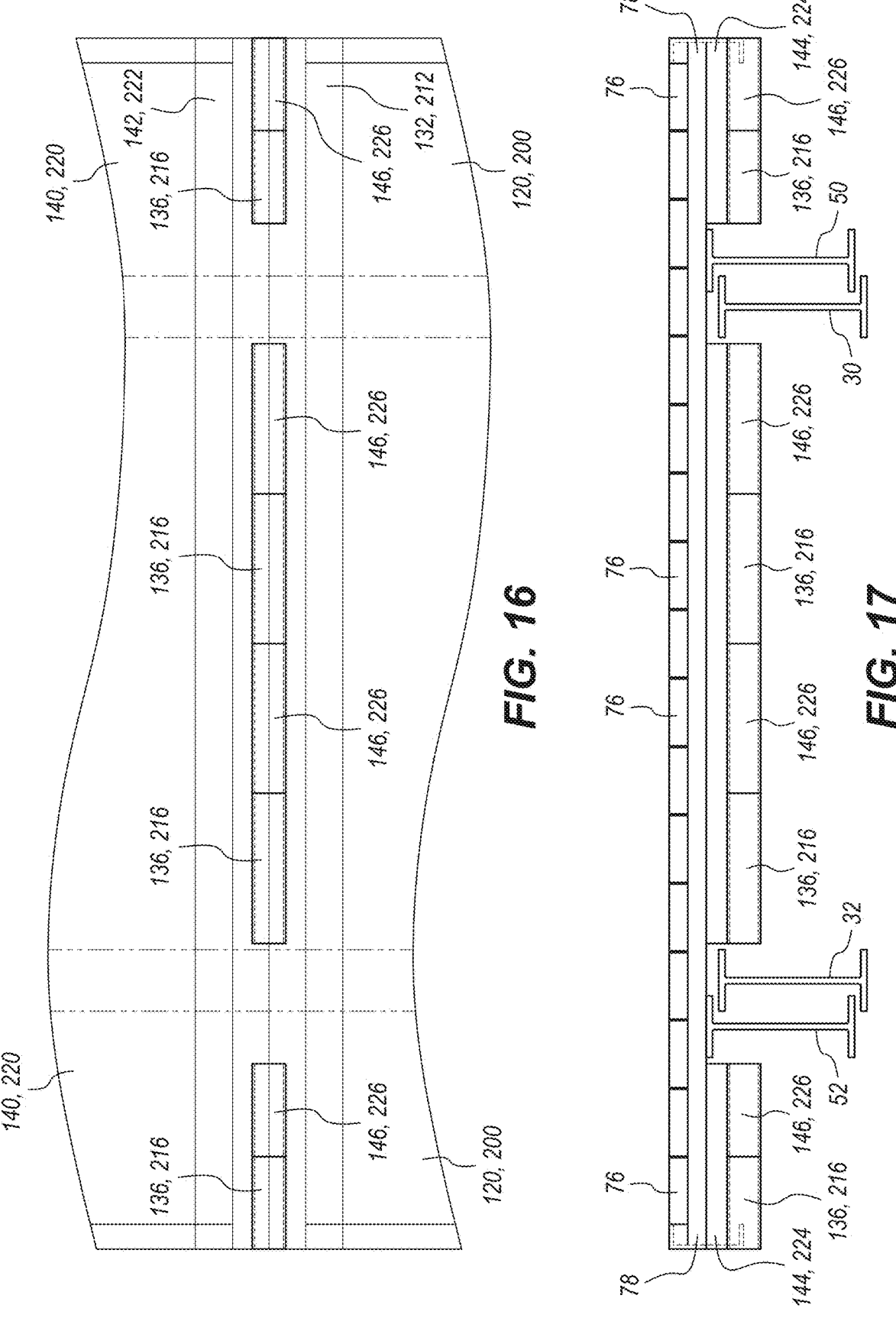
FIG. 16 a top plan view depicting the interface between the first folding deck section and the second folding deck section, or the third folding deck section and the fourth folding deck section, when the two sections are in the fully extended position.
FIG. 17 is a cross sectional view depicting the interface between the first folding deck section and the second folding deck section, or the third folding deck section and the fourth folding deck section, when the two sections are in the fully extended position.
Figure 18:
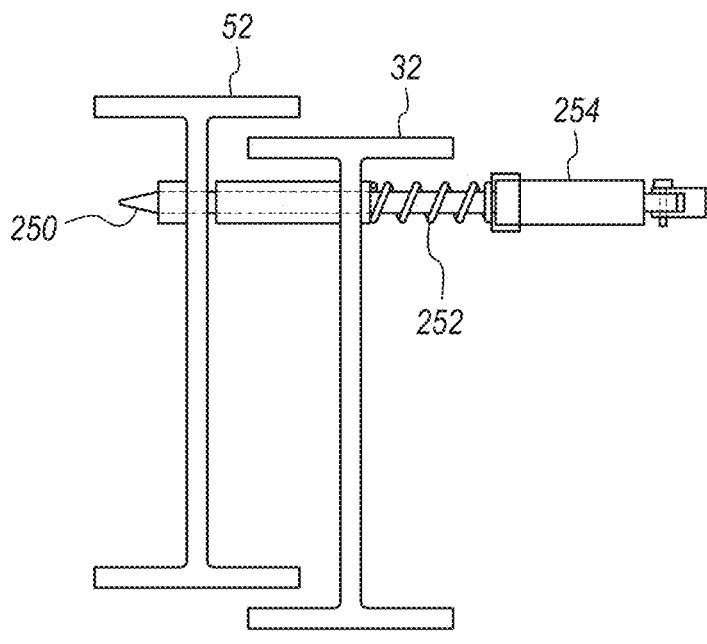
FIG. 18 is a cross sectional view of a sliding frame locking pin in the locked position.
Figure 19:
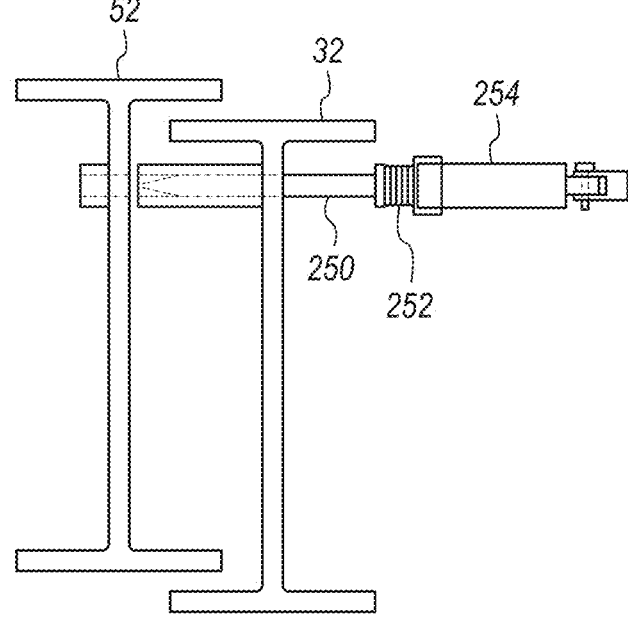
FIG. 19 is a cross sectional view of a sliding frame locking pin in the unlocked position.
Figure 20:
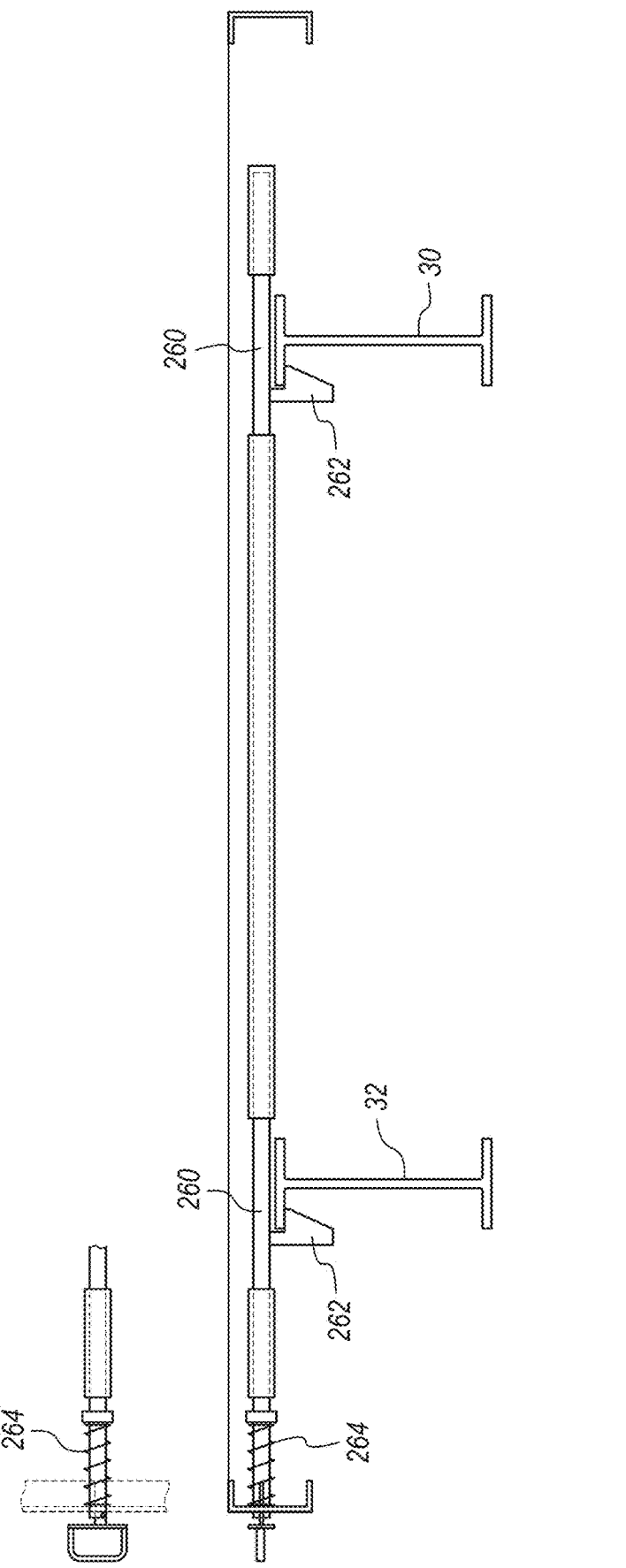
FIG. 20 is a cross sectional view of a folding deck section locking pin in the locked position.
Figure 21:
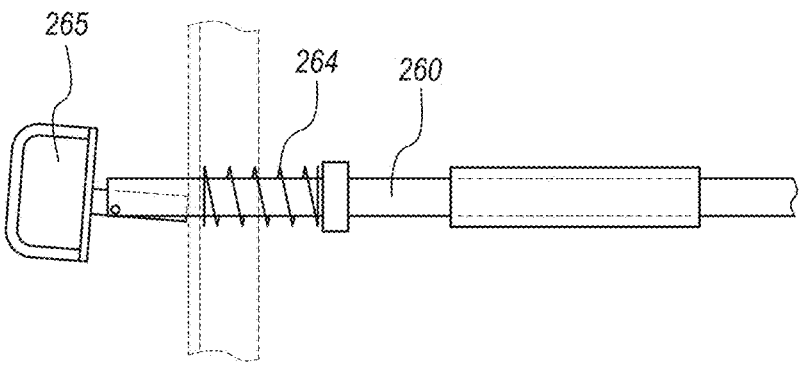
FIG. 21 is a cross sectional view of a folding deck section locking pin in the unlocked position.
Figure 22:
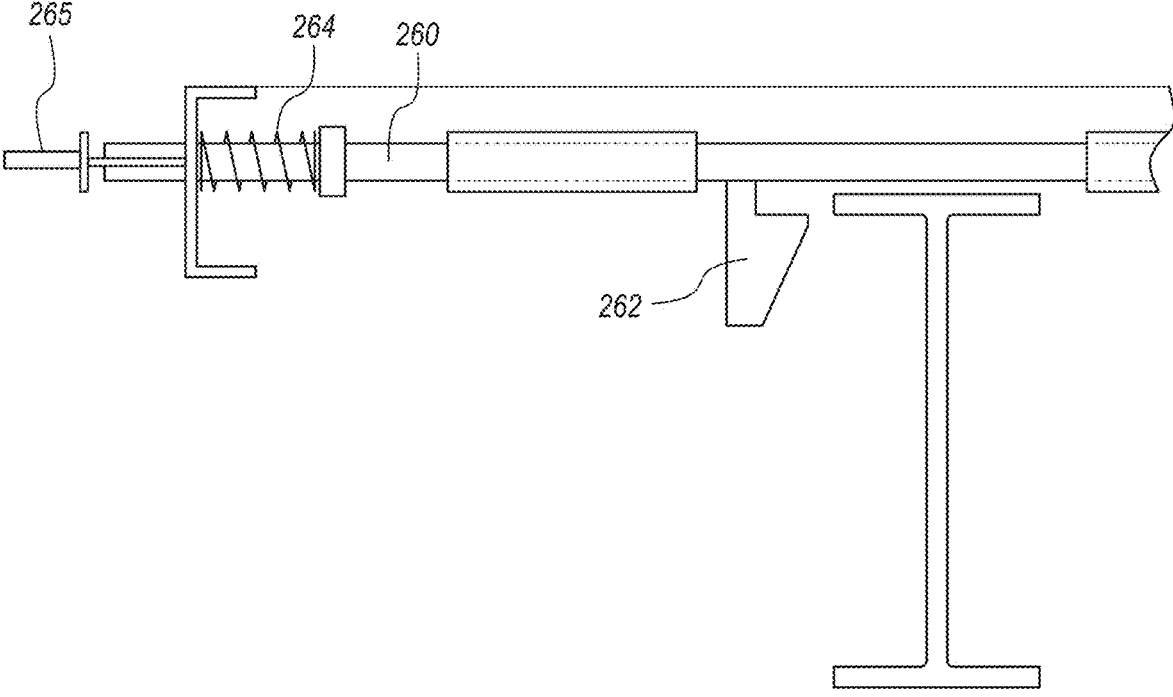
FIG. 22 is a cross sectional view of a folding deck section locking pin in the unlocked position.
Figure 23:
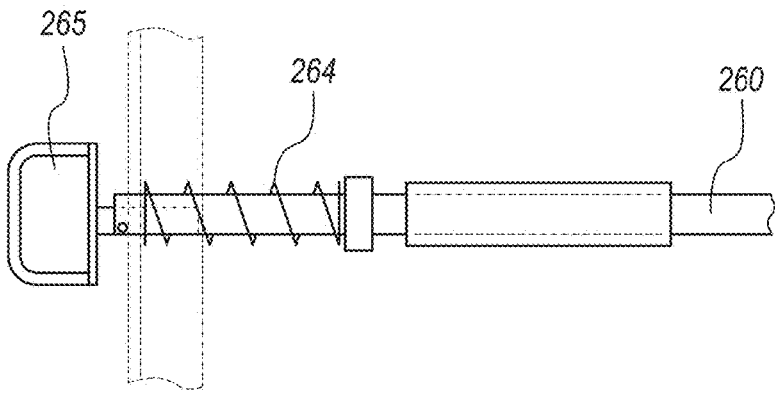
FIG. 23 is another cross sectional view of a folding deck section locking pin in the locked position.
Figure 24:
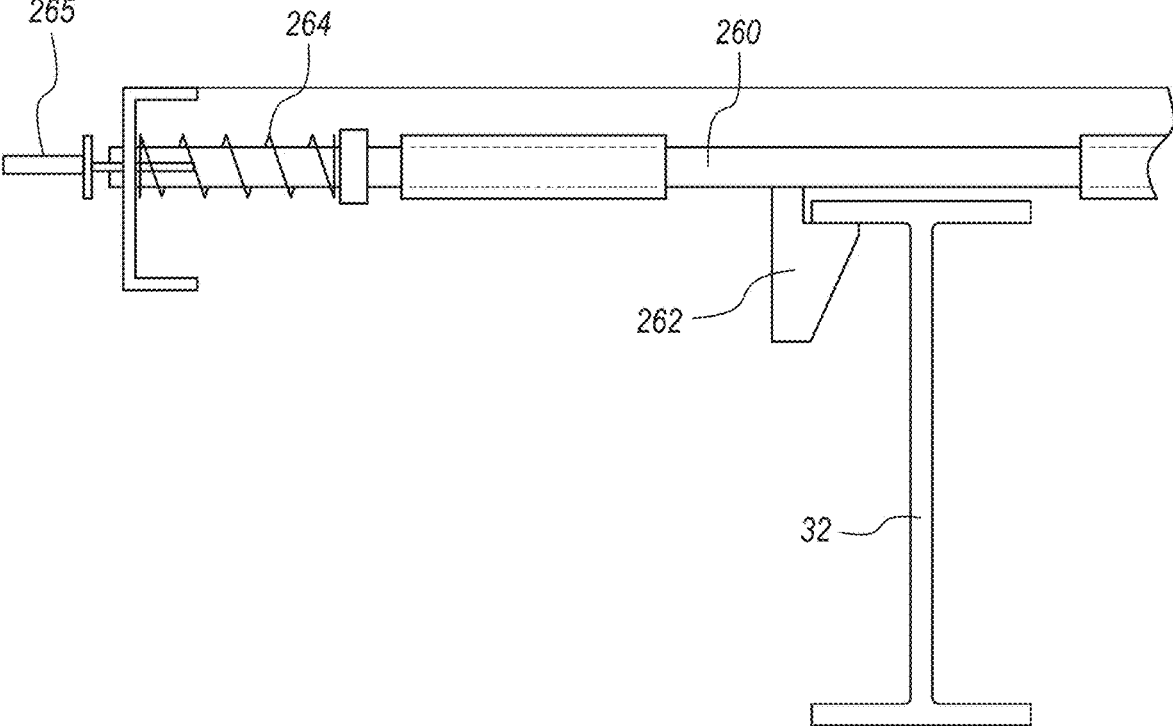
FIG. 24 is another cross sectional view of a folding deck section locking pin in the locked position.

The preceding elements are standard components that are found on any gooseneck trailer. The matter discussed below is not standard, which discusses a trailer with an extendable and retractable deck wherein the length of deck space can be increased by 15 feet or more in the extended position as compared to the retracted position. Thus, the length of the deck on the trailer increases by as much as fifty feet in the extended position. The width of the deck essentially stays the same in the extended position as compared to the retracted position. The rear portion of the trailer extends and retracts wherein the front portion of the trailer is stationary. The rear portion slides backwards and forwards on the axle, wheel, and tire assembly 20,22,24 discussed above. Thus, the rear portion of the trailer uses the trailer's own tires as rollers on which to extend the rear portion of the deck. Trailer with extendable deck 5 must be attached or hooked up to a tow vehicle in order to extend or retract the deck. FIGS. 1 and 2 depict trailer with extendable deck 5 in the fully retracted position. FIGS. 3 and 4 depict trailer with extendable deck 5 in the fully extended position.

Trailer with extendable deck 5 further comprises: a left stationary frame rail 30; a right stationary frame rail 32; a plurality of stationary rail cross members 34; a left rail spacer 36; a left rail vertical slide plate 38; a left rail horizontal slide plate 40; a right rail spacer 42; a right rail vertical slide plate 44; and a right rail horizontal slide plate 46.

Left stationary frame rail 30 is a part of the frame of the trailer. Left stationary frame rail 30 is a length of steel I-beam, which is a structural member with an I-shaped or H-shaped cross-section. The horizontal elements of the "I" are called flanges, and the vertical element is known as the web. The web resists shear forces, while the flanges resist most of the bending moment experienced by the beam. Left stationary frame rail 30 has: length, a width, a height, a longitudinal axis, a latitudinal axis, an inner side, an outer side, an upper side, a lower side, a first end, and a second end. The web of the I-beam is positioned vertically, and thus the flanges of the I-beam are horizontal. The first end of left stationary frame rail 30 is rigidly attached to the rear side of bulkhead 14 so that the longitudinal axis of left stationary frame rail 30 is perpendicular to the rear side of bulkhead 14. Thus, left stationary frame rail 30 is horizontal. Left stationary frame rail 30 is parallel with right stationary frame rail 32. The first end of left stationary frame rail 30 is attached at the corner of the bulkhead 14, adjacent to the left side and the lower side of bulkhead 14. The left stationary frame rail 30 helps form the left side of the trailer at the front of the trailer. Rigid attachment may be accomplished by any known means such as: weld, solder, glue, epoxy, adhesive, bolts, screws, rivets, clips, snaps, pins, or fasteners. In best mode, rigid attachment is accomplished by welding.

Right stationary frame rail 32 is a part of the frame of the trailer. Right stationary frame rail 32 is a length of steel I-beam, which is a structural member with an I-shaped or H-shaped cross-section. The horizontal elements of the "I" are called flanges, and the vertical element is known as the web. The web resists shear forces, while the flanges resist most of the bending moment experienced by the beam. Right stationary frame rail 32 has: length, a width, a height, a longitudinal axis, an inner side, an outer side, an upper side, a lower side, a latitudinal axis, a first end, and a second end. The web of the I-beam is positioned vertically, and thus the flanges of the I-beam are horizontal.

The first end of right stationary frame rail 32 is rigidly attached to the rear side of bulkhead 14 so that the longitudinal axis of right stationary frame rail 32 is perpendicular to the rear side of bulkhead 14. Thus, right stationary frame rail 32 is horizontal. The first end of right stationary frame rail 32 is attached at the corner of the bulkhead 14, adjacent to the right side and the lower side of bulkhead 14. The right stationary frame rail 32 helps form the right side of the trailer at the front of the trailer. Rigid attachment may be accomplished by any known means such as: weld, solder, glue, epoxy, adhesive, bolts, screws, rivets, clips, snaps, pins, or fasteners. In best mode, rigid attachment is accomplished by welding.

Each of the plurality of stationary rail cross members 34 is a length of rigid support structure. Each of the plurality of stationary rail cross members 34 may be a length of tubular steel, C-channel steel, angled steel, flat bar steel, or solid rod steel. Each of the plurality of stationary rail cross members 34 has a length, width, height, longitudinal axis, a first end, and a second end. Each of the plurality of stationary rail cross members 34 is evenly spaced along the length of left and right stationary frame rails 30,32 and rigidly attached to both the left and right stationary frame rails 30,32 with the longitudinal axis of each of the plurality of stationary rail cross members 34 perpendicular to the longitudinal axis of the left and right stationary frame rails 30,32. The first end of each of the plurality of stationary rail cross members 34 is rigidly attached to the inner side of left stationary frame rail 30, the upper side of left stationary frame rail 30, or the lower side of left stationary frame rail 30 so that the longitudinal axis of each stationary rail cross member 34 is perpendicular to that of the left stationary frame rail 30. The second end of each of the plurality of stationary rail cross members 34 is rigidly attached to the inner side of right stationary frame rail 32, the upper side of right stationary frame rail 32, or the lower side of right stationary frame rail 32 so that the longitudinal axis of each stationary rail cross member 34 is perpendicular to that of the right stationary frame rail 32. The first stationary rail cross member 34 is located at the first end of left and right stationary frame rails 30,32. The last stationary rail cross member 34 is located at the second end of left and right stationary frame rails 30,32. Rigid attachment may be accomplished by any known means such as: weld, solder, glue, epoxy, adhesive, bolts, screws, rivets, clips, snaps, pins, or fasteners. In best mode, rigid attachment is accomplished by welding.

Thus, left stationary frame rail 30, right stationary frame rail 32, and the plurality of stationary rail cross members 34 form a rigid structure that is shaped like a ladder or a rigid ladder structure. Of course, the rigid ladder structure in this case runs horizontally. The rigid ladder structure is rigidly attached to the bulkhead 14. The rigid ladder structure of the left stationary frame rail 30, right stationary frame rail 32, and plurality of stationary rail cross members 34 remains stationary and attached to the bulkhead 14 as the deck on the trailer with extendable deck 5 is extended and retracted.

Left rail spacer 36 is a length of rigid support structure or rectangular tubular steel. Left rail spacer 36 has a length, width, height, longitudinal axis, an inner side, an outer side, an upper side, a lower side, a first end, and a second end. The length of left spacer is 36 is essentially equivalent to that of the left stationary frame rail 30. The inner side of left rail spacer 36 is rigidly attached to the outer side of left stationary frame rail 30 so that the first end of left rail spacer 36 coincides with and is aligned with the first end of left stationary frame rail 30, the second end of left rail spacer 36 coincides with and is aligned with the second end of left stationary frame rail 30, and the longitudinal axis of left rail spacer 36 is parallel with that of left stationary frame rail 30. The left rail spacer 36 is attached to the web portion of left stationary frame rail 30 as depicted. The width of left rail spacer 36 must be greater than half the width of left stationary frame rail 30. Left rail spacer 36 functions as a spacer between the left stationary frame rail 30 and left sliding frame rail 50 to allow these two I-beams to longitudinally slidably attach or connect to each other without the flange of one I-beam touching the web of the other I-beam. Rigid attachment may be accomplished by any known means such as: weld, solder, glue, epoxy, adhesive, bolts, screws, rivets, clips, snaps, pins, or fasteners. In best mode, rigid attachment is accomplished by fasteners.

Left rail vertical slide plate 38 is a rigid sheet of low friction material. Low friction material is typically plastic or composite material such as nylon, acetal, PTFE, graphite, UHMW, or similar. In best mode, left rail vertical slide plate 38 is made of UHMW or ultra-high molecular weight polyethylene. Left rail vertical slide plate 38 has a length, a height, a thickness, a longitudinal axis, an inner surface, an outer surface, a first end, a second end, an upper edge, and a lower edge. The length of left rail vertical slide plate 38 is equivalent to that of the left rail spacer 36. The height of left rail vertical slide plate 38 is equivalent to that of the left rail spacer 36. In best mode, the thickness of left rail vertical slide plate 38 is about 0.75 inches. The inner surface of left rail vertical slide plate 38 is rigidly attached to the outer side of left rail spacer 36 so that the first end of left rail vertical slide plate 38 is flush with the first end of left rail spacer 36, the second end of left rail vertical slide plate 38 is flush with the second end of left rail spacer 36, the lower edge of left rail vertical slide plate 38 is flush with the lower side of left rail spacer 36, and the upper edge of left rail vertical slide plate 38 is flush with the upper side of left rail spacer 36. Rigid attachment may be accomplished by any known means such as: weld, solder, glue, epoxy, adhesive, bolts, screws, rivets, clips, snaps, pins, or fasteners. In best mode, rigid attachment is accomplished by fasteners. Left rail vertical slide plate 38 functions as a slip-plate or a low-friction layer between outer side of left rail spacer 36 and the inner side of the left sliding frame rail 50. Since left rail vertical slide plate 38 is attached to left rail spacer 36, the sliding occurs between the outer surface of left rail vertical slide plate 38 and the inner side of the web on the left sliding frame rail 50.

Left rail horizontal slide plate 40 is a rigid sheet of low friction material. Low friction material is typically plastic or composite material such as nylon, acetal, PTFE, graphite, UHMW, or similar. In best mode, left rail horizontal slide plate 40 is made of UHMW or ultra-high molecular weight polyethylene. Left rail horizontal slide plate 40 has a length, a width, a thickness, a longitudinal axis, an upper surface, a lower surface, a first end, a second end, an inner edge, and an outer edge. The length of left rail horizontal slide plate 40 is equivalent to that of the left rail spacer 36. The width of left rail horizontal slide plate 40 is less than that of the left rail spacer 36. In best mode, the thickness of left rail horizontal slide plate 40 is about 0.75 inches. The upper surface of left rail horizontal slide plate 40 is rigidly attached to the lower side of left rail spacer 36 so that the first end of left rail horizontal slide plate 40 is flush with the first end of left rail spacer 36, the second end of left rail horizontal slide plate 40 is flush with the second end of left rail spacer 36, and the outer edge of left rail horizontal slide plate 40 is flush with the outer side of left rail spacer 36. Rigid attachment may be accomplished by any known means such as: weld, solder, glue, epoxy, adhesive, bolts, screws, rivets, clips, snaps, pins, or fasteners. In best mode, rigid attachment is accomplished by fasteners. Left rail horizontal slide plate 40 functions as a slip-plate or a low-friction layer between the lower side of left rail spacer 36 and the upper surface of the right flange of the left sliding frame rail 50. Since left rail horizontal slide plate 40 is attached to left rail spacer 36, the sliding occurs between the lower surface of left rail horizontal slide plate 40 and the upper surface of the right flange of the left sliding frame rail 50.

Right rail spacer 42 is a length of rigid support structure or rectangular tubular steel. Right rail spacer 42 has a length, width, height, longitudinal axis, an inner side, an upper side, a lower side, a first end, and a second end. The length of right spacer 42 is essentially equivalent to that of the right stationary frame rail 32. The inner side of right rail spacer 42 is rigidly attached to the outer side of right stationary frame rail 32 so that the first end of right rail spacer 42 coincides with and is aligned with the first end of right stationary frame rail 32, the second end of right rail spacer 42 coincides with and is aligned with the second end of right stationary frame rail 32, and the longitudinal axis of right rail spacer 42 is parallel with that of right stationary frame rail 32. The right rail spacer 42 is attached to the web portion of right stationary frame rail 32 as depicted. The width of right rail spacer 42 must be greater than half the width of right stationary frame rail 32. Right rail spacer 42 functions as a spacer between the right stationary frame rail 32 and right sliding frame rail 52 to allow these two I-beams to longitudinally slidably attach or connect to each other or rub against each other without the flange of one I-beam touching the web of the other I-beam. Rigid attachment may be accomplished by any known means such as: weld, solder, glue, epoxy, adhesive, bolts, screws, rivets, clips, snaps, pins, or fasteners. In best mode, rigid attachment is accomplished by fasteners.

Right rail vertical slide plate 44 is a rigid sheet of low friction material. Low friction material is typically plastic or composite material such as nylon, acetal, PTFE, graphite, UHMW, or similar. In best mode, right rail vertical slide plate 44 is made of UHMW or ultra-high molecular weight polyethylene. Right rail vertical slide plate 44 has a length, a height, a thickness, a longitudinal axis, an inner surface, an outer surface, a first end, a second end, an upper edge, and a lower edge. The length of right rail vertical slide plate 44 is equivalent to that of the right rail spacer 42. The height of right rail vertical slide plate 44 is equivalent to that of the right rail spacer 42. In best mode, the thickness of right rail vertical slide plate 44 is about 0.75 inches. The inner surface of right rail vertical slide plate 44 is rigidly attached to the outer side of right rail spacer 42 so that the first end of right rail vertical slide plate 44 is flush with the first end of right rail spacer 42, the second end of right rail vertical slide plate 44 is flush with the second end of right rail spacer 42, the lower edge of right rail vertical slide plate 44 is flush with the lower side of right rail spacer 42, and the upper edge of right rail vertical slide plate 44 is flush with the upper side of right rail spacer 42. Rigid attachment may be accomplished by any known means such as: weld, solder, glue, epoxy, adhesive, bolts, screws, rivets, clips, snaps, pins, or fasteners. In best mode, rigid attachment is accomplished by fasteners. Right rail vertical slide plate 44 functions as a slip-plate or a low-friction layer between outer side of right rail spacer 42 and the inner side of the right sliding frame rail 52. Since right rail vertical slide plate 38 is attached to right rail spacer 42, the sliding occurs between the outer surface of right rail vertical slide plate 44 and the inner side of the web on the right sliding frame rail 52.

Right rail horizontal slide plate 46 is a rigid sheet of low friction material. Low friction material is typically plastic or composite material such as nylon, acetal, PTFE, graphite, UHMW, or similar. In best mode, right rail horizontal slide plate 46 is made of UHMW or ultra-high molecular weight polyethylene. Right rail horizontal slide plate 46 has a length, a width, a thickness, a longitudinal axis, an upper surface, a lower surface, a first end, a second end, an inner edge, and an outer edge. The length of right rail horizontal slide plate 46 is equivalent to that of the right rail spacer 42. The width of right rail horizontal slide plate 46 is less than that of the right rail spacer 42. In best mode, the thickness of right rail horizontal slide plate 46 is about 0.75 inches. The upper surface of right rail horizontal slide plate 46 is rigidly attached to the lower side of right rail spacer 42 so that the first end of right rail horizontal slide plate 46 is flush with the first end of right rail spacer 42, the second end of right rail horizontal slide plate 46 is flush with the second end of right rail spacer 42, and the outer edge of right rail horizontal slide plate 46 is flush with the outer side of right rail spacer 42. Rigid attachment may be accomplished by any known means such as: weld, solder, glue, epoxy, adhesive, bolts, screws, rivets, clips, snaps, pins, or fasteners. In best mode, rigid attachment is accomplished by fasteners. Right rail horizontal slide plate 46 functions as a slip-plate or a low-friction layer between the lower side of right rail spacer 42 and the upper surface of the left flange of the right sliding frame rail 52. Since right rail horizontal slide plate 46 is attached to right rail spacer 42, the sliding occurs between the lower surface of right rail horizontal slide plate 46 and the upper surface of the left flange of the right sliding frame rail 52.

Trailer with extendable deck 5 further comprises: a left sliding frame rail 50; a right sliding frame rail 52; a plurality of sliding rail cross members 54; a plurality of left sliding cross member spacers 56; a plurality of left sliding cross member flat bars 58; a plurality of left sliding cross member slide plates 60; a plurality of right sliding cross member spacers 62; a plurality of right sliding cross member flat bars 64; and a plurality of right sliding cross member slide plates 66.

Left sliding frame rail 50 is a part of the frame of the trailer. Left sliding frame rail 50 is a length of steel I-beam, which is a structural member with an I-shaped or H-shaped cross-section. The horizontal elements of the "I" are called flanges, and the vertical element is known as the web. The web resists shear forces, while the flanges resist most of the bending moment experienced by the beam. Left sliding frame rail 50 has: length, a width, a height, a longitudinal axis, a latitudinal axis, an inner side, an outer side, an upper side, a lower side, a first end, and a second end. The web of the I-beam is positioned vertically, and thus the flanges of the I-beam are horizontal. The first end of left sliding frame rail 50 is not attached to any structural members. Thus, the first end of left sliding frame rail 50 is free floating. The second end of left sliding frame rail 50 is rigidly attached to the front side of ramp assembly 26. Rigid attachment may be accomplished by any known means such as: weld, solder, glue, epoxy, adhesive, bolts, screws, rivets, clips, snaps, pins, or fasteners. In best mode, rigid attachment is accomplished by welding. Left sliding frame rail 50 is parallel with right sliding frame rail 52. The left sliding frame rail 50 helps form the left side of the trailer at the rear of the trailer. The left sliding frame rail 50 functions by mating with left stationary frame rail 30 and sliding along left stationary rail 30 in order to extend and retract the sliding deck section.

Right sliding frame rail 52 is a part of the frame of the trailer. Right sliding frame rail 52 is a length of steel I-beam, which is a structural member with an I-shaped or H-shaped cross-section. The horizontal elements of the "I" are called flanges, and the vertical element is known as the web. The web resists shear forces, while the flanges resist most of the bending moment experienced by the beam. Right sliding frame rail 52 has: length, a width, a height, a longitudinal axis, an inner side, an outer side, an upper side, a lower side, a latitudinal axis, a first end, and a second end. The web of the I-beam is positioned vertically, and thus the flanges of the I-beam are horizontal. The first end of right sliding frame rail 52 is not attached to any structural members. Thus, the first end of right sliding frame rail 52 is free floating. The second end of right sliding frame rail 52 is rigidly attached to the front side of ramp assembly 26. Rigid attachment may be accomplished by any known means such as: weld, solder, glue, epoxy, adhesive, bolts, screws, rivets, clips, snaps, pins, or fasteners. In best mode, rigid attachment is accomplished by welding. The right sliding frame rail 52 helps form the right side of the trailer at the rear of the trailer. The right sliding frame rail 52 functions by mating with right stationary frame rail 32 and sliding along right stationary rail 32 in order to extend and retract the sliding deck section.

Each of the plurality of sliding rail cross members 54 is a length of rigid support structure. Each of the plurality of sliding rail cross members 54 may be a length of tubular steel, C-channel steel, angled steel, flat bar steel, or solid rod steel. Each of the plurality of sliding rail cross members 54 has a length, width, height, longitudinal axis, an upper surface, a lower surface, a first end, a second end, a front surface, and an outer rear surface. Each of the plurality of sliding rail cross members 54 is evenly spaced along the length of left and right sliding frame rails 50,52 and indirectly rigidly attached to both the left and right sliding frame rails 50,52 with the longitudinal axis of each of the plurality of sliding rail cross members 54 perpendicular to the longitudinal axis of the left and right sliding frame rails 50,52. Each first end of each sliding rail cross member 54 is attached to the lower side of left sliding frame rail 50 via a left sliding cross member spacer 56 and a left sliding cross member flat bar 58, as discussed below. Each second end of each sliding rail cross member 54 is attached to the lower side of right sliding frame rail 52 via a right sliding cross member spacer 62 and a right sliding cross member flat bar 64, as discussed below.

The first sliding rail cross member 54 is located at the first end of left and right sliding frame rails 50,52. The last sliding rail cross member 54 is located at the second end of left and right sliding frame rails 50,52.

The first end of each of the plurality of sliding rail cross members 54 is rigidly attached to the lower side of left sliding frame rail 50 so that the longitudinal axis of each sliding rail cross member 54 is perpendicular to that of the left sliding frame rail 50. The second end of each of the plurality of sliding rail cross members 54 is rigidly attached to the lower side of right sliding frame rail 52 so that the longitudinal axis of each sliding rail cross members 54 is perpendicular to that of the right sliding frame rail 52. Rigid attachment may be accomplished by any known means such as: weld, solder, glue, epoxy, adhesive, bolts, screws, rivets, clips, snaps, pins, or fasteners. In best mode, rigid attachment is accomplished by fasteners.

Thus, left sliding frame rail 50, right sliding frame rail 52, and the plurality of sliding rail cross members 54 form a rigid structure that is shaped like a ladder or a rigid ladder structure. Of course, the rigid ladder structure in this case runs horizontally. The rigid ladder structure of left sliding frame rail 50, right sliding frame rail 52, and the plurality of sliding rail cross members 54 is slidably attached to the rigid ladder structure of left stationary frame rail 30, right stationary frame rail 32, and plurality of stationary rail cross members 34, wherein the rigid ladder structure of left sliding frame rail 50, right sliding frame rail 52, and the plurality of sliding rail cross members 54 is free to slide forwards and backwards along the rigid ladder structure of left stationary frame rail 30, right stationary frame rail 32, and plurality of stationary rail cross members 34. As discussed below, the rigid ladder structure of left sliding frame rail 50, right sliding frame rail 52, and the plurality of sliding rail cross members 54 slides along a plurality of slide plates 38,40, 44,46,60,66 that help facilitate said sliding.

The rigid ladder structure of left stationary frame rail 30, right stationary frame rail 32, and plurality of stationary rail cross members 34 remains still while the rigid ladder structure of left sliding frame rail 50, right sliding frame rail 52, and the plurality of sliding rail cross members 54 slides thereon.

Each of the plurality of left sliding cross member spacers 56 is a length of rigid support structure. Each of the plurality of left sliding cross member spacers 56 may be a length of tubular steel, C-channel steel, flat bar steel, or solid steel. Each of the plurality of left sliding cross member spacers 56 has a length, a width, a thickness, a longitudinal axis, an upper surface, a lower surface, a first end, a second end, a front surface, and a rear surface. The length of each left sliding cross member spacer 56 is slightly less than the width of left sliding frame rail 50. The width of each left sliding cross member spacer 56 the same as that of each sliding rail cross member 54. In best mode, the thickness of each left sliding cross member spacer 56 is about 1 inch. There is one left sliding cross member spacer 56 for each sliding rail cross member 54.

Each of the plurality of left sliding cross member flat bars 58 is a length of rigid support structure. Each of the plurality of left sliding cross member flat bars 58 may be a length of tubular steel, C-channel steel, flat bar steel, or solid steel. Each of the plurality of left sliding cross member flat bars 58 has a length, a width, a thickness, a longitudinal axis, an upper surface, a lower surface, a first end, a second end, a front surface, and a rear surface. The length of each left sliding cross member flat bar 58 is slightly less than the width of left stationary frame rail 30 plus the width of left sliding frame rail 50. The width of each left sliding cross member flat bar 58 is the same as that of each sliding rail cross member 54. In best mode, the thickness of each left sliding cross member flat bar 58 is 0.5 inches. There is one left sliding cross member flat bar 58 for each sliding rail cross member 54.

As stated, each first end or left end of each sliding rail cross member 54 is rigidly attached to the lower side, first end of left sliding frame rail 50 through a left sliding cross member spacer 56 and a left sliding cross member flat bar 58. This is accomplished as follows. The lower surface of each left sliding cross member flat bar 58 is rigidly attached to the upper surface of a sliding rail cross member 54 so that the first end of the left sliding cross member flat bar 58 is flush with the first end of the sliding rail cross member 54, the front surface of the left sliding cross member flat bar 58 is flush with the front surface of the sliding rail cross member 54, and the rear surface of the left sliding cross member flat bar 58 is flush with the rear surface of the sliding rail cross member 54. The upper surface of each left sliding cross member flat bar 58 is rigidly attached to the lower surface of a left sliding cross member spacer 56 so that the first end of the left sliding cross member flat bar 58 is flush with the first end of the left sliding cross member spacer 56, the front surface of the left sliding cross member flat bar 58 is flush with the front surface of the left sliding cross member spacer 56, and the rear surface of the left sliding cross member flat bar 58 is flush with the rear surface of the left sliding cross member spacer 56. The upper surface of each left sliding cross member spacer 56 is rigidly attached to the lower side of left sliding frame rail 50 so that the first end of the left sliding cross member spacer 56 is flush with the first end of the sliding rail cross member 54, the front surface of the left sliding cross member flat bar 58 is flush with the front surface of the sliding rail cross member 54, and the rear surface of the left sliding cross member flat bar 58 is flush with the rear surface of the sliding rail cross member 54.

Each of the plurality of left sliding cross member slide plates 60 is a rigid sheet of low friction material. Low friction material is typically plastic or composite material such as nylon, acetal, PTFE, graphite, UHMW, or similar. In best mode, left sliding cross member slide plate 60 is made of UHMW or ultra-high molecular weight polyethylene. There is one left sliding cross member slide plate 60 for each sliding rail cross member 54. Each of the plurality of left sliding cross member slide plates 60 has a length, a width, a thickness, a longitudinal axis, an upper surface, a lower surface, a first end, a second end, a front edge, and a rear edge. The length of each left sliding cross member slide plate 60 is equivalent to the width of left stationary frame rail 30. The width of each left sliding cross member slide plate 60 is equivalent to that of sliding rail cross member 54. In best mode, the thickness of each left sliding cross member slide plate 60 is about 0.75 inches. The lower surface of each left sliding cross member slide plate 60 is rigidly attached to the upper surface of left sliding member flat bar 58 so that the first end of each left sliding cross member slide plate 60 is flush with the outer side of left stationary frame rail 30, the second end of each left sliding cross member slide plate 60 is flush with the inner end of left stationary frame rail 30, the front edge of each left sliding cross member slide plate 60 is flush with the front surface of left sliding cross member flat bar 58, and the rear edge of each left sliding cross member slide plate 60 is flush with the rear surface of left sliding cross member flat bar 58, when the left stationary frame rail 30 is positioned onto the left sliding cross member slide plate 60 as depicted. Rigid attachment may be accomplished by any known means such as: weld, solder, glue, epoxy, adhesive, bolts, screws, rivets, clips, snaps, pins, or fasteners. In best mode, rigid attachment is accomplished by fasteners.

Each of the plurality of right sliding cross member spacers 62 is a length of rigid support structure. Each of the plurality of right sliding cross member spacers 62 may be a length of tubular steel, C-channel steel, flat bar steel, or solid steel. Each of the plurality of right sliding cross member spacers 62 has a length, a width, a thickness, a longitudinal axis, an upper surface, a lower surface, a first end, a second end, a front surface, and a rear surface. The length of each right sliding cross member spacer 62 is slightly less than the width of right sliding frame rail 52. The width of each right sliding cross member spacer 62 is the same as that of each sliding rail cross member 54. In best mode, the thickness of each right sliding cross member spacer 62 is 1 inch. There is one right sliding cross member spacer 62 for each sliding rail cross member 54.

Each of the plurality of right sliding cross member flat bars 64 is a length of rigid support structure. Each of the plurality of right sliding cross member flat bars 64 may be a length of tubular steel, C-channel steel, flat bar steel, or solid steel. Each of the plurality of right sliding cross member flat bars 64 has a length, a width, a thickness, a longitudinal axis, an upper surface, a lower surface, a first end, a second end, a front surface, and a rear surface. The length of each right sliding cross member flat bar 64 is slightly less than the width of right stationary frame rail 32 plus the width of right sliding frame rail 52. The width of each right sliding cross member flat bar 64 is the same as that of each sliding rail cross member 54. In best mode, the thickness of each right sliding cross member flat bar 64 is 0.5 inches. There is one right sliding cross member flat bars 64 for each sliding rail cross member 54.

As stated, each second end or right end of each sliding rail cross member 54 is rigidly attached to the lower side, second end of right sliding frame rail 52 through a right sliding cross member spacer 62 and a right sliding cross member flat bar 64. This is accomplished as follows. The lower surface of each right sliding cross member flat bar 64 is rigidly attached to the upper surface of a sliding rail cross member 54 so that the first end of the right sliding cross member flat bar 64 is flush with the second end of the sliding rail cross member 54, the front surface of the right sliding cross member flat bar 64 is flush with the front surface of the sliding rail cross member 54, and the rear surface of the right sliding cross member flat bar 64 is flush with the rear surface of the sliding rail cross member 54. The upper surface of each right sliding cross member flat bar 64 is rigidly attached to the lower surface of a right sliding cross member spacer 62 so that the first end of the right sliding cross member flat bar 64 is flush with the first end of the right sliding cross member spacer 62, the front surface of the right sliding cross member flat bar 64 is flush with the front surface of the right sliding cross member spacer 62, and the rear surface of the right sliding cross member flat bar 64 is flush with the rear surface of the right sliding cross member spacer 62. The upper surface of each right sliding cross member spacer 62 is rigidly attached to the lower side of right sliding frame rail 52 so that the first end of the right sliding cross member spacer 62 is flush with the second end of the sliding rail cross member 54, the front surface of the right sliding cross member flat bar 64 is flush with the front surface of the sliding rail cross member 54, and the rear surface of the right sliding cross member flat bar 64 is flush with the rear surface of the sliding rail cross member 54.

Each of the plurality of right sliding cross member slide plates 66 is a rigid sheet of low friction material. Low friction material is typically plastic or composite material such as nylon, acetal, PTFE, graphite, UHMW, or similar. In best mode, right sliding cross member slide plate 66 is made of UHMW or ultra-high molecular weight polyethylene. There is one right sliding cross member slide plate 66 for each sliding rail cross member 54. Each of the plurality of right sliding cross member slide plates 66 has a length, a width, a thickness, a longitudinal axis, an upper surface, a lower surface, a first end, a second end, a front edge, and a rear edge. The length of each right sliding cross member slide plate 66 is equivalent to the width of right stationary frame rail 32. The width of each right sliding cross member slide plate 66 is equivalent to that of sliding rail cross member 54. In best mode, the thickness of each right sliding cross member slide plate 66 is about 0.75 inches. The lower surface of each right sliding cross member slide plate 66 is rigidly attached to the upper surface of right sliding member flat bar 64 so that the first end of each right sliding cross member slide plate 66 is flush with the outer side of right stationary frame rail 32, the second end of each right sliding cross member slide plate 66 is flush with the inner end of right stationary frame rail 32, the front edge of each right sliding cross member slide plate 66 is flush with the front surface of right sliding cross member flat bar 64, and the rear edge of each right sliding cross member slide plate 66 is flush with the rear surface of right sliding cross member flat bar 64, when the right stationary frame rail 32 is positioned onto the right sliding cross member slide plate 66 as depicted. Rigid attachment may be accomplished by any known means such as: weld, solder, glue, epoxy, adhesive, bolts, screws, rivets, clips, snaps, pins, or fasteners. In best mode, rigid attachment is accomplished by fasteners.

Thus, the rigid ladder structure with the left and right sliding frame rails 50,52 is nested in or weaved into the rigid ladder structure with the left and right stationary frame rails 30,32 with slide plates 38,40,44,46, 60,66 at all contact surfaces between the two rigid ladder structures. This design allows for superior sliding and free motion between the two rigid ladder structures. It is important to note that this design also retains superior strength and rigidity and ability to carry extremely heavy loads because all weight on the sliding rigid ladder structure is transferred to the sliding rail cross members 54 and then to the axles 20, without putting any of the weight of the sliding rigid ladder structure and its load on the stationary rigid ladder structure. The weight of the stationary rigid ladder structure and its load is also transferred to the sliding rail cross members 54 and then to the axles 20. This is a superior design that prevents binding of the sliding mechanisms described above and also keeps the sliding deck portion solid and locked down firmly on the I-beams for safe transport of heavy loads. Special care must be taken during assembly of this complex design to insure that sliding frame rails 50,52 are properly located and nested within stationary frame rails 30,32 with all slide plates exactly lining up to yield proper extension and retraction of the deck and also proper load transfer to the axles 20.

Trailer with extendable deck 5 further comprises: a hydraulic motor 80; a hydraulic motor drive sprocket 82; a hydraulic motor drive chain 84; a front roller chain axle 90; a rear roller chain axle 92; a front roller chain axle drive sprocket 94; a left roller chain 96; a right roller chain 98; a left front roller chain axle sprocket 100; a left rear roller chain axle sprocket 102; a left roller chain connection to first sliding frame rail cross member 106; a right front roller chain axle sprocket 110; a right rear roller chain axle sprocket 112; and a right roller chain connection to first sliding frame rail cross member 116. These elements comprise the drive mechanism for the sliding rigid ladder structure with the left and right sliding frame rails 50,52. The drive mechanism essentially works like a garage door opener with two drive chains as described below.

Hydraulic motor 80 is a mechanical actuator that converts hydraulic pressure and flow into torque and angular displacement or rotation. The hydraulic motor is the rotary counterpart of the hydraulic cylinder as a linear actuator. Hydraulic motor 80 is a hydraulic motor in the normal use or definition of the phrase. Hydraulic motor 80 has a drive shaft that rotates. Hydraulic motor 80 is rigidly attached to the rear side of the bulkhead 14, left stationary frame rail 30, or right stationary frame rails 32 using bracketry. Hydraulic motor 80 is connected to an input hose line and to an output hose line, which are each connected to a hydraulic motor control lever 284 which is connected to a hydraulic pump 86. Any known type of hydraulic motor and hydraulic pump 86 may be used.

Hydraulic motor sprocket 82 is a profiled wheel with teeth that mesh with hydraulic motor drive chain 84. Hydraulic motor sprocket 82 is a wheel upon which radial projections engage a chain passing over it. Hydraulic motor sprocket 82 is a sprocket in the normal use and definition of the word. Hydraulic motor sprocket 82 is rigidly attached to the driveshaft on the hydraulic motor 80. Any known type of sprocket may be used.

Hydraulic motor drive chain 84 is a closed loop of roller chain or a connected flexible series of metal links. Hydraulic motor drive chain 84 has a length and a width. Any known type of roller chain may be used.

Front roller chain axle 90 is a central shaft, rod, or spindle for a rotating sprocket. Front roller chain axle 90 is an axle in the normal use or definition of the word. Front roller chain axle 90 has a first end, a second end, a mid-section, and a longitudinal axis. The first end of front roller chain axle 90 is pivotally attached to the inner side of stationary frame rail 30, near the first end or front of left stationary rail 30, with the longitudinal axis of front roller chain axle 90 perpendicular to that of left stationary rail 30. Bracketry and a bearing are used to facilitate this pivotal attachment. The second end of front roller chain axle 90 is pivotally attached to the inner side of right stationary frame rail 32, near the first end or front of left stationary rail 30, with the longitudinal axis of front roller chain axle 90 perpendicular to that of right stationary rail 32. Bracketry and a bearing are used to facilitate this pivotal attachment. Front roller chain axle 90 is attached so that it freely rotates around its longitudinal axis. Front roller chain axle 90 is free-rolling on the two mounting bearings or free from any load, torque, or lock mechanism.

Rear roller chain axle 92 is a central shaft, rod, or spindle for a rotating sprocket. Rear roller chain axle 92 is an axle in the normal use or definition of the word. Rear roller chain axle 92 has a first end, a second end, a mid-section, and a longitudinal axis. The first end of rear roller chain axle 92 is pivotally attached to the side of left stationary frame rail 30, near the second end or rear of left stationary frame rail 30, with the longitudinal axis of rear roller chain axle 92 perpendicular to that of left stationary frame rail 30. Bracketry and a bearing are used to facilitate this pivotal attachment. The second end of rear roller chain axle 92 is pivotally attached to the inner side of right stationary frame rail 32, near the second end or rear of left sliding rail 50, with the longitudinal axis of rear roller chain axle 92 perpendicular to that of right stationary frame rail 32. Bracketry and a bearing are used to facilitate this pivotal attachment. Rear roller chain axle 92 is attached so that it freely rotates around its longitudinal axis. Rear roller chain axle 92 is free-rolling on the two mounting bearings or free from any load, torque, or lock mechanism.

Front roller chain axle drive sprocket 94 is a profiled wheel with teeth that mesh with hydraulic motor drive chain 84. Front roller chain axle drive sprocket 94 is a wheel upon which radial projections engage a chain passing over it. Front roller chain axle drive sprocket 94 is a sprocket in the normal use and definition of the word. Front roller chain axle drive sprocket 94 is rigidly attached to the mid-section of front roller chain axle 90. Any known type of sprocket may be used.

The hydraulic motor drive chain 84 is installed around the hydraulic motor drive sprocket 82 and the front roller chain axle drive sprocket 94 to form a closed loop around these two sprockets. The hydraulic motor drive chain 84 connects these to sprockets so that the rotation of one sprocket causes the rotation of the other sprocket and vice versa.

Left roller chain 96 is a closed loop of roller chain or a connected flexible series of metal links. Left roller chain 96 has a length and a width. Any known type of roller chain may be used.

Right roller chain 98 is a closed loop of roller chain or a connected flexible series of metal links. Right roller chain 98 has a length and a width. Any known type of roller chain may be used.

Left front roller chain axle sprocket 100 is a profiled wheel with teeth that mesh with left roller chain 96. Left front roller chain axle sprocket 100 is a wheel upon which radial projections engage a chain passing over it. Left front roller chain axle sprocket 100 is a sprocket in the normal use and definition of the word. Left front roller chain axle sprocket 100 is rigidly attached to the front roller chain axle 90, near the first end of front roller chain axle 90. Any known type of sprocket may be used.

Left rear roller chain axle sprocket 102 is a profiled wheel with teeth that mesh with left roller chain 96. Left rear roller chain axle sprocket 102 is a wheel upon which radial projections engage a chain passing over it. Left rear roller chain axle sprocket 102 is a sprocket in the normal use and definition of the word. Left rear roller chain axle sprocket 102 is rigidly attached to the rear roller chain axle 92, near the first end of rear roller chain axle 92, and in alignment with the left front roller chain axle sprocket 100. Any known type of sprocket may be used.

The left roller chain 96 is installed around the left front roller chain axle sprocket 100 and the left rear roller chain axle sprocket 102 to form a closed loop around these two sprockets. The left roller chain 96 connects these to sprockets so that the rotation of one sprocket causes the rotation of the other sprocket and vice versa. The bottom portion of the loop of left roller chain 96 has a connection to the forward most sliding rail cross member 54 or the front sliding rail cross member 55. This connection is denoted by: left roller chain connection to front sliding rail cross member 106. Left roller chain connection to front sliding rail cross member 106 is a piece of hardware or bracketry that rigidly attaches a link in left roller chain 96 to the upper surface of front sliding rail cross member 55.

Right front roller chain axle sprocket 110 is a profiled wheel with teeth that mesh with right roller chain 98. Right front roller chain axle sprocket 110 is a wheel upon which radial projections engage a chain passing over it. Right front roller chain axle sprocket 110 is a sprocket in the normal use and definition of the word. Right front roller chain axle sprocket 110 is rigidly attached to the front roller chain axle 90, near the second end of front roller chain axle 90. Any known type of sprocket may be used.

Right rear roller chain axle sprocket 112 is a profiled wheel with teeth that mesh with right roller chain 98. Right rear roller chain axle sprocket 112 is a wheel upon which radial projections engage a chain passing over it. Right rear roller chain axle sprocket 112 is a sprocket in the normal use and definition of the word. Right rear roller chain axle sprocket 112 is rigidly attached to the rear roller chain axle 92, near the second end of rear roller chain axle 92, and in alignment with the right front roller chain axle sprocket 110. Any known type of sprocket may be used.

The right roller chain 98 is installed around the right front roller chain axle sprocket 110 and the right rear roller chain axle sprocket 112 to form a closed loop around these two sprockets. The right roller chain 98 connects these two sprockets so that the rotation of one sprocket causes the rotation of the other sprocket and vice versa. The bottom portion of the loop of right roller chain 98 has a connection to the forward most sliding rail cross member 54 or the front sliding rail cross member 55. This connection is denoted by: right roller chain connection to front sliding rail cross member 116. Right roller chain connection to front sliding rail cross member 116 is a piece of hardware or bracketry that rigidly attaches one link in right roller chain 98 to the upper surface of first sliding rail cross member 54. Right roller chain connection to front sliding rail cross member 116 is aligned with left roller chain connection to front sliding rail cross member 106 to keep first sliding rail cross member 54 exactly perpendicular to the frame rails.

The above elements form a drive system where the hydraulic motor 80 is connected to the hydraulic motor drive sprocket 82, which connected to the hydraulic motor drive chain 84, which connects to the front roller chain drive sprocket 94, which connects to the front roller drive chain axle 90, which connects to the left front and right front roller chain axle sprockets 100,110, which connect to the left and right roller chains 96,98, which connect to the left rear and right rear roller chain axle sprockets 102,112, which connect to the rear roller chain axle 92, wherein the hydraulic motor 80 powers the whole system and rotates left and right roller chains 98 as the hydraulic motor 80 rotates.

The hydraulic motor 80, axles 90,92, chains 84,96,98, sprockets 82,100,102,110,112, left roller chain connection to front sliding rail cross member 106, and right roller chain connection to front sliding rail cross member 116 form a drive system that extends and retracts the rigid ladder structure of left sliding frame rail 50, right sliding frame rail 52, and the plurality of sliding rail cross members 54. This occurs as follows. The hydraulic motor 80 is rigidly attached to the rigid ladder structure with the left and right stationary frame rails 30,32. The front roller chain axle 92 is rigidly attached to the rigid ladder structure with the left and right stationary frame rails 30,32. The rear roller chain axle 90 is also rigidly attached to the rigid ladder structure with left and right stationary frame rails 30,32. This provides a stable base for the hydraulic motor 80, axles 90,92, chains 84,96, 98, and sprockets 82,100,102,110,112 to rotate because the rigid ladder structure with the left and right stationary frame rails 30,32 is stable and does not move relative to the gooseneck assembly 10 and the bulkhead 14. Left roller chain connection to front sliding rail cross member 106 and right roller chain connection to front sliding rail cross member 116, on the other hand, are attached to the rigid ladder structure with the left and right sliding frame rails 50,52.

When the hydraulic motor runs one way, the rigid ladder structure of left sliding frame rail 50, right sliding frame rail 52 extends rearward from the rigid ladder structure of left stationary frame rail 30, right stationary frame rail 32. When the hydraulic motor runs the other way, the rigid ladder structure of left sliding frame rail 50, right sliding frame rail 52 retracts into the rear of rigid ladder structure of left stationary frame rail 30, right stationary frame rail 32. One could compare this drive system to a house hold garage door opener with two chains wherein the opener, chains, and sprockets are attached to the rigid ladder structure with left and right stationary frame rails 30,32, instead of the garage ceiling and wall, and the runner on the chain is attached to rigid ladder structure of left sliding frame rail 50, right sliding frame rail 52, instead of the garage door. The garage door is the rigid ladder structure of left sliding frame rail 50, right sliding frame rail 52 and the garage ceiling and wall is the rigid ladder structure of left stationary frame rail 30, right stationary frame rail 32.

Trailer with extendable deck 5 further comprises: a plurality of folding deck section left rails 70; a plurality of folding deck section right rails 72; a plurality of folding deck section cross members 74; a first folding deck section 120; a first folding deck section front hinge cross member 122; a plurality of first folding deck section front hinge forward knuckles 124; a plurality of first folding deck section front hinge rear knuckles 125; a first folding deck section front hinge pin 126; a first folding deck section rear hinge cross member 132; a first folding deck section rear hinge spacer 134; a plurality of first folding deck section rear hinge knuckles 136; a first folding deck section rear hinge pin 138; a second folding deck section 140; a second folding deck section front hinge cross member 142; a second folding deck section front hinge spacer 144; a plurality of first folding deck section front hinge knuckles 146; a second folding deck section rear hinge cross member 148; a plurality of second folding deck section rear hinge forward knuckles 150; a plurality of second folding deck section rear hinge rear knuckles 151; a second folding deck section rear hinge pin 152; a first deck lift arm 180; a first deck lift arm pivot point 182; a first deck lift arm roller 184; and a first deck lift arm hydraulic cylinder and piston 186.

Each of the plurality of the folding deck section left rails 70 is a length of rigid support structure. Each of the plurality of the folding deck section left rails 70 may be a length of tubular steel, C-channel steel, angled steel, flat bar steel, or solid rod steel. Each of the plurality of the folding deck section left rails 70 has a length, width, height, longitudinal axis, a first end, a second end, upper side, lower side, an inner side, and an outer side. Each of the plurality of the folding deck section left rails 70 is structural support or framing for the left side of a folding deck section.

Each of the plurality of the folding deck section right rails 72 is a length of rigid support structure. Each of the plurality of the folding deck section right rails 72 may be a length of tubular steel, C-channel steel, angled steel, flat bar steel, or solid rod steel. Each of the plurality of the folding deck section right rails 72 has a length, width, height, longitudinal axis, a first end, a second end, upper side, lower side, an inner side, and an outer side. Each of the plurality of the folding deck section right rails 72 is structural support or framing for the right side of a folding deck section.

Each of the plurality of folding deck section cross members 74 is a length of rigid support structure. Each of the plurality of folding deck section cross members 74 may be a length of tubular steel, C-channel steel, angled steel, flat bar steel, or solid rod steel. Each of the plurality of folding deck section cross members 74 has a length, width, height, longitudinal axis, a first end, a second end, an upper surface, a lower surface, a front surface, and a rear surface. Each of the plurality of folding deck section cross members 74 is structural support or frame running across the width of each folding deck section.

First folding deck section 120 is a rigid rectangular section of the trailer deck that folds in like an accordion or retracts to rest in a vertical position and also folds out like an accordion or extends to rest in a horizontal position. First folding deck section 120 is the forward most folding deck section. In the horizontal position, first folding deck section 120 has: an upper surface, a lower surface, a front side, a rear side, a left side, and a right side. First folding deck section 120 is assembled as follows. Orientation of all elements is described with all folding deck sections in the horizontal position.

A plurality of folding deck section cross members 74 is evenly spaced along the length of first folding deck section 120 and rigidly attached to a folding deck section left rail 70 and a folding deck section right rail 72 with the longitudinal axis of each folding deck section cross members 74 perpendicular to those of folding deck section left rail 70 and a folding deck section right rail 72. Each first end of each folding deck section cross members 74 is rigidly attached to the inner side of a folding deck section left rail 70 and each second end of each folding deck section cross members 74 is rigidly attached to the inner side of folding deck section right rail 72. There is a front folding deck section cross member 74 on first folding deck section 120 which is the folding deck section cross member 74 closest to the front of the trailer. There is a rear folding deck section cross member 74 on first folding deck section 120 which is the folding deck section cross member 74 closest to the rear of the trailer. A rigid rectangular planar member or a plurality of deck boards 76 is attached to the upper surfaces of each folding deck section cross member 74. In best mode, three folding deck section cross members 74 are used for first folding deck section 120. In best mode, rigid attachment is accomplished by welding.

First folding deck section front hinge cross member 122 is a length of rigid support structure or tubular steel. First folding deck section front hinge cross member 122 has a length, width, height, longitudinal axis, a first end, a second end, an upper surface, a lower surface, a front surface, and a rear surface. The length of first folding deck section front hinge cross member 122 is equivalent to that of folding deck section cross members 74. The rear surface of first folding deck section front hinge cross member 122 is rigidly attached to the front surface of the front folding deck section cross member 74 on first folding deck section 120 so that the first end of first folding deck section front hinge cross member 122 is flush with the first end of front folding deck section cross member 74, the second end of first folding deck section front hinge cross member 122 is flush with the second end of front folding deck section cross member 74, the lower surface of first folding deck section front hinge cross member 122 is flush with the lower surface of front folding deck section cross member 74, and the longitudinal axis of first folding deck section front hinge cross member 122 is parallel with that of front folding deck section cross member 74.

Each first folding deck section front hinge forward knuckle 124 is a component of a barrel hinge comprising: a plurality of first folding deck section front hinge forward knuckles 124; a plurality first folding deck section front hinge rear knuckles 125, and a first folding deck section front hinge pin 126. A barrel hinge is a type of hinge comprising two barrels and a hinge pin wherein the two barrels are pivotally attached to the hinge pin. With a standard barrel hinge, each barrel is typically connected to a leaf, where each leaf is rigidly attached to separate members to provide pivotal attachment of these members. A door hinge is a typical barrel hinge that pivotally attaches the door frame to a door, wherein one leaf is rigidly attached to the door frame and the other leaf is rigidly attached to the door. In this case, however, the two leaf sections of the barrel hinge are not present because each barrel is directly connected to the pivoting members without leaves. Each first folding deck section front hinge forward knuckle 124 is part of a segmented barrel that is rigidly attached to the rear side of bulkhead 14. Each first folding deck section front hinge forward knuckle 124 is a rigid hollow cylinder with open ends. Each first folding deck section front hinge forward knuckle 124 has: a center, a length, an outside diameter, an inside diameter, an outer surface, an inner surface, a longitudinal axis, a first end, and a second end. A plurality of first folding deck section front hinge forward knuckles 124 is equally spaced along the width of bulkhead 14 and rigidly attached to the rear surface of bulkhead 14 so that the longitudinal axes of each first folding deck section front hinge forward knuckle 124 are coincident with each other. In best mode, five first folding deck section front hinge forward knuckles 124 are used for first folding deck section 120. In best mode, rigid attachment is accomplished by welding.

Each first folding deck section front hinge rear knuckle 125 is a component of a barrel hinge comprising: a plurality first folding deck section front hinge forward knuckles 124; a plurality first folding deck section front hinge rear knuckles 125, and a first folding deck section front hinge pin 126. A barrel hinge is a type of hinge comprising two barrels and a hinge pin wherein the two barrels are pivotally attached to the hinge pin. With a standard barrel hinge, each barrel is typically connected to a leaf, where each leaf is rigidly attached to separate members to provide pivotal attachment of these members. A door hinge is a typical barrel hinge that pivotally attaches the door frame to a door, wherein one leaf is rigidly attached to the door frame and the other leaf is rigidly attached to the door. In this case, however, the two leaf sections of the barrel hinge are not present because each barrel is directly connected to the pivoting members without leaves. Each first folding deck section front hinge rear knuckle 125 is part of a segmented barrel that is rigidly attached to the front surface of first folding deck section front hinge cross member 122. Each first folding deck section front hinge rear knuckle 125 is a rigid hollow cylinder with open ends. Each first folding deck section front hinge rear knuckle 125 has: a center, a length, an outside diameter, an inside diameter, an outer surface, an inner surface, a longitudinal axis, a first end, and a second end. The length, outside diameter, and inside diameter of each first folding deck section front hinge rear knuckle 125 matches those of each first folding deck section front hinge forward knuckle 124. A plurality of first folding deck section front hinge rear knuckles 125 is equally spaced along the length of first folding deck section front hinge cross member 122 and rigidly attached to the front surface of first folding deck section front hinge cross member 122 so that the longitudinal axes of each first folding deck section front hinge rear knuckle 125 are coincident with each other. In best mode, five first folding deck section front hinge rear knuckles 125 are used for first folding deck section 120. In best mode, rigid attachment is accomplished by welding.

First folding deck section front hinge pin 126 is a component of a barrel hinge comprising: a plurality first folding deck section front hinge forward knuckles 124; a plurality first folding deck section front hinge rear knuckles 125, and first folding deck section front hinge pin 126. First folding deck section front hinge pin 126 is a rigid solid cylindrical member. First folding deck section front hinge pin 126 has: length, an outside diameter, a longitudinal axis, a first end, and a second end. The length of first folding deck section front hinge pin 126 is equivalent to that of first folding deck section front hinge cross member 122. The outer diameter of first folding deck section front hinge pin 126 is sized to make a slip fit or clearance fit with the inside diameter of first folding deck section front hinge forward knuckles 124 and first folding deck section front hinge rear knuckles 125. The plurality of first folding deck section front hinge forward knuckles 124 is aligned with the plurality of first folding deck section front hinge rear knuckles 125 so that the longitudinal axes of each knuckle 124,125 are coincident. Then the first folding deck front hinge pin 126 is driven through each knuckle 124,125 to pivotally attach the plurality of first folding deck section front hinge forward knuckles 124 to the plurality of first folding deck section front hinge rear knuckles 125 to create a hinged connection between these two members.

First folding deck section rear hinge cross member 132 is a length of rigid support structure or tubular steel. First folding deck section rear hinge cross member 132 has a length, width, height, longitudinal axis, a first end, a second end, an upper surface, a lower surface, a front surface, and a rear surface. The length of first folding deck section rear hinge cross member 132 is equivalent to that of first folding deck section front hinge cross member 122. The front surface of first folding deck section rear hinge cross member 132 is rigidly attached to the rear surface of the rear folding deck section cross member 74 on first folding deck section 120 so that the first end of first folding deck section rear hinge cross member 132 is flush with the first end of rear folding deck section cross member 74, the second end of first folding deck section rear hinge cross member 132 is flush with the second end of rear folding deck section cross member 74, the lower surface of first folding deck section rear hinge cross member 132 is flush with the lower surface of rear folding deck section cross member 74, and the longitudinal axis of first folding deck section rear hinge cross member 132 is parallel with that of rear folding deck section cross member 74.

First folding deck section rear hinge spacer 134 is a length of rigid support structure or tubular steel. First folding deck section rear hinge spacer 134 has a length, width, height, longitudinal axis, a first end, a second end, an upper surface, a lower surface, a front surface, and a rear surface. The length of first folding deck section rear hinge spacer 134 is equivalent to that of first folding deck section rear hinge cross member 132. The upper surface of first folding deck section rear hinge spacer 134 is rigidly attached to the lower surface of first folding deck section rear hinge cross member 132 so that the first end of first folding deck section rear hinge spacer 134 is flush with the first end of first folding deck section rear hinge cross member 132, the second end of first folding deck section rear hinge spacer 134 is flush with the second end of first folding deck section rear hinge cross member 132, the rear surface of first folding deck section rear hinge spacer 134 is flush with the rear surface of first folding deck section rear hinge cross member 132, and the longitudinal axis of first folding deck section rear hinge spacer 134 is parallel with that of first folding deck section rear hinge cross member 132.

Second folding deck section 140 is a section of the trailer deck that folds in like an accordion or retracts to rest in a vertical position and also folds out like an accordion or extends to rest in a horizontal position. Second folding deck section 140 is the second most forward folding deck section and is adjacent to first folding deck section 140. In the horizontal position, second folding deck section 140 has: an upper surface, a lower surface, a front side, a rear side, a left side, and a right side. Second folding deck section 140 is assembled as follows. Orientation of all elements is described with all folding deck sections in the horizontal position.

A plurality of folding deck section cross members 74 is evenly spaced along the length of second folding deck section 140 and rigidly attached to a folding deck section left rail 70 and a folding deck section right rail 72 with the longitudinal axis of each folding deck section cross members 74 perpendicular to those of folding deck section left rail 70 and a folding deck section right rail 72. Each first end of each folding deck section cross members 74 is rigidly attached to the inner side of a folding deck section left rail 70 and each second end of each folding deck section cross members 74 is rigidly attached to the inner side of folding deck section right rail 72. A rigid rectangular planar member or a plurality of deck boards 76 is attached to the upper surfaces of each folding deck section cross member 74. There is a front folding deck section cross member 74 on second folding deck section 140 which is the folding deck section cross member 74 on second folding deck section 140 closest to the front of the trailer. There is a rear folding deck section cross member 74 on second folding deck section 140 which is the folding deck section cross members 74 on second folding deck section 140 closest to the rear of the trailer. In best mode, three folding deck section cross members 74 are used for second folding deck section 140. In best mode, rigid attachment is accomplished by welding.

Second folding deck section front hinge cross member 142 is a length of rigid support structure or tubular steel. Second folding deck section front hinge cross member 142 has a length, width, height, longitudinal axis, a first end, a second end, an upper surface, a lower surface, a front surface, and a rear surface. The length of second folding deck section front hinge cross member 142 is equivalent to that of first folding deck section front hinge cross member 122. The rear surface of second folding deck section front hinge cross member 142 is rigidly attached to the front surface of the front folding deck section cross member 74 on second folding deck section 140 so that the first end of second folding deck section front hinge cross member 142 is flush with the first end of front folding deck section cross member 74, the second end of second folding deck section front hinge cross member 142 is flush with the second end of front folding deck section cross member 74, the lower surface of second folding deck section front hinge cross member 142 is flush with the lower surface of front folding deck section cross member 74, and the longitudinal axis of second folding deck section front hinge cross member 142 is parallel with that of front folding deck section cross member 74.

Second folding deck section front hinge spacer 144 is a length of rigid support structure or tubular steel. Second folding deck section front hinge spacer 144 has a length, width, height, longitudinal axis, a first end, a second end, an upper surface, a lower surface, a front surface, and a rear surface. The length of second folding deck section front hinge spacer 144 is equivalent to that of second folding deck section front hinge cross member 142. The upper surface of second folding deck section front hinge spacer 144 is rigidly attached to the lower surface of second folding deck section front hinge cross member 142 so that the first end of second folding deck section front hinge spacer 144 is flush with the first end of second folding deck section front hinge cross member 142, the second end of second folding deck section front hinge spacer 144 is flush with the second end of second folding deck section front hinge cross member 142, the front surface of second folding deck section front hinge spacer 144 is flush with the front surface of second folding deck section front hinge cross member 142, and the longitudinal axis of second folding deck section front hinge spacer 144 is parallel with that of second folding deck section front hinge cross member 142.

Each first folding deck section rear hinge knuckle 136 is a component of a barrel hinge comprising: a plurality of first folding deck section rear hinge knuckles 136; a plurality of second folding deck section front hinge knuckles 146, and a first folding deck section rear hinge pin 138. A barrel hinge is a type of hinge comprising two barrels and a hinge pin wherein the two barrels are pivotally attached to the hinge pin. With a standard barrel hinge, each barrel is typically connected to a leaf, where each leaf is rigidly attached to separate members to provide pivotal attachment of these members. A door hinge is a typical barrel hinge that pivotally attaches the door frame to a door, wherein one leaf is rigidly attached to the door frame and the other leaf is rigidly attached to the door. In this case, however, the two leaf sections of the barrel hinge are not present because each barrel is directly connected to the pivoting members without leaves. Each first folding deck section rear hinge knuckle 136 is part of a segmented barrel that is rigidly attached to first folding deck section rear hinge spacer 134. Each first folding deck section rear hinge knuckle 136 is a rigid hollow cylinder with open ends. Each first folding deck section rear hinge knuckle 136 has: a center, a length, an outside diameter, an inside diameter, an outer surface, an inner surface, a longitudinal axis, a first end, and a second end. A plurality of first folding deck section rear hinge knuckles 136 is equally spaced along the length of first folding deck section rear hinge spacer 134 and rigidly attached to the first folding deck section rear hinge spacer 134 so that the longitudinal axes of each first folding deck section rear hinge knuckle 136 are coincident with each other. The outer surface of each first folding deck section rear hinge knuckle 136 is rigidly attached to the lower surface of first folding deck section rear hinge spacer 134, adjacent to the rear surface of first folding deck section rear hinge spacer 134. In best mode, five first folding deck section rear hinge knuckles 136 are used. In best mode, rigid attachment is accomplished by welding.

Each second folding deck section front hinge knuckle 146 is a component of a barrel hinge comprising: a plurality of first folding deck section rear hinge knuckles 136; a plurality of second folding deck section front hinge knuckles 146, and a first folding deck section rear hinge pin 138. A barrel hinge is a type of hinge comprising two barrels and a hinge pin wherein the two barrels are pivotally attached to the hinge pin. With a standard barrel hinge, each barrel is typically connected to a leaf, where each leaf is rigidly attached to separate members to provide pivotal attachment of these members. A door hinge is a typical barrel hinge that pivotally attaches the door frame to a door, wherein one leaf is rigidly attached to the door frame and the other leaf is rigidly attached to the door. In this case, however, the two leaf sections of the barrel hinge are not present because each barrel is directly connected to the pivoting members without leaves. Each second folding deck section front hinge knuckle 146 is part of a segmented barrel that is rigidly attached to the second folding deck section front hinge spacer 144. Each second folding deck section front hinge knuckle 146 is a rigid hollow cylinder with open ends. Each second folding deck section front hinge knuckle 146 has: a center, a length, an outside diameter, an inside diameter, a longitudinal axis, a first end, and a second end. The length, outside diameter, and inside diameter of each second folding deck section front hinge knuckles 146 matches those of each first folding deck section rear hinge knuckle 136. A plurality of second folding deck section front hinge knuckle 146 is equally spaced along the length of second folding deck section front hinge spacer 144 and rigidly attached to the second folding deck section front hinge spacer 144 so that the longitudinal axes of each second folding deck section front hinge knuckle 136 are coincident with each other. The outer surface of each second folding deck section front hinge knuckle 146 is rigidly attached to the lower surface of second folding deck section front hinge spacer 144, adjacent to the front surface of second folding deck section front hinge spacer 144. In best mode, five second folding deck section front hinge knuckles 146 are used. In best mode, rigid attachment is accomplished by welding.

First folding deck section rear hinge pin 138 is a component of a barrel hinge comprising: a plurality of first folding deck section rear hinge knuckles 136; a plurality of second folding deck section front hinge knuckles 146, and a first folding deck section rear hinge pin 138. First folding deck section rear hinge pin 138 is a rigid solid cylindrical member. First folding deck section rear hinge pin 138 has: length, an outside diameter, a longitudinal axis, a first end, and a second end. The length of first folding deck section rear hinge pin 138 is equivalent to that of first folding deck section rear hinge cross member 132. The outer diameter of first folding deck section rear hinge pin 138 is sized to make a slip fit or clearance fit with the inside diameter of first folding deck section rear hinge knuckles 136 and the inside diameter of second folding deck section front hinge knuckles 146. The plurality of first folding deck section rear hinge knuckles 136 is aligned with the plurality of second folding deck section front hinge knuckles 146 so that the longitudinal axes of each knuckle 136,146 are coincident. Then the first folding deck rear hinge pin 138 is driven through each knuckle 136,146 to pivotally attach the plurality of first folding deck section rear hinge knuckles 136 to the plurality of second folding deck section front hinge knuckles 125 to create a hinged connection between these two members.

Second folding deck section rear hinge cross member 148 is a length of rigid support structure or tubular steel. Second folding deck section rear hinge cross member 148 has a length, width, height, longitudinal axis, a first end, a second end, an upper surface, a lower surface, a front surface, and a rear surface. The length of second folding deck section rear hinge cross member 148 is equivalent to that of second folding deck section front hinge cross member 142. The front surface of second folding deck section rear hinge cross member 148 is rigidly attached to the rear surface of the rear folding deck section cross member 74 on second folding deck section 140 so that the first end of second folding deck section rear hinge cross member 148 is flush with the first end of rear folding deck section cross member 74, the second end of second folding deck section rear hinge cross member 148 is flush with the second end of rear folding deck section cross member 74, the lower surface of second folding deck section rear hinge cross member 148 is flush with the lower surface of rear folding deck section cross member 74, and the longitudinal axis of second folding deck section rear hinge cross member 148 is parallel with that of rear folding deck section cross member 74.

Each second folding deck section rear hinge forward knuckle 150 is a component of a barrel hinge comprising: a plurality of second folding deck section rear hinge forward knuckles 150; a plurality of second folding deck section rear hinge rear knuckles 151, and a second folding deck section rear hinge pin 152. A barrel hinge is a type of hinge comprising two barrels and a hinge pin wherein the two barrels are pivotally attached to the hinge pin. With a standard barrel hinge, each barrel is typically connected to a leaf, where each leaf is rigidly attached to separate members to provide pivotal attachment of these members. A door hinge is a typical barrel hinge that pivotally attaches the door frame to a door, wherein one leaf is rigidly attached to the door frame and the other leaf is rigidly attached to the door. In this case, however, the two leaf sections of the barrel hinge are not present because each barrel is directly connected to the pivoting members without leaves. Each second folding deck section rear hinge forward knuckle 150 is part of a segmented barrel that is rigidly attached to the rear surface of the second folding deck section rear hinge cross member 148. Each second folding deck section rear hinge forward knuckle 150 is a rigid hollow cylinder with open ends. Each second folding deck section rear hinge forward knuckles 150 has: a center, a length, an outside diameter, an inside diameter, an outer surface, an inner surface, a longitudinal axis, a first end, and a second end. A plurality of second folding deck section rear hinge forward knuckles 150 is equally spaced along the width of second folding deck section rear hinge cross member 148 and rigidly attached to the rear surface of second folding deck section rear hinge cross member 148 so that the longitudinal axes of each second folding deck section rear hinge forward knuckles 150 are coincident with each other. In best mode, five second folding deck section rear hinge forward knuckles 150 are used. In best mode, rigid attachment is accomplished by welding.

Each second folding deck section rear hinge rear knuckle 151 is a component of a barrel hinge comprising: a plurality of second folding deck section rear hinge forward knuckles 150; a plurality of second folding deck section rear hinge rear knuckles 151, and a second folding deck section rear hinge pin 152. A barrel hinge is a type of hinge comprising two barrels and a hinge pin wherein the two barrels are pivotally attached to the hinge pin. With a standard barrel hinge, each barrel is typically connected to a leaf, where each leaf is rigidly attached to separate members to provide pivotal attachment of these members. A door hinge is a typical barrel hinge that pivotally attaches the door frame to a door, wherein one leaf is rigidly attached to the door frame and the other leaf is rigidly attached to the door. In this case, however, the two leaf sections of the barrel hinge are not present because each barrel is directly connected to the pivoting members without leaves. Each second folding deck section rear hinge rear knuckle 151 is part of a segmented barrel that is rigidly attached to the runner cross member 160. Each second folding deck section rear hinge rear knuckle 151 is a rigid hollow cylinder with open ends. Each second folding deck section rear hinge rear knuckle 151 has: a center, a length, an outside diameter, an inside diameter, an outer surface, an inner surface, a longitudinal axis, a first end, and a second end. The length, outside diameter, and inside diameter of each second folding deck section rear hinge rear knuckle 151 matches those of each second folding deck section rear hinge forward knuckle 150. In the case of a trailer with only a first and second folding deck section 120,140, the plurality of second folding deck section rear hinge rear knuckles 151 is equally spaced along the length of the forward most sliding rail cross member 54 and rigidly attached to the front surface of the forward most sliding rail cross member 54 so that the longitudinal axes of each second folding deck section rear hinge rear knuckle 151 are coincident with each other. In the case of a trailer with a third and fourth folding deck section 200,220, the plurality of second folding deck section rear hinge rear knuckles 151 is equally spaced along the length of a folding deck runner cross member 160 and rigidly attached to the front surface of the folding deck runner cross member 160 so that the longitudinal axes of each second folding deck section rear hinge rear knuckle 151 are coincident with each other. In best mode, five second folding deck section rear hinge rear knuckles 151 are used. In best mode, rigid attachment is accomplished by welding.

Second folding deck section rear hinge pin 152 is a component of a barrel hinge comprising: a plurality of second folding deck section rear hinge forward knuckles 150; a plurality of second folding deck section rear hinge rear knuckles 151, and a second folding deck section rear hinge pin 152. Second folding deck section rear hinge pin 152 is a rigid hollow cylindrical member. Second folding deck section rear hinge pin 152 has: length, an outside diameter, a longitudinal axis, a first end, and a second end. The length of second folding deck section rear hinge pin 152 is equivalent to that of second folding deck section rear hinge cross member 148. The outer diameter of second folding deck section rear hinge pin 152 is sized to make a slip fit or clearance fit with the inside diameter of second folding deck section rear hinge forward knuckles 150 and second folding deck section rear hinge rear knuckles 151. The plurality of second folding deck section rear hinge forward knuckles 150 is aligned with the plurality of second folding deck section rear hinge rear knuckles 151 so that the longitudinal axes of each knuckle 150,151 are coincident. Then the second folding deck rear hinge pin 152 is driven through each knuckle 150,151 to pivotally attach the plurality of second folding deck section rear hinge forward knuckles 150 to the plurality of second folding deck section rear hinge rear knuckles 151 to create a hinged connection between these two members.

As stated above, first folding deck section 120 and second folding deck section 140 extend and retract like an accordion. After first folding deck section 120 and second folding deck section 140 are fully extended into the horizontal position, it can be difficult to raise them up in order to get them started and or moving into the retracted position. In order to help facilitate this, a lift mechanism is used.

The lift mechanism comprises: a first deck arm 180 and a first deck arm hydraulic cylinder and piston 186. First deck arm 180 is a rigid solid oblong member with an upper end, a first deck arm pivot point 182, and a lower end. The first deck arm pivot point 182 is located in between the upper end and the lower end of first deck arm 180. First deck arm 180 pivots or rotates around first deck arm pivot point 182. The first deck arm pivot point 182 is pivotally attached to the inner side of first or second stationary frame rails 30,32. First deck arm hydraulic cylinder and piston 186 is a standard hydraulic cylinder. First deck arm hydraulic cylinder and piston 186 has a piston end and a cylinder end. The lower end of first deck arm 180 is pivotally attached to the piston end of the first deck arm hydraulic cylinder and piston 186. The cylinder end of first deck arm hydraulic cylinder and piston 186 is pivotally attached to the inner side of left or right stationary rails 30,32. The upper end of first deck arm 180 is pivotally attached to first deck lift arm roller 184, which is a small wheel or roller. First deck lift arm roller 184 prevents the upper end of first deck arm 180 from binding as it pushes the first folding deck section 120 up, noting that first deck lift arm roller 184 travels along the lower surface of first folding deck section 120 during extension and during retraction. The first deck arm 180 is pivotally attached to the first or second stationary frame rails 30,32 at a location where the upper end of first deck arm 180 rests underneath rear portion of first folding deck section 120 when of first folding deck section 120 is in the horizontal position and the piston of first deck arm hydraulic cylinder and piston 186 is fully extended. Note that first deck arm pivot point 182 and cylinder end of first deck arm hydraulic cylinder and piston 186 are the only attachment points of this mechanism and the other ends and parts are free to rotate and move as the piston extends and retracts. First deck arm hydraulic cylinder and piston 186 is connected to an input hose line and to an output hose line, which are each connected to a lift arm control lever 282 which is connected to a hydraulic pump 86. Any known type of hydraulic pump 86 may be used. The first deck arm hydraulic cylinder and piston 186 is retracted to lift up the first folding deck section 120 and retract the first folding deck section 120. The first deck arm hydraulic cylinder and piston 186 is extended to extend the first folding deck section 120.

The above describes an embodiment of trailer with extendable deck 5 with first and second folding deck sections 120,140. A second embodiment is described below with the addition of third and fourth folding deck sections 200,220.

Trailer with extendable deck 5 may further comprise: a runner cross member 160; a third folding deck section 200; a third folding deck section front hinge cross member 202; a plurality of third folding deck section front hinge forward knuckles 204; a plurality of third folding deck section front hinge rear knuckles 205; a third folding deck section front hinge pin 206; a third folding deck section rear hinge cross member 212; a third folding deck section rear hinge spacer 214; a plurality of third folding deck section rear hinge knuckles 216; a third folding deck section rear hinge pin 218; a fourth folding deck section 220; a fourth folding deck section front hinge cross member 222; a fourth folding deck section front hinge spacer 224; a plurality of fourth folding deck section front hinge knuckles 226; a fourth folding deck section rear hinge cross member 228; a plurality of fourth folding deck section rear hinge forward knuckles 230; a plurality of fourth folding deck section rear hinge rear knuckles 232; a fourth folding deck section rear hinge pin 234; a second deck lift arm 240; a second deck lift arm pivot point 242; a second deck lift arm roller 244; and a second deck lift arm hydraulic cylinder and piston 246.

Runner cross member 160 is a length of rigid support structure or tubular steel. Runner cross member 160 has a length, width, height, longitudinal axis, a first end, a second end, an upper surface, a lower surface, a front surface, and a rear surface. The length of runner cross member 160 is equivalent to that of second folding deck section rear hinge cross member 148. The front surface of runner cross member 160 is rigidly attached to the plurality of second folding deck section rear hinge rear knuckles 151 as described above. The rear surface of runner cross member 160 is rigidly attached to a plurality of third folding deck section front hinge forward knuckles 204 as described below. The lower surface of runner cross member 160 is slidably attached to the upper side of left stationary rail 30 and the upper side of right stationary rail 32. This slidable attachment allows first, second, third, and fourth folding deck sections 120,140,200,220 to extend and retract properly without binding. This slidable attachment may be accomplished by any known means. One method of slidable attachment is with a first and second C-shaped member. The first C-shaped member is rigidly attached to the first end of runner cross member 160 wherein the C-shaped member faces inward and is designed to catch or clamp onto the upper outer flange of left stationary frame rail 30. The second C-shaped member is rigidly attached to the second end of runner cross member 160 wherein the C-shaped member faces inward and is designed to catch or clamp onto the upper outer flange of right stationary frame rail 32. In this way, the runner cross member 160 may free slide or move forward and rearward along the upper sides of left and right stationary rails 30,32.

Third folding deck section 200 is a section of the trailer deck that folds in like an accordion or retracts to rest in a vertical position and also folds out like an accordion or extends to rest in a horizontal position. Third folding deck section 200 is the third most forward folding deck section. In the horizontal position, third folding deck section 200 has: an upper surface, a lower surface, a front side, a rear side, a left side, and a right side. Third folding deck section 200 is assembled as follows. Orientation of all elements is described with all folding deck sections in the horizontal position. A plurality of folding deck section cross members 74 is evenly spaced along the length of third folding deck section 200 and rigidly attached to a folding deck section left rail 70 and a folding deck section right rail 72 with the longitudinal axis of each folding deck section cross members 74 perpendicular to those of folding deck section left rail 70 and a folding deck section right rail 72. Each first end of each folding deck section cross members 74 is rigidly attached to the inner side of a folding deck section left rail 70 and each second end of each folding deck section cross members 74 is rigidly attached to the inner side of folding deck section right rail 72. A rigid rectangular planar member or a plurality of deck boards 76 is attached to the upper surfaces of each folding deck section cross member 74. There is a front folding deck section cross member 74 on third folding deck section 200 which is the folding deck section cross member 74 closest to the front of the trailer. There is a rear folding deck section cross member 74 on third folding deck section 200 which is the folding deck section cross member 74 closest to the rear of the trailer. In best mode, three folding deck section cross members 74 are used for third folding deck section 200. In best mode, rigid attachment is accomplished by welding.

Third folding deck section front hinge cross member 202 is a length of rigid support structure or tubular steel. Third folding deck section front hinge cross member 202 has a length, width, height, longitudinal axis, a first end, a second end, an upper surface, a lower surface, a front surface, and a rear surface. The length of third folding deck section front hinge cross member 202 is equivalent to that of folding deck section cross members 74. The rear surface of third folding deck section front hinge cross member 202 is rigidly attached to the front surface of the front folding deck section cross member 74 on third folding deck section 200 so that the first end of third folding deck section front hinge cross member 202 is flush with the first end of front folding deck section cross member 74, the second end of third folding deck section front hinge cross member 202 is flush with the second end of front folding deck section cross member 74, the lower surface of third folding deck section front hinge cross member 202 is flush with the lower surface of front folding deck section cross member 74, and the longitudinal axis of third folding deck section front hinge cross member 202 is parallel with that of front folding deck section cross member 74.

Each third folding deck section front hinge forward knuckle 204 is a component of a barrel hinge comprising: a plurality of third folding deck section front hinge forward knuckles 204; a plurality of third folding deck section front hinge rear knuckles 205, and a third folding deck section front hinge pin 206. A barrel hinge is a type of hinge comprising two barrels and a hinge pin wherein the two barrels are pivotally attached to the hinge pin. With a standard barrel hinge, each barrel is typically connected to a leaf, where each leaf is rigidly attached to separate members to provide pivotal attachment of these members. A door hinge is a typical barrel hinge that pivotally attaches the door frame to a door, wherein one leaf is rigidly attached to the door frame and the other leaf is rigidly attached to the door. In this case, however, the two leaf sections of the barrel hinge are not present because each barrel is directly connected to the pivoting members without leaves. Each third folding deck section front hinge forward knuckle 204 is part of a segmented barrel that is rigidly attached to the rear side of runner cross member 160. Each third folding deck section front hinge forward knuckle 204 is a rigid hollow cylinder with open ends. Each third folding deck section front hinge forward knuckle 204 has: a center, a length, an outside diameter, an inside diameter, an outer surface, an inner surface, a longitudinal axis, a first end, and a second end. A plurality of third folding deck section front hinge forward knuckles 204 is equally spaced along the length of runner cross member 160 and rigidly attached to the rear surface of runner cross member 160 so that the longitudinal axes of each third folding deck section front hinge forward knuckle 204 are coincident with each other. In best mode, five third folding deck section front hinge forward knuckles 204 are used for third folding deck section 200. In best mode, rigid attachment is accomplished by welding.

Each third folding deck section front hinge rear knuckle 205 is a component of a barrel hinge comprising: a plurality of third folding deck section front hinge forward knuckles 204; a plurality of third folding deck section front hinge rear knuckles 205, and a third folding deck section front hinge pin 206. A barrel hinge is a type of hinge comprising two barrels and a hinge pin wherein the two barrels are pivotally attached to the hinge pin. With a standard barrel hinge, each barrel is typically connected to a leaf, where each leaf is rigidly attached to separate members to provide pivotal attachment of these members. A door hinge is a typical barrel hinge that pivotally attaches the door frame to a door, wherein one leaf is rigidly attached to the door frame and the other leaf is rigidly attached to the door. In this case, however, the two leaf sections of the barrel hinge are not present because each barrel is directly connected to the pivoting members without leaves. Each third folding deck section front hinge rear knuckle 205 is part of a segmented barrel that is rigidly attached to the front surface of third folding deck section front hinge cross member 202. Each third folding deck section front hinge rear knuckle 205 is a rigid hollow cylinder with open ends. Each third folding deck section front hinge rear knuckle 205 has: a center, a length, an outside diameter, an inside diameter, an outer surface, an inner surface, a longitudinal axis, a first end, and a second end. The length, outside diameter, and inside diameter of each third folding deck section front hinge rear knuckle 205 matches those of each third folding deck section front hinge forward knuckle 204. A plurality of third folding deck section front hinge rear knuckles 205 is equally spaced along the length of third folding deck section front hinge cross member 202 and rigidly attached to the front surface of third folding deck section front hinge cross member 202 so that the longitudinal axes of each third folding deck section front hinge rear knuckle 205 are coincident with each other. In best mode, five third folding deck section front hinge rear knuckles 205 are used for third folding deck section 200. In best mode, rigid attachment is accomplished by welding.

Third folding deck section front hinge pin 206 is a component of a barrel hinge comprising: a plurality of third folding deck section front hinge forward knuckles 204; a plurality of third folding deck section front hinge rear knuckles 205, and a third folding deck section front hinge pin 206 Third folding deck section front hinge pin 206 is a rigid solid cylindrical member. Third folding deck section front hinge pin 206 has: length, an outside diameter, a longitudinal axis, a first end, and a second end.

The length of third folding deck section front hinge pin 206 is equivalent to that of third folding deck section front hinge cross member 202. The outer diameter of third folding deck section front hinge pin 206 is sized to make a slip fit or clearance fit with the inside diameter of third folding deck section front hinge forward knuckles 204 and third folding deck section front hinge rear knuckles 205. The plurality of third folding deck section front hinge forward knuckles 204 is aligned with the plurality of third folding deck section front hinge rear knuckles 205 so that the longitudinal axes of each knuckle 204,205 are coincident. Then the third folding deck front hinge pin 206 is driven through each knuckle 204,205 to pivotally attach the plurality of third folding deck section front hinge forward knuckles 204 to the plurality of third folding deck section front hinge rear knuckles 205 to create a hinged connection between these two members.

Third folding deck section rear hinge cross member 212 is a length of rigid support structure or tubular steel. Third folding deck section rear hinge cross member 212 has a length, width, height, longitudinal axis, a first end, a second end, an upper surface, a lower surface, a front surface, and a rear surface. The length of third folding deck section rear hinge cross member 212 is equivalent to that of third folding deck section front hinge cross member 202. The front surface of third folding deck section rear hinge cross member 212 is rigidly attached to the rear surface of the rear folding deck section cross member 74 on third folding deck section 200 so that the first end of third folding deck section rear hinge cross member 212 is flush with the first end of rear folding deck section cross member 74, the second end of third folding deck section rear hinge cross member 212 is flush with the second end of rear folding deck section cross member 74, the lower surface of third folding deck section rear hinge cross member 212 is flush with the lower surface of rear folding deck section cross member 74, and the longitudinal axis of third folding deck section rear hinge cross member 212 is parallel with that of rear folding deck section cross member 74.

Third folding deck section rear hinge spacer 214 is a length of rigid support structure or tubular steel. Third folding deck section rear hinge spacer 214 has a length, width, height, longitudinal axis, a first end, a second end, an upper surface, a lower surface, a front surface, and a rear surface. The length of third folding deck section rear hinge spacer 214 is equivalent to that of third folding deck section rear hinge cross member 212. The upper surface of third folding deck section rear hinge spacer 214 is rigidly attached to the lower surface of third folding deck section rear hinge cross member 212 so that the first end of third folding deck section rear hinge spacer 214 is flush with the first end of third folding deck section rear hinge cross member 212, the second end of third folding deck section rear hinge spacer 214 is flush with the second end of third folding deck section rear hinge cross member 212, the rear surface of third folding deck section rear hinge spacer 214 is flush with the rear surface of third folding deck section rear hinge cross member 212, and the longitudinal axis of third folding deck section rear hinge spacer 214 is parallel with that of third folding deck section rear hinge cross member 212.

Fourth folding deck section 220 is a section of the trailer deck that folds in like an accordion or retracts to rest in a vertical position and also folds out like an accordion or extends to rest in a horizontal position. Fourth folding deck section 220 is the fourth most forward folding deck section and is adjacent to third folding deck section 200. In the horizontal position, fourth folding deck section 220 has: an upper surface, a lower surface, a front side, a rear side, a left side, and a right side. Fourth folding deck section 220 is assembled as follows. Orientation of all elements is described with all folding deck sections in the horizontal position.

A plurality of folding deck section cross members 74 is evenly spaced along the length of fourth folding deck section 220 and rigidly attached to a folding deck section left rail 70 and a folding deck section right rail 72 with the longitudinal axis of each folding deck section cross members 74 perpendicular to those of folding deck section left rail 70 and a folding deck section right rail 72. Each first end of each folding deck section cross members 74 is rigidly attached to the inner side of a folding deck section left rail 70 and each second end of each folding deck section cross members 74 is rigidly attached to the inner side of folding deck section right rail 72. A rigid rectangular planar member or a plurality of deck boards 76 is attached to the upper surfaces of each folding deck section cross member 74. There is a front folding deck section cross member 74 on fourth folding deck section 220 which is the folding deck section cross member 74 on fourth folding deck section 220 closest to the front of the trailer. There is a rear folding deck section cross member 74 on fourth folding deck section 220 which is the folding deck section cross members 74 on fourth folding deck section 220 closest to the rear of the trailer. In best mode, three folding deck section cross members 74 are used for fourth folding deck section 220. In best mode, rigid attachment is accomplished by welding.

Fourth folding deck section front hinge cross member 222 is a length of rigid support structure or tubular steel. Fourth folding deck section front hinge cross member 222 has a length, width, height, longitudinal axis, a first end, a second end, an upper surface, a lower surface, a front surface, and a rear surface. The length of fourth folding deck section front hinge cross member 222 is equivalent to that of third folding deck section rear hinge cross member 212. The rear surface of fourth folding deck section front hinge cross member 222 is rigidly attached to the front surface of the front folding deck section cross member 74 on fourth folding deck section 220 so that the first end of fourth folding deck section front hinge cross member 222 is flush with the first end of front folding deck section cross member 74, the second end of fourth folding deck section front hinge cross member 222 is flush with the second end of front folding deck section cross member 74, the lower surface of fourth folding deck section front hinge cross member 222 is flush with the lower surface of front folding deck section cross member 74, and the longitudinal axis of fourth folding deck section front hinge cross member 222 is parallel with that of front folding deck section cross member 74.

Fourth folding deck front hinge spacer 224 is a length of rigid support structure or tubular steel. Fourth folding deck front hinge spacer 224 has a length, width, height, longitudinal axis, a first end, a second end, an upper surface, a lower surface, a front surface, and a rear surface. The length of fourth folding deck front hinge spacer 224 is equivalent to that of fourth folding deck section front hinge cross member 222. The upper surface of fourth folding deck front hinge spacer 224 is rigidly attached to the lower surface of fourth folding deck section front hinge cross member 222 so that the first end of fourth folding deck front hinge spacer 224 is flush with the first end of fourth folding deck section front hinge cross member 222, the second end of fourth folding deck front hinge spacer 224 is flush with the second end of fourth folding deck section front hinge cross member 222, the front surface of fourth folding deck front hinge spacer 224 is flush with the front surface of fourth folding deck section front hinge cross member 222, and the longitudinal axis of fourth folding deck front hinge spacer 224 is parallel with that of fourth folding deck section front hinge cross member 222.

Each third folding deck section rear hinge knuckle 216 is a component of a barrel hinge comprising: a plurality of third folding deck section rear hinge knuckles 216; a plurality of fourth folding deck section front hinge knuckles 226, and a third folding deck section rear hinge pin 218. A barrel hinge is a type of hinge comprising two barrels and a hinge pin wherein the two barrels are pivotally attached to the hinge pin. With a standard barrel hinge, each barrel is typically connected to a leaf, where each leaf is rigidly attached to separate members to provide pivotal attachment of these members. A door hinge is a typical barrel hinge that pivotally attaches the door frame to a door, wherein one leaf is rigidly attached to the door frame and the other leaf is rigidly attached to the door. In this case, however, the two leaf sections of the barrel hinge are not present because each barrel is directly connected to the pivoting members without leaves. Each third folding deck section rear hinge knuckle 216 is part of a segmented barrel that is rigidly attached to third folding deck section rear hinge spacer 214. Each third folding deck section rear hinge knuckle 216 is a rigid hollow cylinder with open ends. Each third folding deck section rear hinge knuckle 216 has: a center, a length, an outside diameter, an inside diameter, an outer surface, an inner surface, a longitudinal axis, a first end, and a second end. A plurality of third folding deck section rear hinge knuckles 216 is equally spaced along the length of third folding deck section rear hinge spacer 214 and rigidly attached to the third folding deck section rear hinge spacer 214 so that the longitudinal axes of each third folding deck section rear hinge knuckle 216 are coincident with each other. The outer surface of each third folding deck section rear hinge knuckle 216 is rigidly attached to the lower surface of third folding deck section rear hinge spacer 214, adjacent to the rear surface of third folding deck section rear hinge spacer 214. In best mode, five third folding deck section rear hinge knuckles 216 are used. In best mode, rigid attachment is accomplished by welding.

Each fourth folding deck section front hinge knuckle 226 is a component of a barrel hinge comprising: a plurality of third folding deck section rear hinge knuckles 216; a plurality of fourth folding deck section front hinge knuckles 226, and a third folding deck section rear hinge pin 218. A barrel hinge is a type of hinge comprising two barrels and a hinge pin wherein the two barrels are pivotally attached to the hinge pin. With a standard barrel hinge, each barrel is typically connected to a leaf, where each leaf is rigidly attached to separate members to provide pivotal attachment of these members. A door hinge is a typical barrel hinge that pivotally attaches the door frame to a door, wherein one leaf is rigidly attached to the door frame and the other leaf is rigidly attached to the door. In this case, however, the two leaf sections of the barrel hinge are not present because each barrel is directly connected to the pivoting members without leaves. Each fourth folding deck section front hinge knuckle 226 is part of a segmented barrel that is rigidly attached to the fourth folding deck front hinge spacer 224. Each fourth folding deck section front hinge knuckle 226 is a rigid hollow cylinder with open ends. Each fourth folding deck section front hinge knuckle 226 has: a center, a length, an outside diameter, an inside diameter, a longitudinal axis, a first end, and a second end. The length, outside diameter, and inside diameter of each fourth folding deck section front hinge knuckles 226 matches those of each third folding deck section rear hinge knuckle 216. A plurality of fourth folding deck section front hinge knuckle 226 is equally spaced along the length of fourth folding deck front hinge spacer 224 and rigidly attached to the fourth folding deck front hinge spacer 224 so that the longitudinal axes of each fourth folding deck section front hinge knuckle 226 are coincident with each other. The outer surface of each fourth folding deck section rear hinge knuckle 226 is rigidly attached to the lower surface of fourth folding deck front hinge spacer 224, adjacent to the front surface of fourth folding deck front hinge spacer 224. In best mode, five fourth folding deck section front hinge knuckles 146 are used. In best mode, rigid attachment is accomplished by welding.

Third folding deck section rear hinge pin 218 is a component of a barrel hinge comprising: a plurality of third folding deck section rear hinge knuckles 216; a plurality of fourth folding deck section front hinge knuckles 226, and a third folding deck section rear hinge pin 218. Third folding deck section rear hinge pin 218 is a rigid solid cylindrical member. Third folding deck section rear hinge pin 218 has: length, an outside diameter, a longitudinal axis, a first end, and a second end.

The length of third folding deck section rear hinge pin 218 is equivalent to that of third folding deck section rear hinge cross member 202. The outer diameter of third folding deck section rear hinge pin 218 is sized to make a slip fit or clearance fit with the inside diameter of third folding deck section rear hinge knuckles 216 and the inside diameter of fourth folding deck section front hinge knuckles 226. The plurality of third folding deck section rear hinge knuckles 216 is aligned with the plurality of fourth folding deck section front hinge knuckles 226 so that the longitudinal axes of each knuckle 216,226 are coincident. Then the third folding deck rear hinge pin 218 is driven through each knuckle 216,226 to pivotally attach the plurality of third folding deck section rear hinge knuckles 216 to the plurality of fourth folding deck section front hinge knuckles 226 to create a hinged connection between these two members.

Fourth folding deck section rear hinge cross member 228 is a length of rigid support structure or tubular steel. Fourth folding deck section rear hinge cross member 228 has a length, width, height, longitudinal axis, a first end, a second end, an upper surface, a lower surface, a front surface, and a rear surface. The length of fourth folding deck section rear hinge cross member 228 is equivalent to that of fourth folding deck section front hinge cross member 222. The front surface of fourth folding deck section rear hinge cross member 228 is rigidly attached to the rear surface of the rear folding deck section cross member 74 on fourth folding deck section 220 so that the first end of fourth folding deck section rear hinge cross member 228 is flush with the first end of rear folding deck section cross member 74, the second end of fourth folding deck section rear hinge cross member 228 is flush with the second end of rear folding deck section cross member 74, the lower surface of fourth folding deck section rear hinge cross member 228 is flush with the lower surface of rear folding deck section cross member 74, and the longitudinal axis of fourth folding deck section rear hinge cross member 228 is parallel with that of rear folding deck section cross member 74.

Each fourth folding deck section rear hinge forward knuckle 230 is a component of a barrel hinge comprising: a plurality of fourth folding deck section rear hinge forward knuckles 230; a plurality of fourth folding deck section rear hinge rear knuckles 232, and a fourth folding deck section rear hinge pin 234. A barrel hinge is a type of hinge comprising two barrels and a hinge pin wherein the two barrels are pivotally attached to the hinge pin. With a standard barrel hinge, each barrel is typically connected to a leaf, where each leaf is rigidly attached to separate members to provide pivotal attachment of these members. A door hinge is a typical barrel hinge that pivotally attaches the door frame to a door, wherein one leaf is rigidly attached to the door frame and the other leaf is rigidly attached to the door. In this case, however, the two leaf sections of the barrel hinge are not present because each barrel is directly connected to the pivoting members without leaves. Each fourth folding deck section rear hinge forward knuckle 230 is part of a segmented barrel that is rigidly attached to the rear surface of the fourth folding deck section rear hinge cross member 228. Each fourth folding deck section rear hinge forward knuckle 230 is a rigid hollow cylinder with open ends. Each fourth folding deck section rear hinge forward knuckle 150 has: a length, an outside diameter, an inside diameter, an outer surface, an inner surface, a longitudinal axis, a first end, and a second end. A plurality of fourth folding deck section rear hinge forward knuckles 230 is equally spaced along the width of fourth folding deck section rear hinge cross member 228 and rigidly attached to the rear surface of fourth folding deck section rear hinge cross member 228 so that the longitudinal axes of each fourth folding deck section rear hinge forward knuckles 230 are coincident with each other. In best mode, five fourth folding deck section rear hinge forward knuckles 230 are used. In best mode, rigid attachment is accomplished by welding.

Each fourth folding deck section rear hinge rear knuckle 232 is a component of a barrel hinge comprising: a plurality of fourth folding deck section rear hinge forward knuckles 230; a plurality of fourth folding deck section rear hinge rear knuckles 232, and a fourth folding deck section rear hinge pin 234. A barrel hinge is a type of hinge comprising two barrels and a hinge pin wherein the two barrels are pivotally attached to the hinge pin. With a standard barrel hinge, each barrel is typically connected to a leaf, where each leaf is rigidly attached to separate members to provide pivotal attachment of these members. A door hinge is a typical barrel hinge that pivotally attaches the door frame to a door, wherein one leaf is rigidly attached to the door frame and the other leaf is rigidly attached to the door. In this case, however, the two leaf sections of the barrel hinge are not present because each barrel is directly connected to the pivoting members without leaves. Each fourth folding deck section rear hinge rear knuckle 232 is part of a segmented barrel that is rigidly attached to the forward most sliding rail cross member 54. Each fourth folding deck section rear hinge rear knuckle 232 is a rigid hollow cylinder with open ends. Each fourth folding deck section rear hinge rear knuckle 232 has: a length, an outside diameter, an inside diameter, an outer surface, an inner surface, a longitudinal axis, a first end, and a second end. The length, outside diameter, and inside diameter of each fourth folding deck section rear hinge rear knuckle 232 matches those of each fourth folding deck section rear hinge forward knuckle 230. A plurality of fourth folding deck section rear hinge rear knuckles 232 is equally spaced along the length of the forward most sliding rail cross member 54 and rigidly attached to the front surface of the forward most sliding rail cross member 54 so that the longitudinal axes of each fourth folding deck section rear hinge rear knuckle 151 are coincident with each other. In best mode, five fourth folding deck section rear hinge rear knuckle 151 are used. In best mode, rigid attachment is accomplished by welding.

Fourth folding deck section rear hinge pin 234 is a component of a barrel hinge comprising: a plurality of fourth folding deck section rear hinge forward knuckles 230; a plurality of fourth folding deck section rear hinge rear knuckles 232, and a fourth folding deck section rear hinge pin 234. Fourth folding deck section rear hinge pin 234 is a rigid hollow cylindrical member. Fourth folding deck section rear hinge pin 234 has: length, an outside diameter, a longitudinal axis, a first end, and a second end.

The length of fourth folding deck section rear hinge pin 234 is equivalent to that of fourth folding deck section rear hinge cross member 228. The outer diameter of fourth folding deck section rear hinge pin 234 is sized to make a slip fit or clearance fit with the inside diameter of fourth folding deck section rear hinge forward knuckles 230 and fourth folding deck section rear hinge rear knuckles 232. The plurality of fourth folding deck section rear hinge forward knuckles 230 is aligned with the plurality of fourth folding deck section rear hinge rear knuckles 232 so that the longitudinal axes of each knuckle 230,232 are coincident. Then the fourth folding deck rear hinge pin 234 is driven through each knuckle 230,232 to pivotally attach the plurality of fourth folding deck section rear hinge forward knuckles 230 to the plurality of fourth folding deck section rear hinge rear knuckles 232 to create a hinged connection between these two members.

As stated above, third folding deck section 200 and fourth folding deck section 220 extend and retract like an accordion. After third folding deck section 200 and fourth folding deck section 220 are fully extended into the horizontal position, it can be difficult to raise them up in order to get them started and or moving into the retracted position. In order to help facilitate this, a lift mechanism is used. The lift mechanism comprises: a second deck arm 240 and a second deck arm hydraulic cylinder and piston 246. Second deck arm 240 is a rigid solid oblong member with an upper end, a second deck arm pivot point 242, and a lower end. The second deck arm pivot point 242 is located in between the upper end and the lower end of second deck arm 240. The second deck arm pivot point 242 is pivotally attached to the inner side of first or second stationary frame rails 30,32. Second deck arm hydraulic cylinder and piston 246 is a standard hydraulic cylinder. Second deck arm hydraulic cylinder and piston 246 has a piston end and a cylinder end. The lower end of second deck arm 240 is pivotally attached to the piston end of the second deck arm hydraulic cylinder and piston 246. The cylinder end of second deck arm hydraulic cylinder and piston 246 is pivotally attached to the inner side of left or right stationary rails 30,32. The upper end of second deck arm 240 is pivotally attached to second deck lift arm roller 244, which is a small wheel or roller. Second deck lift arm roller 244 prevents the upper end of second deck arm 240 from binding as it pushes the third folding deck section 200 up, noting that the second deck lift arm roller 244 travels along the lower surface of third folding deck section 200 during extension and during retraction.

The second deck arm 240 is pivotally attached to the first or second stationary frame rails 30,32 at a location where the upper end of second deck arm 240 rests underneath rear portion of third folding deck section 200 when of third folding deck section 200 is in the horizontal position and the piston of second deck arm hydraulic cylinder and piston 246 is fully extended. Note that second deck arm pivot point 242 and cylinder end of second deck arm hydraulic cylinder and piston 240 are the only attachment points of this mechanism and the other ends and parts are free to rotate and move as the piston extends and retracts. Second deck arm hydraulic cylinder and piston 246 is connected to an input hose line and to an output hose line, which are each connected to a hydraulic motor control lever 284 which is connected to a hydraulic pump 86. Any known type of hydraulic pump 86 may be used. The second deck arm hydraulic cylinder and piston 246 is retracted to lift up the third folding deck section 200 and retract the third folding deck section 200. The second deck arm hydraulic cylinder and piston 246 is extended to retract the third folding deck section 200.

Trailer with extendable deck 5 further comprises: a plurality of sliding frame section locking pins 250, each with a sliding frame locking pin spring 252 and a sliding frame locking pin hydraulic cylinder and piston 254. The plurality of sliding frame section locking pins 250 functions to lock down and solidly hold the left sliding frame rail 50 against the left stationary frame rail 30 and the right sliding frame rail 52 against the right stationary frame rail 32. Half of the sliding frame section locking pins 250 are mounted on the inner side of left stationary frame rail 30. The other half of the sliding frame section locking pins 250 are mounted on the inner side of right stationary frame rail 32. In best mode, there are two sliding frame section locking pins 250 mounted on the inner side of left stationary frame rail 30 and two sliding frame section locking pins 250 mounted on the inner side of right stationary frame rail 32. Each of the sliding frame section locking pins 250 includes a sliding frame locking pin spring 252 with a bias that constantly pushes the locking pin out and in the locked position. Each of the sliding frame section locking pins 250 includes a sliding frame locking pin hydraulic cylinder and piston 254. Each of sliding frame locking pin hydraulic cylinder and piston 254 is connected to an input hose line and to an output hose line, which are each connected to a frame locking pin control lever 280 which is connected to a hydraulic pump 86. Any known type of hydraulic pump 86 may be used. There are locking pin holes at certain locations on the left stationary frame rail 30 that align with locking pin holes on left sliding frame rail 50. There is a set of locking pin holes on left sliding frame rail 50 that align with the sliding frame section locking pins 250 when the sliding deck is in the forward position, which corresponds to all folding deck sections fully retracted. There is another set of locking pin holes on left sliding frame rail 50 that align with the sliding frame section locking pins 250 when the sliding deck is in the middle position, which corresponds to the third and fourth folding deck sections 200,220 fully extended. There is another set of locking pin holes on left sliding frame rail 50 that align with the sliding frame section locking pins 250 when the sliding deck is in the rearward position, which corresponds to all folding deck sections fully extended. When the frame locking pin control lever 280 is engaged, hydraulic fluid forces each sliding frame section locking pins 250 to retract from the locking pin holes. Thus, the frame locking pin control lever 280 must be engaged to extend or retract the sliding deck section. When the frame locking pin control lever 280 is released or not engaged and the sliding deck section is properly located to align with the locking pin holes, the sliding frame section locking pins 250 extend into the locking pin holed in order to lock the sliding frame rails 50,52 firmly against the stationary frame rails 30,32. The sliding frame section locking pins 250 must be in the locked position in order to load the trailer and travel with the trailer.

Trailer with extendable deck 5 further comprises: a plurality of folding deck section locking pins 260, each with two folding deck section locking pin fins 262 and a folding deck section locking pin spring 264. The plurality of folding deck section locking pins 260 functions to lock down and solidly hold all folding deck section down against the left stationary frame rail 30 and the right stationary frame rail 32. Each of the folding deck section locking pins 260 includes a folding deck section locking pin spring 264 with a bias that constantly pushes the locking pin in and in the locked position. Thus, each of the folding deck section locking pins 260 must be pulled out and retained in the outer position in order to extend or retract a folding deck section. Each of the folding deck section locking pins 260 includes two folding deck section locking pin fins 262 wherein one folding deck section locking pin fin 262 clamps onto left stationary rail 30 and the other folding deck section locking pin fins 262 clamps onto right stationary rail 32 when the folding deck section locking pin 260 is released. Each folding deck section locking pin fin 262 catches onto the flange of I-beam of a stationary rail 30,32. In best mode, each folding deck section locking pin 260 has a retaining head on it that allows each folding deck section locking pin 260 to be retained in the retracted or outer position in order to allow the folding deck sections to be extended or retracted. Then the retaining head is released to allow the folding deck section locking pins 260 to clamp into the stationary rails 30,32 in order to lock the folding deck sections down.

Trailer with extendable deck 5 is operated as follows. In order to extend the deck on trailer with extendable deck 5, the hydraulic motor is started, the plurality of folding deck section locking pins 260 are pulled or placed in the unlocked position, the frame lock pins control lever is engaged to unlock the plurality of sliding frame section locking pins 250, the frame lock pins control lever is held in the engaged position, then the hydraulic motor control lever 282 is engaged in the proper direction to cause the left and right roller chains 96,98 to rotate to extend the left and right sliding rails 50,52, when the left and right sliding rails 50,52 are in the proper position, the hydraulic motor control lever 282 is released, then the frame lock pins control lever is released to lock the sliding frame rails 50,52 against the stationary frame rails 30,32, then the plurality of folding deck section locking pins 260 are manually released or placed in the locked position. In order to retract the deck on trailer with extendable deck 5, the hydraulic motor is started, the plurality of folding deck section locking pins 260 are pulled or placed in the unlocked position, the frame lock pins control lever is engaged to unlock the plurality of sliding frame section locking pins 250, the frame lock pins control lever is held in the engaged position, then the lift mechanism control lever 282 is engaged to lift up a folding deck section, then the hydraulic motor control lever 282 is engaged in the other direction to cause the left and right roller chains 96,98 to rotate in the other direction to retract the left and right sliding rails 50,52, when the left and right sliding rails 50,52 are in the proper position, the hydraulic motor control lever 282 is released and the lift mechanism control lever 282 is released, then the frame lock pins control lever is released to lock the sliding frame rails 50,52 against the stationary frame rails 30,32, then the plurality of folding deck section locking pins 260 are manually released or placed in the locked position.

What is claimed is:

1. A trailer with extendable deck comprising: a tow vehicle coupling assembly; a bulkhead; a left stationary frame rail; a right stationary frame rail; a plurality of stationary rail cross members; a left rail spacer; a left rail vertical slide plate; a left rail horizontal slide plate; a right rail spacer; a right rail vertical slide plate; a right rail horizontal slide plate, a left sliding frame rail; a right sliding frame rail; a plurality of sliding rail cross members; a plurality of left sliding cross member spacers; a plurality of left sliding cross member flat bars; a plurality of left sliding cross member slide plates; a plurality of right sliding cross member spacers; a plurality of right sliding cross member flat bars; a plurality of right sliding cross member slide plates, a hydraulic motor; a hydraulic motor drive sprocket; a hydraulic motor drive chain; a front roller chain axle; a rear roller chain axle; a front roller chain axle drive sprocket; a left roller chain; a right roller chain; a left front roller chain axle sprocket; a left rear roller chain axle sprocket; a left roller chain connection to first sliding frame rail cross member; a right front roller chain axle sprocket; a right rear roller chain axle sprocket; and a right roller chain connection to first sliding frame rail cross member, wherein, said tow vehicle coupling assembly is reversibly attachable to a tow vehicle;

a said bulkhead is a rigid rectangular cuboid-shaped structural member with has: an upper side, a lower side, a left side, a right side, a front side, and a rear side;

said tow vehicle coupling assembly is rigidly attached to said front side of said bulkhead;

said left stationary frame rail is an I-beam support member with a length, a width, a height, a longitudinal axis, a latitudinal axis, an inner side, an outer side, an upper side, a lower side, a first end, and a second end;

said first end of left stationary frame rail is rigidly attached to said rear side of bulkhead;

said right stationary frame rail is an I-beam support member with a length, a width, a height, a longitudinal axis, a latitudinal axis, an inner side, an outer side, an upper side, a lower side, a first end, and a second end;

said first end of right stationary frame rail is rigidly attached to said rear side of bulkhead;

each of said plurality of stationary rail cross members is a section of rigid support structure with a length, a width, a height, a longitudinal axis, a first end, and a second end;

said first end of each of said plurality of stationary rail cross members is rigidly attached to said inner side of said left stationary frame rail, said upper side of said left stationary frame rail, or said lower side of said left stationary frame rail so that said longitudinal axis of each said stationary rail cross member is perpendicular to said longitudinal axis of said left stationary frame rail;

said second end of each of said plurality of stationary rail cross members is rigidly attached to said inner side of said right stationary frame rail, said upper side of said right stationary frame rail, or said lower side of said right stationary frame rail so that said longitudinal axis of each said stationary rail cross member is perpendicular to said longitudinal axis of said right stationary frame rail;

said left rail spacer is a section of rigid support structure with a length, a width, a height, a longitudinal axis, an inner side, an outer side, an upper side, a lower side, a first end, and a second end;

said inner side of said left rail spacer is rigidly attached to said outer side of said left stationary frame rail so that said first end of said left rail spacer coincides aligns with said first end of said left stationary frame rail, said second end of said left rail spacer aligns with said second end of said left stationary frame rail, and said longitudinal axis of said left rail spacer is parallel with said longitudinal axis of said left stationary frame rail;

said left rail vertical slide plate is a rigid sheet of low friction material with a length, a height, a thickness, a longitudinal axis, an inner surface, an outer surface, a first end, a second end, an upper edge, and a lower edge;

said inner surface of said left rail vertical slide plate is rigidly attached to said outer side of said left rail spacer so that said first end of said left rail vertical slide plate is flush with said first end of said left rail spacer, said second end of said left rail vertical slide plate is flush with said second end of said left rail spacer, said lower edge of said left rail vertical slide plate is flush with said lower side of said left rail spacer, and said upper edge of said left rail vertical slide plate is flush with said upper side of said left rail spacer;

said left rail horizontal slide plate is a rigid sheet of low friction material with a length, a width, a thickness, a longitudinal axis, an upper surface, a lower surface, a first end, a second end, an inner edge, and an outer edge;

said upper surface of said left rail horizontal slide plate is rigidly attached to said lower side of said left rail spacer so that said first end of said left rail horizontal slide plate is flush with said first end of said left rail spacer, said second end of said left rail horizontal slide plate is flush with said second end of said left rail spacer, and said outer edge of said left rail horizontal slide plate is flush with said outer side of said left rail spacer;

said right rail spacer is a section of rigid support structure with a length, a width, a height, a longitudinal axis, an inner side, an outer side, an upper side, a lower side, a first end, and a second end;

said inner side of said right rail spacer is rigidly attached to said outer side of said right stationary frame rail so that said first end of said right rail spacer aligns with said first end of said right stationary frame rail, said second end of right rail spacer aligns with said second end of said right stationary frame rail, and said longitudinal axis of said right rail spacer is parallel with said longitudinal axis of said right stationary frame rail;

said right rail vertical slide plate is a rigid sheet of low friction material with a length, a height, a thickness, a longitudinal axis, an inner surface, an outer surface, a first end, a second end, an upper edge, and a lower edge;

said inner surface of said right rail vertical slide plate is rigidly attached to said outer side of said right rail spacer so that said first end of said right rail vertical slide plate is flush with said first end of said right rail spacer, said second end of said right rail vertical slide plate is flush with said second end of said right rail spacer, said lower edge of said right rail vertical slide plate is flush with said lower side of said right rail spacer, and said upper edge of said right rail vertical slide plate is flush with said upper side of said right rail spacer;

said right rail horizontal slide plate is a rigid sheet of low friction material with a length, a width, a thickness, a longitudinal axis, an upper surface, a lower surface, a first end, a second end, an inner edge, and an outer edge;

said upper surface of said right rail horizontal slide plate is rigidly attached to said lower side of said right rail spacer so that said first end of said right rail horizontal slide plate is flush with said first end of said right rail spacer, said second end of said right rail horizontal slide plate is flush with said second end of said right rail spacer, and said outer edge of said right rail horizontal slide plate is flush with said outer side of said right rail spacer;

wherein a stationary ladder assembly is formed comprising: said left stationary frame rail; said right stationary frame rail; said plurality of stationary rail cross members; said left rail spacer; said left rail vertical slide plate; said left rail horizontal slide plate; said right rail spacer; said right rail vertical slide plate; and said right rail horizontal slide plate;

said left sliding frame rail is an I-beam support member with length, a width, a height, a longitudinal axis, a latitudinal axis, an inner side, an outer side, an upper side, a lower side, a first end, and a second end;

said right sliding frame rail is an I-beam support member with length, a width, a height, a longitudinal axis, a latitudinal axis, an inner side, an outer side, an upper side, a lower side, a first end, and a second end;

each of said plurality of sliding rail cross members is length of rigid support structure with a length, a width, a height, a longitudinal axis, an inner side, an outer side, an upper side, a lower side, a latitudinal axis, a first end, and a second end;

each of said plurality of left sliding cross member spacers is a section of rigid support structure with a length, a width, a thickness, a longitudinal axis, an upper surface, a lower surface, a first end, a second end, a front surface, and a rear surface;

each of said plurality of left sliding cross member flat bars is a length of rigid support structure with a length, a width, a thickness, a longitudinal axis, an upper surface, a lower surface, a first end, a second end, a front surface, and a rear surface;

said lower surface of each of said plurality of left sliding cross member flat bar is rigidly attached to said upper surface of one of said plurality of sliding rail cross member so that said first end of said left sliding cross member flat bar is flush with said first end of said sliding rail cross member, said front surface of said left sliding cross member flat bar is flush with said front surface of said sliding rail cross member, and said rear surface of said left sliding cross member flat bar is flush with said rear surface of said sliding rail cross member;

said upper surface of each of said plurality of left sliding cross member flat bar is rigidly attached to said lower surface of one of said plurality of left sliding cross member spacer so that said first end of said left sliding cross member flat bar is flush with said first end of said left sliding cross member spacer, said front surface of said left sliding cross member flat bar is flush with said front surface of said left sliding cross member spacer, and said rear surface of said left sliding cross member flat bar is flush with said rear surface of said left sliding cross member spacer;

said upper surface of each of said plurality of left sliding cross member spacer is rigidly attached to said lower side of said left sliding frame rail so that said first end of said left sliding cross member spacer is flush with said first end of said sliding rail cross member, said front surface of said left sliding cross member flat bar is flush with said front surface of said sliding rail cross member, and said rear surface of said left sliding cross member flat bar is flush with said rear surface of said sliding rail cross member;

each of said plurality of left sliding cross member slide plates is a rigid sheet of low friction material with a length, a width, a thickness, a longitudinal axis, an upper surface, a lower surface, a first end, a second end, a front edge, and a rear edge;

said lower surface of each of said plurality of left sliding cross member slide plates is rigidly attached to said upper surface of said left sliding member flat bar so that said first end of each of said plurality of left sliding cross member slide plates is flush with said outer side of said left stationary frame rail, said second end of each of said plurality of left sliding cross member slide plates is flush with said inner end of said left stationary frame rail, said front edge of each of said plurality of left sliding cross member slide plates is flush with said front surface of said left sliding cross member flat bar, and said rear edge of each of said plurality of left sliding cross member slide plates is flush with said rear surface of said left sliding cross member flat bar;

each of said plurality of right sliding cross member spacers is a section of rigid support structure with a length, a width, a thickness, a longitudinal axis, an upper surface, a lower surface, a first end, a second end, a front surface, and a rear surface;

each of said plurality of right sliding cross member flat bars is a section of rigid support structure with a length, a width, a thickness, a longitudinal axis, an upper surface, a lower surface, a first end, a second end, a front surface, and a rear surface;

said lower surface of each of said plurality of right sliding cross member flat bar is rigidly attached to said upper surface of one of said plurality of sliding rail cross member so that said first end of said right sliding cross member flat bar is flush with said second end of said sliding rail cross member, said front surface of said right sliding cross member flat bar is flush with said front surface of said sliding rail cross member, and said rear surface of said right sliding cross member flat bar is flush with said rear surface of said sliding rail cross member;

said upper surface of each of said plurality of right sliding cross member flat bar is rigidly attached to said lower surface of one of said plurality of right sliding cross member spacer so that said first end of said right sliding cross member flat bar is flush with said first end of said right sliding cross member spacer, said front surface of said right sliding cross member flat bar is flush with said front surface of said right sliding cross member spacer, and said rear surface of said right sliding cross member flat bar is flush with said rear surface of said right sliding cross member spacer;

said upper surface of each of said plurality of right sliding cross member spacer is rigidly attached to said lower side of said right sliding frame rail so that said first end of said right sliding cross member spacer is flush with said second end of said sliding rail cross member, said front surface of said right sliding cross member flat bar is flush with said front surface of said sliding rail cross member, and said rear surface of said right sliding cross member flat bar is flush with said rear surface of said sliding rail cross member;

each of said plurality of right sliding cross member slide plates is a rigid sheet of low friction material with a length, a width, a thickness, a longitudinal axis, an upper surface, a lower surface, a first end, a second end, a front edge, and a rear edge;

each of said plurality of right sliding cross member spacers is a section of rigid support structure with a length, a width, a thickness, a longitudinal axis, an upper surface, a lower surface, a first end, a second end, a front surface, and a rear surface;

each of said plurality of right sliding cross member flat bars is a length of rigid support structure with a length, a width, a thickness, a longitudinal axis, an upper surface, a lower surface, a first end, a second end, a front surface, and a rear surface;

said lower surface of each of said plurality of right sliding cross member flat bar is rigidly attached to said upper surface of one of said plurality of sliding rail cross member so that said first end of said right sliding cross member flat bar is flush with said second end of said sliding rail cross member, said front surface of said right sliding cross member flat bar is flush with said front surface of said sliding rail cross member, and said rear surface of said right sliding cross member flat bar is flush with said rear surface of said sliding rail cross member;

said upper surface of each of said plurality right sliding cross member flat bar is rigidly attached to said lower surface of one of said plurality of right sliding cross member spacer so that said first end of said right sliding cross member flat bar is flush with said first end of said right sliding cross member spacer, said front surface of said right sliding cross member flat bar is flush with said front surface of said right sliding cross member spacer, and said rear surface of said right sliding cross member flat bar is flush with said rear surface of said right sliding cross member spacer;

said upper surface of each of said plurality of right sliding cross member spacer is rigidly attached to said lower side of said right sliding frame rail so that said first end of said right sliding cross member spacer is flush with said second end of said sliding rail cross member, said front surface of said right sliding cross member flat bar is flush with said front surface of said sliding rail cross member, and said rear surface of said right sliding cross member flat bar is flush with said rear surface of said sliding rail cross member;

each of said plurality of right sliding cross member slide plates is a rigid sheet of low friction material with a length, a width, a thickness, a longitudinal axis, an upper surface, a lower surface, a first end, a second end, a front edge, and a rear edge;

said lower surface of each of said plurality of right sliding cross member slide plates is rigidly attached to said upper surface of said right sliding member flat bar so that said first end of each of said plurality of right sliding cross member slide plates is flush with said outer side of said right stationary frame rail, said second end of each of said plurality of right sliding cross member slide plates is flush with said inner end of said right stationary frame rail, said front edge of each of said plurality of right sliding cross member slide plates is flush with said front surface of said right sliding cross member flat bar, and said rear edge of each of said plurality of right sliding cross member slide plates is flush with rear surface of said right sliding cross member flat bar;

wherein a sliding ladder assembly is formed comprising: said left sliding frame rail; said right sliding frame rail; said plurality of sliding rail cross members; said plurality of left sliding cross member spacers; said plurality of left sliding cross member flat bars; said plurality of left sliding cross member slide plates; said plurality of right sliding cross member spacers; said plurality of right sliding cross member flat bars; and said plurality of right sliding cross member slide plates;

wherein said sliding ladder assembly is slidably attached to said stationary ladder assembly;

said hydraulic motor is a mechanical actuator that converts hydraulic pressure and flow into torque and angular displacement or rotation;

said hydraulic motor has a drive shaft that rotates;

said hydraulic motor is rigidly attached to said bulkhead, said left stationary frame rail, or said right stationary frame rails;

said hydraulic motor sprocket is a profiled wheel with teeth that mesh with said hydraulic motor drive chain;

said hydraulic motor sprocket is rigidly attached to said drive shaft on said hydraulic motor;

said hydraulic motor drive chain is a closed loop of roller chain or a connected flexible series of metal links;

said front roller chain axle is a central shaft, rod, or spindle;

said front roller chain axle is pivotally attached to said left stationary frame rail and said right stationary frame rail;

said rear roller chain axle is a central shaft, rod, or spindle;

said rear roller chain axle is pivotally attached to said left stationary frame rail and said right stationary frame rail;

said front roller chain axle drive sprocket is a profiled wheel with teeth that mesh said hydraulic motor drive chain;

said front roller chain axle drive sprocket is rigidly attached to said front roller chain axle;

said left roller chain is a closed loop of roller chain or a connected flexible series of metal links;

said right roller chain is a closed loop of roller chain or a connected flexible series of metal links;

said left front roller chain axle sprocket is a profiled wheel with teeth that mesh said left roller chain;

said left front roller chain axle sprocket is rigidly attached to said front roller chain axle;

said left rear roller chain axle sprocket is a profiled wheel with teeth that mesh with said left roller chain;

said left rear roller chain axle sprocket is rigidly attached to said front roller chain axle;

said right front roller chain axle sprocket is a profiled wheel with teeth that mesh said right roller chain;

said right front roller chain axle sprocket is rigidly attached to said front roller chain axle;

said right rear roller chain axle sprocket is a profiled wheel with teeth that mesh with said right roller chain;

said right rear roller chain axle sprocket is rigidly attached to said front roller chain axle;

said left roller chain connection to front sliding rail cross member is a piece of hardware or bracketry that rigidly attaches said left roller chain to one of said plurality of sliding rail cross members; and said right roller chain connection to front sliding rail cross member is a piece of hardware or bracketry that rigidly attaches said right roller chain to one of said plurality of sliding rail cross members.

2. A trailer with extendable deck as recited in claim 1 further comprising: a plurality of folding deck section left rails; a plurality of folding deck section right rails; a plurality of folding deck section cross members; a first folding deck section; a first folding deck section front hinge cross member; a plurality of first folding deck section front hinge forward knuckles; a plurality of first folding deck section front hinge rear knuckles; a first folding deck section front hinge pin; a first folding deck section rear hinge cross member; a first folding deck section rear hinge spacer; a plurality of first folding deck section rear hinge knuckles; a first folding deck section rear hinge pin; a second folding deck section; a second folding deck section front hinge cross member; a second folding deck section front hinge spacer; a plurality of first folding deck section front hinge knuckles; a second folding deck section rear hinge cross member; a plurality of second folding deck section rear hinge forward knuckles; a plurality of second folding deck section rear hinge rear knuckles; a second folding deck section rear hinge pin; a first deck lift arm; a first deck lift arm pivot point; a first deck lift arm roller; and a first deck lift arm hydraulic cylinder and piston, wherein, each of said plurality of folding deck section left rails is a length of rigid support structure with a length, a width, a height, a longitudinal axis, a first end, a second end, an upper side, a lower side, an inner side, and an outer side;

each of said plurality of folding deck section right rails is a length of rigid support structure with a length, a width, a height, a longitudinal axis, a first end, a second end, an upper side, a lower side, an inner side, and an outer side;

each of said plurality of folding deck section cross members is a length of rigid support structure with length, a width, a height, a longitudinal axis, a first end, a second end, an upper surface, a lower surface, a front surface, and a rear surface;

said first folding deck section is a rigid rectangular section with an upper surface, a lower surface, a front side, a rear side, a left side, and a right side, comprising one of said plurality of folding deck section left rails, one of said folding deck section right rails, and a plurality of said folding deck section cross members, wherein said first end of each of said plurality of folding deck section cross members is rigidly attached to said inner side of said folding deck section left rail and said second end of each said plurality of folding deck section cross members is rigidly attached to said inner side of folding deck section right rail, wherein there is a front folding deck section cross member on said first folding deck section and a rear folding deck section cross member on said first folding deck section;

said first folding deck section front hinge cross member is a length of rigid support structure with a length, a width, a height, a longitudinal axis, a first end, a second end, an upper surface, a lower surface, a front surface, and a rear surface;

said rear surface of said first folding deck section front hinge cross member is rigidly attached to said front surface of said front folding deck section cross member on said first folding deck section;

each of said plurality of first folding deck section front hinge forward knuckles is a rigid hollow cylinder with open ends that has a length, an outside diameter, an inside diameter, an outer surface, an inner surface, a longitudinal axis, a first end, and a second end;

each of said plurality of first folding deck section front hinge forward knuckles is rigidly attached to said rear side of said bulkhead;

each of said plurality of first folding deck section front hinge rear knuckles is a rigid hollow cylinder with open ends that has a length, an outside diameter, an inside diameter, an outer surface, an inner surface, a longitudinal axis, a first end, and a second end;

each of said plurality of first folding deck section front hinge rear knuckles is rigidly attached to rigidly attached to said front surface of said first folding deck section front hinge cross member;

said first folding deck section front hinge pin is a rigid solid cylindrical member with a center, a length, an outside diameter, a longitudinal axis, a first end, and a second end;

said first folding deck section front hinge pin is driven through said center of each of said plurality of first folding deck section front hinge forward knuckles and said center of each of said plurality of first folding deck section rear hinge rear knuckles to pivotally attach said plurality of first folding deck section front hinge forward knuckles to said plurality of first folding deck section front hinge rear knuckles;

said first folding deck section rear hinge cross member is a length of rigid support structure with a length, a width, a height, a longitudinal axis, a first end, a second end, an upper surface, a lower surface, a front surface, and a rear surface;

said front surface of said first folding deck section rear hinge cross member is rigidly attached to said rear surface of said rear folding deck section cross member on said first folding deck section;

said first folding deck section rear hinge spacer is a length of rigid support structure or tubular steel with a length, a width, a height, a longitudinal axis, a first end, a second end, an upper surface, a lower surface, a front surface, and a rear surface;

said upper surface of said first folding deck section rear hinge spacer is rigidly attached to said lower surface of said first folding deck section rear hinge cross member;

said second folding deck section is a rigid rectangular section with an upper surface, a lower surface, a front side, a rear side, a left side, and a right side, comprising one of said plurality of folding deck section left rails, one of said folding deck section right rails, and a plurality of said folding deck section cross members, wherein said first end of each of said plurality of folding deck section cross members is rigidly attached to said inner side of said folding deck section left rail and said second end of each said plurality of folding deck section cross members is rigidly attached to said inner side of folding deck section right rail, wherein there is a front folding deck section cross member on said second folding deck section and a rear folding deck section cross member on said second folding deck section;

said second folding deck section front hinge cross member is a length of rigid support structure with a length, a width, a height, a longitudinal axis, a first end, a second end, an upper surface, a lower surface, a front surface, and a rear surface;

said rear surface of said second folding deck section front hinge cross member is rigidly attached to said front surface of said front folding deck section cross member on said second folding deck section;

said second folding deck section front hinge spacer is a length of rigid support structure or tubular steel with a length, a width, a height, a longitudinal axis, a first end, a second end, an upper surface, a lower surface, a front surface, and a rear surface;

said upper surface of second folding deck section front hinge spacer is rigidly attached to said lower surface of said second folding deck section front hinge cross member;

each of said plurality of first folding deck section rear hinge knuckles is a rigid hollow cylinder with open ends that has a length, an outside diameter, an inside diameter, an outer surface, an inner surface, a longitudinal axis, a first end, and a second end;

each of said plurality of first folding deck section rear hinge knuckles is rigidly attached to said first folding deck section rear hinge spacer;

each of said plurality of second folding deck section front hinge knuckles is a rigid hollow cylinder with open ends that has a length, an outside diameter, an inside diameter, an outer surface, an inner surface, a longitudinal axis, a first end, and a second end;

each of said plurality of second folding deck section front hinge knuckles is rigidly attached to rigidly attached to said second folding deck section front hinge spacer;

said first folding deck section rear hinge pin is a rigid solid cylindrical member with a center, a length, an outside diameter, a longitudinal axis, a first end, and a second end;

said first folding deck section rear hinge pin is driven through said center of each of said plurality of first folding deck section rear hinge knuckles and said center of each of said plurality of second folding deck section front hinge knuckles to pivotally attach said plurality of first folding deck section rear hinge knuckles to said plurality of second folding deck section front hinge knuckles;

said second folding deck section rear hinge cross member is a length of rigid support structure with a length, a width, a height, a longitudinal axis, a first end, a second end, an upper surface, a lower surface, a front surface, and a rear surface;

said front surface of said second folding deck section rear hinge cross member is rigidly attached to said rear surface of said rear folding deck section cross member on said second folding deck section;

each of said plurality of second folding deck section rear hinge forward knuckles is a rigid hollow cylinder with open ends that has a length, an outside diameter, an inside diameter, an outer surface, an inner surface, a longitudinal axis, a first end, and a second end;

each of said plurality of second folding deck section rear hinge forward knuckles is rigidly attached to said rear surface of said second folding deck section rear hinge cross member;

each of said plurality of second folding deck section rear hinge rear knuckles is a rigid hollow cylinder with open ends that has a length, an outside diameter, an inside diameter, an outer surface, an inner surface, a longitudinal axis, a first end, and a second end;

each of said plurality of second folding deck section rear hinge rear knuckles is rigidly attached to said front surface of said sliding rail cross member;

said second folding deck section rear hinge pin is a rigid solid cylindrical member with a center, a length, an outside diameter, a longitudinal axis, a first end, and a second end;

said second folding deck section rear hinge pin is driven through said center of each of said plurality of second folding deck section rear hinge forward knuckles and said center of each of said second folding deck section rear hinge rear knuckles to pivotally attach said plurality of second folding deck section rear hinge forward knuckles to said plurality of second folding deck section rear hinge rear knuckle;

said first deck arm is a rigid solid oblong member with an upper end, a first deck arm pivot point, and a lower end;

said first deck arm pivot point is located in between said upper end and said lower end of said first deck arm;

said first deck arm pivot point is pivotally attached to said inner side of said first stationary frame rail or said second stationary frame rails;

said first deck arm hydraulic cylinder and piston is a hydraulic cylinder;

said first deck arm hydraulic cylinder and piston has a piston end and a cylinder end;

said lower end of said first deck arm is pivotally attached to said piston end of said first deck arm hydraulic cylinder and piston;

said cylinder end of said first deck arm hydraulic cylinder and piston is pivotally attached to said inner side of said left stationary rail or said right stationary rails;

said first deck arm roller is a small wheel or roller; and said upper end of said first deck arm is pivotally attached to said to said first deck arm roller.

3. A trailer with extendable deck as recited in claim 2 further comprising: a runner cross member; a third folding deck section; a third folding deck section front hinge cross member; a plurality of third folding deck section front hinge forward knuckles; a plurality of third folding deck section front hinge rear knuckles; a third folding deck section front hinge pin; a third folding deck section rear hinge cross member; a third folding deck section rear hinge spacer; a plurality of third folding deck section rear hinge knuckles; a third folding deck section rear hinge pin; a fourth folding deck section; a fourth folding deck section front hinge cross member; a fourth folding deck section front hinge spacer; a plurality of fourth folding deck section front hinge knuckles; a fourth folding deck section rear hinge cross member; a plurality of fourth folding deck section rear hinge forward knuckles; a plurality of fourth folding deck section rear hinge rear knuckles; a fourth folding deck section rear hinge pin; a second deck lift arm; a second deck lift arm pivot point; a second deck lift arm roller; and a second deck lift arm hydraulic cylinder and piston, wherein, said runner cross member is a length of rigid support structure with a length, a width, a height, a longitudinal axis, a first end, a second end, an upper surface, a lower surface, a front surface, and a rear surface;

said lower surface of said runner cross member is slidably attached to said upper side of said left stationary rail and said upper side of said right stationary rail;

said third folding deck section is a rigid rectangular section with an upper surface, a lower surface, a front side, a rear side, a left side, and a right side, comprising one of said plurality of folding deck section left rails, one of said folding deck section right rails, and a plurality of said folding deck section cross members, wherein said first end of each of said plurality of folding deck section cross members is rigidly attached to said inner side of said folding deck section left rail and said second end of each said plurality of folding deck section cross members is rigidly attached to said inner side of folding deck section right rail, wherein there is a front folding deck section cross member on said third folding deck section and a rear folding deck section cross member on said third folding deck section;

said third folding deck section front hinge cross member is a length of rigid support structure with a length, a width, a height, a longitudinal axis, a first end, a second end, an upper surface, a lower surface, a front surface, and a rear surface;

said rear surface of said third folding deck section front hinge cross member is rigidly attached to said front surface of said front folding deck section cross member on said third folding deck section;

each of said plurality of third folding deck section front hinge forward knuckles is a rigid hollow cylinder with open ends that has a length, an outside diameter, an inside diameter, an outer surface, an inner surface, a longitudinal axis, a first end, and a second end;

each of said plurality of third folding deck section front hinge forward knuckles is rigidly attached said rear side of said runner cross member;

each of said plurality of third folding deck section front hinge rear knuckles is a rigid hollow cylinder with open ends that has a length, an outside diameter, an inside diameter, an outer surface, an inner surface, a longitudinal axis, a first end, and a second end;

each of said plurality of first folding deck section rear hinge forward knuckles is rigidly attached to said front surface of said third folding deck section front hinge cross member;

said third folding deck section front hinge pin is a rigid solid cylindrical member with a center, a length, an outside diameter, a longitudinal axis, a first end, and a second end;

said third folding deck section front hinge pin is driven through said center of each of said plurality of third folding deck section front hinge forward knuckles and said center of each of said plurality of third folding deck section front hinge rear knuckles to pivotally attach said plurality of third folding deck section front hinge forward knuckles to said plurality of third folding deck section front hinge rear knuckles;

said third folding deck section rear hinge cross member is a length of rigid support structure with a length, a width, a height, a longitudinal axis, a first end, a second end, an upper surface, a lower surface, a front surface, and a rear surface;

said front surface of said third folding deck section rear hinge cross member is rigidly attached to said rear surface of said rear folding deck section cross member on said third folding deck section;

said third folding deck section rear hinge spacer is a length of rigid support structure or tubular steel with a length, a width, a height, a longitudinal axis, a first end, a second end, an upper surface, a lower surface, a front surface, and a rear surface;

said upper surface of said third folding deck section rear hinge spacer is rigidly attached to said lower surface of said third folding deck section rear hinge cross member;

said fourth folding deck section is a rigid rectangular section with an upper surface, a lower surface, a front side, a rear side, a left side, and a right side, comprising one of said plurality of folding deck section left rails, one of said folding deck section right rails, and a plurality of said folding deck section cross members, wherein said first end of each of said plurality of folding deck section cross members is rigidly attached to said inner side of said folding deck section left rail and said second end of each said plurality of folding deck section cross members is rigidly attached to said inner side of folding deck section right rail, wherein there is a front folding deck section cross member on said fourth folding deck section and a rear folding deck section cross member on said fourth folding deck section;

said fourth folding deck section front hinge cross member is a length of rigid support structure with a length, a width, a height, a longitudinal axis, a first end, a second end, an upper surface, a lower surface, a front surface, and a rear surface;

said rear surface of said fourth folding deck section front hinge cross member is rigidly attached to said front surface of said front folding deck section cross member on said fourth folding deck section;

said fourth folding deck section front hinge spacer is a length of rigid support structure or tubular steel with a length, a width, a height, a longitudinal axis, a first end, a second end, an upper surface, a lower surface, a front surface, and a rear surface;

said upper surface of fourth folding deck section front hinge spacer is rigidly attached to said lower surface of said fourth folding deck section front hinge cross member;

each of said plurality of third folding deck section rear hinge knuckles is a rigid hollow cylinder with open ends that has a length, an outside diameter, an inside diameter, an outer surface, an inner surface, a longitudinal axis, a first end, and a second end;

each of said plurality of third folding deck section rear hinge knuckles is rigidly attached to said third folding deck section rear hinge spacer;

each of said plurality of fourth folding deck section front hinge knuckles is a rigid hollow cylinder with open ends that has a length, an outside diameter, an inside diameter, an outer surface, an inner surface, a longitudinal axis, a first end, and a second end;

each of said plurality of fourth folding deck section front hinge knuckles is rigidly attached to rigidly attached to said fourth folding deck section front hinge spacer;

said third folding deck section rear hinge pin is a rigid solid cylindrical member with a center, a length, an outside diameter, a longitudinal axis, a first end, and a second end;

said third folding deck section rear hinge pin is driven through said center of each of said plurality of third folding deck section rear hinge knuckles and said center of each of said plurality of fourth folding deck section front hinge knuckles to pivotally attach said plurality of third folding deck section rear hinge knuckles to said plurality of fourth folding deck section front hinge knuckles;

said fourth folding deck section rear hinge cross member is a length of rigid support structure with a length, a width, a height, a longitudinal axis, a first end, a second end, an upper surface, a lower surface, a front surface, and a rear surface;

said front surface of said fourth folding deck section rear hinge cross member is rigidly attached to said rear surface of said rear folding deck section cross member on said fourth folding deck section;

each of said plurality of fourth folding deck section rear hinge forward knuckle is a rigid hollow cylinder with open ends that has a length, an outside diameter, an inside diameter, an outer surface, an inner surface, a longitudinal axis, a first end, and a second end;

each of said plurality of fourth folding deck section rear hinge forward knuckles is rigidly attached to said rear surface of said fourth folding deck section rear hinge cross member;

each of said plurality of fourth folding deck section rear hinge rear knuckle is a rigid hollow cylinder with open ends that has a length, an outside diameter, an inside diameter, an outer surface, an inner surface, a longitudinal axis, a first end, and a second end;

each of said plurality of fourth folding deck section rear hinge rear knuckles is rigidly attached to said front surface of said sliding rail cross member;

said fourth folding deck section rear hinge pin is a rigid solid cylindrical member with a center, a length, an outside diameter, a longitudinal axis, a first end, and a second end;

said fourth folding deck section rear hinge pin is driven through said center of each of said plurality of fourth folding deck section rear hinge forward knuckle and said center of each of said fourth folding deck section rear hinge rear knuckle to pivotally attach said plurality of fourth folding deck section rear hinge forward knuckle to said plurality of fourth folding deck section rear hinge rear knuckle;

said second deck arm is a rigid solid oblong member with an upper end, a second deck arm pivot point, and a lower end;

said second deck arm pivot point is located in between said upper end and said lower end of said second deck arm;

said second deck arm pivot point is pivotally attached to said inner side of said first stationary frame rail or said second stationary frame rails;

said second deck arm hydraulic cylinder and piston is a hydraulic cylinder;

said second deck arm hydraulic cylinder and piston has a piston end and a cylinder end;

said lower end of said second deck arm is pivotally attached to said piston end of said second deck arm hydraulic cylinder and piston;

said cylinder end of said second deck arm hydraulic cylinder and piston is pivotally attached to said inner side of said left stationary rail or said right stationary rails;

said second deck lift arm roller is a small wheel or roller; and said upper end of said second deck arm is pivotally attached to said to said second deck lift arm roller.

* * * * *